US009829606B2

(12) United States Patent
Suzuki et al.

(10) Patent No.: US 9,829,606 B2
(45) Date of Patent: Nov. 28, 2017

(54) METHOD OF MANUFACTURING HARD COAT FILM, HARD COAT FILM, POLARIZING PLATE, AND LIQUID CRYSTAL DISPLAY DEVICE

(71) Applicant: FUJIFILM Corporation, Tokyo (JP)

(72) Inventors: Masaaki Suzuki, Kanagawa (JP); Keigo Ueki, Kanagawa (JP); Taketo Otani, Kanagawa (JP); Katsuyuki Takada, Kanagawa (JP); Ryo Nakamura, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 81 days.

(21) Appl. No.: 14/747,463

(22) Filed: Jun. 23, 2015

(65) Prior Publication Data

US 2015/0378062 A1 Dec. 31, 2015

(30) Foreign Application Priority Data

Jun. 26, 2014 (JP) ................. 2014-131942
Sep. 25, 2014 (JP) ................. 2014-195649
Mar. 31, 2015 (JP) ................. 2015-074244

(51) Int. Cl.
| | | |
|---|---|---|
| C09K 19/00 | (2006.01) | |
| G02B 1/14 | (2015.01) | |
| C09D 135/02 | (2006.01) | |
| C09D 133/06 | (2006.01) | |
| C09D 4/00 | (2006.01) | |
| G02F 1/1335 | (2006.01) | |

(52) U.S. Cl.
CPC ............... *G02B 1/14* (2015.01); *C09D 4/00* (2013.01); *C09D 133/066* (2013.01); *C09D 135/02* (2013.01); *C08L 2312/00* (2013.01); *G02F 1/133528* (2013.01); *G02F 2201/50* (2013.01); *Y10T 428/10* (2015.01); *Y10T 428/1036* (2015.01)

(58) Field of Classification Search
CPC . G02B 1/14; G02B 1/10; G02B 1/105; G02B 1/111; G02F 1/133528; C09D 135/02; C09D 133/14; C09D 133/06; C09D 133/068; Y10T 428/10; Y10T 428/1036; Y10T 428/1041; Y10T 428/105; Y10T 428/25

USPC ......... 428/1.1, 1.3, 1.33, 323; 427/160, 162, 427/386, 553, 558, 508; 349/96; 524/556
See application file for complete search history.

(56) References Cited

U.S. PATENT DOCUMENTS

| | | | |
|---|---|---|---|
| 8,859,060 B2 | 10/2014 | Fukagawa et al. | |
| 2010/0129587 A1* | 5/2010 | Terauchi | C08F 220/22 428/65.1 |
| 2013/0189449 A1* | 7/2013 | Fukagawa | C09K 19/52 428/1.33 |
| 2014/0098331 A1* | 4/2014 | Hisanaga | G02B 1/105 349/96 |

FOREIGN PATENT DOCUMENTS

| | | |
|---|---|---|
| JP | H04-236211 A | 8/1992 |
| JP | H08-073771 A | 3/1996 |
| JP | 2002-322430 A | 11/2002 |
| JP | 2003-147017 A | 5/2003 |
| JP | 2006-335837 A | 12/2006 |
| JP | 2007-237483 A | 9/2007 |
| JP | 2011-118135 A | 6/2011 |
| JP | 2012-141459 A | 7/2012 |
| JP | 2013-204001 A | 10/2013 |

OTHER PUBLICATIONS

Notification of Reasons for Refusal issued by the Japanese Patent Office dated Feb. 21, 2017, in connection with corresponding Japanese Patent Application No. 2015-074244.
Notification of Reasons for Refusal issued by the Japanese Patent Office dated Oct. 3, 2017, in connection with corresponding Japanese Patent Application No. 2015-074244.

* cited by examiner

*Primary Examiner* — Ruiyun Zhang
(74) *Attorney, Agent, or Firm* — Edwards Neils PLLC; Jean C. Edwards, Esq.

(57) ABSTRACT

There is provided a method of manufacturing a hard coat film having a hard coat layer on at least one side of a transparent support, the method includes curing a hard coat layer forming composition containing (a) a compound having one alicyclic epoxy group and one ethylenically unsaturated double bond group in a molecule and having a molecular weight of 300 or less, (b) a compound having three or more ethylenically unsaturated double bond groups in a molecule, (c) a radical polymerization initiator, and (d) a cationic polymerization initiator in a specific amount.

11 Claims, No Drawings

METHOD OF MANUFACTURING HARD COAT FILM, HARD COAT FILM, POLARIZING PLATE, AND LIQUID CRYSTAL DISPLAY DEVICE

CROSS-REFERENCE TO RELATED APPLICATIONS

This application claims priority from Japanese Patent Application No. 2014-131942, filed on Jun. 26, 2014, Japanese Patent Application No. 2014-195649, filed on Sep. 25, 2014, and Japanese Patent Application No. 2015-74244, filed on Mar. 31, 2015, the contents of all of which are hereby incorporated by reference in their entirety.

BACKGROUND OF THE INVENTION

1. Field of the Invention

The present invention relates to a method of manufacturing a hard coat film, a hard coat film, a polarizing plate, and a liquid crystal display device.

2. Description of the Related Art

In an image display device, such as a cathode ray tube (CRT) display, a plasma display panel (PDP), an electroluminescence display (ELD), a vacuum fluorescent display (VFD), a field emission display (FED) or a liquid crystal display (LCD), it is appropriate to provide a hard coat film having a hard coat layer on a transparent support to prevent the display surface of the device from suffering damage.

Since a hard coat film is applied to the outermost surface of a display, it is required to have a high degree of hardness. Meanwhile, an image display device is becoming thinner and thus there has been a strong need for a thinner hard coat film.

To make a thinner hard coat film, it is also necessary to make a thinner transparent support as well. However, a thinner transparent support resulted in the reduction of the hardness of the film or was unable to tolerate the cure shrinkage in a hard coat layer and thus worse the wrinkling or curling of the film, thereby making it difficult to handle the hard coat film during the process of manufacturing or processing the hard coat film or causing a crack in the film in the process of handling, or peeling-off after adhesion. Also, a thinner transparent support increases water vapor permeability, which in turn deteriorates the moisture and heat resistance of a polarizing plate. In order to resolve these problems, inventions that use an epoxy-based compound (see Japanese Patent Application Laid-Open No. 2007-237483 and Japanese Patent Application Laid-Open No. Hei 8-073771) have been suggested.

Japanese Patent Application Laid-Open No. Hei 4-236211 discloses an example wherein a compound having an alicyclic epoxy group and a (meth)acrylate group in a molecule as an overcoat for an optical disk to suppress an inverse warpage.

A hard coat film is also given a ultra-violet ray cutting function (ultra-violet ray blocking function) for purposes of preventing a display device or the like from deteriorating due to ultra-violet rays. To date, it has been commonly practiced to impart the ultra-violet ray cutting function to a transparent support. However, making a thinner transparent support has also deteriorated its ultra-violet ray blocking function and thus a hard coat layer has also been required to have an ultra-violate ray cutting function. Herein, although an ultra-violet curable resin is used for forming a hard coat layer, the ultra-violet ray cutting function of the hard coat layer cuts the ultra-violet rays necessary for curing the hard coat layer as well, thereby deteriorating the hardness of the hard coat layer. In this regard, Japanese Patent Application Laid-Open No. 2013-204001 discloses using a specific UV absorber to improve the hardness and curling.

SUMMARY OF THE INVENTION

While the curling was improved in the inventions disclosed in Japanese Patent Application Laid-Open No. 2007-237483 and Japanese Patent Application Laid-Open No. Hei 8-073771, the hardness of the film surface was reduced. Thus, the surface hardness was irreconcilable with such properties. In addition to this problem, it has been newly known that when an acrylic compound and an epoxy-based compound are mixed like in Japanese Patent Application Laid-Open No. 2007-237483 and Japanese Patent Application Laid-Open No. Hei 8-073771, the epoxy-based compound is bled out to cloud the film under a high temperature and high humidity condition.

When the curable composition disclosed in Japanese Patent Application Laid-Open No. Hei 4-236211 was used as a hard coat film, the hardness was insufficient and the curling suppression effect was also insufficient.

Further, the invention disclosed in Japanese Patent Application Laid-Open No. 2013-204001 failed to fully improve curling when a hard coat layer was provided on a thin transparent support having a thickness of 25 μm.

Given the foregoing problems with the prior art, the present invention has an objective of providing a hard coat film that inhibits curling or wrinkling without deteriorating the hardness of the film surface, thereby preventing the problem of clouding caused by bleeding out or the like in a moist and heat environment. Another objective of the present invention is to provide a hard coat film that also has sufficient UV absorbability when a transparent support has a thickness of 25 μm or less in addition to the above performance. Further, the present invention aims at providing a polarizing plate and a liquid crystal display device having the hard coat film described above, exhibiting superior handling performance, being capable of preventing the display quality from deteriorating by curling or wrinkling and being capable of reducing optical leakage in a moisture and heat test.

The objectives of the present invention will be achieved by the present invention that is the means described below.

[1] A method of manufacturing a hard coat film having a hard coat layer on at least one side of a transparent support, the method comprising curing a hard coat layer forming composition containing (a) to (d) below to form the hard coat layer, wherein the hard coat layer forming composition contains 10% by mass to 40% by mass of (a); 40% by mass to 89.8% by mass (b); (c) 0.1% by mass to 10% by mass of (c); and 0.1% by mass to 10% by mass of (d) based on 100% by mass of the total solid content in the hard coat layer forming composition:

(a) a compound having one alicyclic epoxy group and one ethylenically unsaturated double bond group in a molecule and having a molecular weight of 300 or less;

(b) a compound having three or more ethylenically unsaturated double bond groups in a molecule;

(c) a radical polymerization initiator; and (d) a cationic polymerization initiator.

[2] The method of manufacturing a hard coat film as described in [1], wherein the hard coat layer forming composition further contains (e) an inorganic fine particle reactive with an epoxy group or an ethylenically unsaturated double bond group in an amount of 5% by mass to 40% by mass based on 100% by mass of the total solid content in the hard coat layer forming composition.

[3] The method of manufacturing a hard coat film as described in [1] or [2], wherein the hard coat layer forming composition further contains (f) a UV absorber.

[4] The method of manufacturing a hard coat film as described in any one of [1] to [3], wherein a thickness ratio ($t_H/t_T$) of the transparent support thickness ($t_T$) to the hard coat layer thickness ($t_H$) is 0.2 to 0.7.

[5] The method of manufacturing a hard coat film as described in any one of [1] to [4], wherein the (a) is epoxycyclohexylmethyl(meth)acrylate.

[6] The method of manufacturing a hard coat film as described in any one of [1] to [5], wherein the transparent support is a cellulose acylate film and has a thickness of 25 μm or less.

[7] The method of manufacturing a hard coat film as described in any one of [1] to [6], wherein the transparent support is an acrylic resin film and has a thickness of 40 μm or less.

[8] The method of manufacturing a hard coat film as described in any one of [1] to [6], wherein the transparent support is a cellulose acylate film and comprises at least a compound represented by the following Formula I:

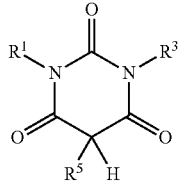

Formula I in Formula I, each of $R^1$, $R^3$ and $R^5$ independently represents a hydrogen atom, an alkyl group, a cycloalkyl group, an alkenyl group or an aromatic group, wherein the alkyl group, the cycloalkyl group, the alkenyl group and the aromatic group may have a substituent, provided that, any one of $R^1$, $R^3$ and $R^5$ is an alkyl group or a cycloalkyl group which is substituted with a group having a ring structure and the total number of the ring structures present in $R^1$, $R^3$ and $R^5$ is 3 or greater.

[9] A hard coat film manufactured by the method of manufacturing a hard coat film according to any one of [1] to [8].

[10] A polarizing plate comprising:

a polarizer; and at least one sheet of the hard coat film according to claim 9 as a protective film for the polarizer.

[11] A liquid crystal display device comprising:

a liquid crystal cell;

the polarizing plate according to [10] disposed on at least one side of the liquid crystal cell; and the hard coat film disposed on its outermost surface.

According to the present invention, it is possible to provide a hard coat film that inhibits curling or wrinkling without deteriorating the hardness of the film surface, thereby preventing the problem of clouding caused by bleeding out or the like in a moisture-heat environment. It is also possible to provide a hard coat film that also has sufficient UV absorbability when a transparent support has a thickness of 25 μm or less in addition to the above performance. Further, the present invention provides a polarizing plate and a liquid crystal display device having the hard coat film described above, exhibiting superior handling performance, being capable of preventing the display quality from deteriorating by curling or wrinkling and being capable of reducing optical leakage in a moisture and heat test.

DETAILED DESCRIPTION OF THE INVENTION

The compositional requirements of the invention will be described below based on the representative embodiments of the present invention, but not limited thereto. Also, a numerical range represented using the dash "to" means a range having the numerical values coming before and after "to" as the lower limiting value and the upper limiting value, respectively. The term "acrylic resin" is used to mean a resin obtained by polymerizing a derivative from a methacrylic acid or an acrylic acid and a resin containing the derivative. Unless otherwise specifically limited, the term "(meth)acrylate" refers to acrylate and methacrylate, and the term "(meth)acryl" refers to acryl and methacryl.

<Method of Fabrication of Hard Coat Film>

A method of manufacturing a hard coat film according to the present invention is a method of manufacturing a hard coat film that has a hard coat layer on at least one side of a transparent support and comprises the step of curing a hard coat layer forming composition containing at least (a) to (d) to form the hard coat layer, wherein based on 100% by mass of the total solid content in the hard coat layer forming composition, the hard coat layer forming composition contains 10% by mass to 40% by mass of (a), 40% by mass to 89.8% by mass of (b), 0.1% by mass to 10% by mass of (c), and 0.1% by mass to 10% by mass of (d):

(a) a compound having one alicyclic epoxy group and one ethylenically unsaturated double bond group in a molecule and having a molecular weight of 300 or less (b) a compound having three or more ethylenically unsaturated double bond groups in a molecule (c) a radical polymerization initiator (d) a cationic polymerization initiator.

Hereinafter, each of the components of the hard coat layer forming composition will be described in detail.

[(a) Compound Having One Alicyclic Epoxy Group and One Ethylenically Unsaturated Double Bond Group in a Molecule and Having a Molecular Weight of 300 or Less]

Described is (a) a compound having one alicyclic epoxy group and one ethylenically unsaturated double bond group in a molecule and having a molecular weight of 300 or less, which is contained in the hard coat layer forming composition according to the present invention. Also, the compound (a) having one alicyclic epoxy group and one ethylenically unsaturated double bond group in a molecule and having a molecular weight of 300 or less will also be referred to as "component (a)."

Examples of the ethylenically unsaturated double bond group may include a polymeric functional group, such as a (meth)acryloyl group, a vinyl group, a styryl group and an allyl group. Of these, preferred are a (meth)acryloyl group and —C(O)OCH=$CH_2$, and particularly preferred is a (meth)acryloyl group. The containment of the ethylenically unsaturated double bond makes it possible to maintain hardness at a high level and gives moist and heat resistance.

In the present invention, the respective number of epoxy groups and ethylenically unsaturated double bond groups contained in a molecule is limited to 1 because the containment of two or more for each functional group will increase the molecular weight and reduce the hardness.

The molecular weight of the component (a) is 300 or less, preferably 210 or less and more preferably 200 or less.

If the molecular weight exceeds 300, a moiety other than the epoxy group or ethylenically unsaturated double bond group will be increased to thereby deteriorate the hardness. It is possible to prevent the hardness from deteriorating by keeping the molecular weight equal to or less than 300.

Also, in terms of suppressing volatility upon hard coat layer forming, the molecular weight of the component (a) is preferably 100 or greater and more preferably 150 or greater.

The component (a) is not particularly limited as long as it comprises one alicyclic epoxy group and one ethylenically unsaturated double bond group in a molecule and the molecular weight is 300 or less. Preferred is a compound represented by the following Formula (1).

[Chem. 2]

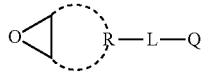

(1)

In Formula (1), R represents a monocyclic hydrocarbon or a cross-linking hydrocarbon, L represents a single bond or a divalent linking group, and Q represents an ethylenically unsaturated double bond group.

When R in Formula (1) is a monocyclic hydrocarbon, it is preferably an alicyclic hydrocarbon, more preferably an alicyclic group having 4 to 10 carbon atoms, still more preferably an alicyclic group having 5 to 7 carbon atoms, and particularly preferably an alicyclic group having 6 carbon atoms. Specific examples thereof may include a cyclobutyl group, a cyclopentyl group, a cyclohexyl group, and a cycloheptyl group, and particularly preferably a cyclohexyl group. When R in Formula (1) is a cross-linked hydrocarbon, it is preferably a bicyclic cross-linked hydrocarbon (bicyclo ring) or a tricyclic cross-linked hydrocarbon (tricyclo ring). Further included are a cross-linked hydrocarbon having 5 to 20 carbon atoms, a norbornyl group, a bornyl group, an isobornyl group, a tricyclodecyl group, a dicyclopentenyl group, a dicyclopentanyl group, a tricyclopentenyl group, a tricyclopentanyl group, an adamantly group, and a low alkyl-substituted adamantly group.

When L represents a divalent linking group, it is preferably a divalent aliphatic hydrocarbon group. The divalent aliphatic hydrocarbon group has preferably 1 to 6 carbon atoms, more preferably 1 to 3 carbon atoms, and still more preferably 1 carbon atom. The divalent aliphatic hydrocarbon group is preferably a straight, branched or cyclic alkylene group, more preferably a straight or branched alkylene group, and still more preferably a straight alkylene group.

Q may be a polymerizable functional group, such as a (meth)acryloyl group, a vinyl group and an allyl group. Of these, preferred are a (meth)acryloyl group and a —C(O)OCH=CH$_2$ and particularly preferred is a (meth)acryloyl group.

The compound (a) is not particularly limited to specific examples as long as it has one alicyclic epoxy group and one ethylenically unsaturated double bond group in a molecule and has a molecular weight of 300 or less. Also, a compound disclosed in paragraph [0015] of Japanese Patent Application Laid-Open No. 10-17614, a compound represented by the following Formula (1A) or (1B) and 1,2-epoxy-4-vinylcyclohexane may be used.

Of these compounds, a compound represented by the following Formula (1A) or (1B) is more preferable and a low molecular weight compound represented by the following Formula (1A) is still more preferable. In case of the compound represented by the following Formula (1A), its isomer is also preferred. In the following Formula (1A), L$_2$ represents a divalent aliphatic hydrocarbon group having 1 to 6 carbon atoms, preferably 1 to 3 carbon atoms, and still more preferably 1 carbon atom (epoxycyclohexylmethyl (meth)acrylate). By using these compounds, it is possible to achieve the higher level of performance for both of high hardness and low curling simultaneously.

[Chem. 3]

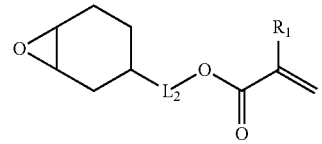

(1A)

In Formula (1A), R$_1$ represents a hydrogen atom or a methyl group and L$_2$ represents a divalent aliphatic hydrocarbon group having 1 to 6 carbon atoms.

[Chem. 4]

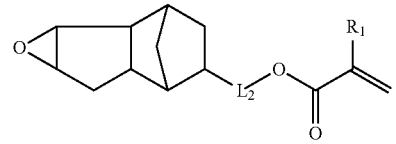

(1B)

In Formula (1B), R$_1$ represents a hydrogen atom or a methyl group and L$_2$ represents a divalent aliphatic hydrocarbon group having 1 to 3 carbon atoms.

The divalent aliphatic hydrocarbon represented as L$_2$ in Formulae (1A) and (1B) has 1 to 6 carbon atoms, more preferably 1 to 3 carbon atoms, and still more preferably 1 carbon atom. The divalent aliphatic hydrocarbon group is preferably a straight, branched or cyclic alkylene group, more preferably a straight or branched alkylene group, and still more preferably a straight alkylene group.

The component (a) is contained in an amount of 10% by mass to 40% by mass when the total solid content in the hard coat layer forming composition of the present invention is 100% by mass. If the content is less than 10% by mass, the effect of curl reduction or the effect of light leakage reduction in a liquid crystal display device is insufficient.

In addition, if the content is greater than 40% by mass, the curling deteriorates and the hardness is reduced.

The component (a) is preferably contained in an amount of 12% by mass to 35% by mass and more preferably 15% by mass to 25% by mass when the total solid content in the hard coat layer forming composition of the present invention is 100% by mass. (In this specification, mass ratio is equal to weight ratio.)

[(b) Compound Having Three or More Ethylenically Unsaturated Double Bond Groups in a Molecule]

Described is (b) a compound having three or more ethylenically unsaturated double bond groups in a molecule, which is contained in the hard coat layer forming composition of the present invention. The compound (b) having three or more ethylenically unsaturated double bond groups in a molecule will also be referred to as "component (b)."

Since the component (b) contains three or more ethylenically unsaturated double bond groups in its molecule, the component (b) is able to exhibit a high hardness.

Examples of the component (b) may include a polyhydric alcohol and a (meth)acrylic ester, a vinyl benzene and its derivative, a vinyl sulfone and a (meth)acrylamide. Of these, a compound having three or more (meth)acryloyl groups and an acrylate compound forming a highly rigid cured product widely used in the art may be used in terms of hardness. These compounds include esters of polyhydric alcohol and (meth)acrylic acid (such as pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetra methacrylate, polyurethane polyacrylate, polyester polyacrylate, and caprolactone-modified tris(acryloxyethyl)isocyanurate.

Specific examples of polyfunctional acrylate compounds comprising three or more (meth)acryloyl groups may include esterification products of polyols and (meth)acrylic acid, such as KAYARAD DPHA, KAYARAD DPHA-2C, KAYARAD PET-30, KAYARAD-TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60 and KAYARAD GPO-303 manufactured by Nippon Kayaku Co., Ltd. and V#400 and V#36095D manufactured by Osaka Organic Chemical Industry Ltd. Further examples that may be suitably used may include a tri- or higher functional urethane acrylate compound, such as SHIKOH UV-1400B, UV-1700B, UV-6300B, UV-7550B, UV-7600B, UV-7605B, UV-7610B, UV-7620EA, UV-7630B, UV-7640B, UV-6630B, UV-7000B, UV-7510B, UV-7461TE, UV-3000B, UV-3200B, UV-3210EA, UV-3310EA, UV-3310B, UV-3500BA, UV-3520TL, UV-3700B, UV-6100B, UV-6640B, UV-2000B, UV-2010B, UV-2250EA and UV-2750B (manufactured by The Nippon Synthetic Chemical Industry Co., Ltd.), UL-503LN (manufactured by Kyoeisha Chemical Co., Ltd.), UNIDIC 17-806, UNIDIC 17-813, UNIDIC V-4030 and UNIDIC V-4000BA (manufactured by DIC Corporation), EB-1290K, EB-220, EB-5129, EB-1830 and EB-4858 (manufactured by Daicel UCB), Hi-Corp AU-2010 and Hi-Corp AU-2020 (manufactured by Tookushiki Co., Ltd.), Aronix M-1960 (manufactured by Toagosei Co., Ltd.), ArtResin UN-3320HA, UN-3320HC, UN-3320HS, UN-904 and HDP-4T, and a tri- or higher functional polyester compound, such as Aronix M-8100, M-8030 and M-9050 (manufactured by Toagosei Co., Ltd.) and KBM-8307 (a product of Daicel-Cytec Company ltd).

Also, the component (b) may be composed of a single compound or may be a mixture of two or more compounds.

The component (b) is contained in an amount of from 40% by mass to 89.8% by mass when the total solid content in the hard coat layer forming composition of the present invention is 100 mass %. If the content is less than 40% by mass, it is impossible to achieve a sufficient hardness. Also, if the content is greater than 89.8% by mass, the content of the component (a) is reduced and thus the curing does not occur enough to reduce the curling.

In addition, the compositional ratio of the component (a) ranges preferably from 11% to 100%, more preferably from 15% to 60% and still more preferably from 20% to 40% with respect to the component (b).

By setting the compositional ratio of the component (a) to the component (b) as seen above, it is possible to form a strong network structure and prevent light leakage.

[(c) Radical Polymerization Initiator]

Described is (c) a radical polymerization initiator, which is contained in the hard coat layer forming composition of the present invention. The radical polymerization initiator (c) will also be referred to as "component (c)."

A polymerization of a compound having an ethylenically unsaturated group may be performed by irradiation with ionizing radiation or by heating in the presence of a photoradical polymerization initiator or a thermal radical polymerization initiator. As photo and thermal polymerization initiators, commercially available compounds may be used and such compounds are disclosed in "Recent UV Curing Technology" (see p. 15, published by Dakaus Kazuhiro at Gijutsu Joho Kyokai KK, 1991) or a catalogue issued by Chiba Specialty Chemicals.

Specific examples of the component (c) may include an alkylphenone-based photo polymerization initiator (such as Irgacure 651, Irgacure 184, DAROCURE 1173, Irgacure 2959, Irgacure 127, DAROCURE MBF, Irgacure 907, Irgacure 369 and Irgacure 379EG), an acyl phosphine oxide-based photo polymerization initiator (such as Irgacure 819 and LUCIRIN TPO), and others (such as Irgacure 784, Irgacure OXE01, Irgacure OXE02 and Irgacure 754).

When the total solid content in the hard coat layer forming composition of the present invention is 100% by mass, the component (c) is contained in an amount of 0.1% by mass to 10% by mass, preferably 1% by mass to 5% by mass, and more preferably 2% by mass to 4% by mass. If the content is less than 0.1% by mass, polymerization does not fully occur and thus the hardness of the hard coat layer is insufficient. In addition, if the content is greater than 10% by mass, UV beams do not reach the inside of the layer and thus the hardness of the hard coat layer is insufficient. Each of these radical initiators may be used either alone or in combination of two or more thereof.

[(d) Cationic Polymerization Initiator]

Descriptions will be made to (d) a cationic polymerization initiator contained in the hard coat layer forming composition of the present invention. The cationic polymerization initiator (d) will also be referred to as "component (d)."

As the component (d), known compounds, such as a photo-cationic polymerization initiator, photo-decolorants to colorants, photo-color changing agents, or known acid generators used in a microresist and the like, and combinations thereof may be used.

Examples thereof may include onium compounds, organic halogen compounds and disulfonic compounds. Specific examples of organic halogen compounds and disulfonic compounds include the same ones as listed for the compound capable of generating the radical.

Examples of onium compounds may include diazonium salts, ammonium salts, iminium salts, phosphonium salts, iodonium salts, sulfonium salts, arsonium salts, and cellenonium salts, and for instance, also include those compounds listed in paragraphs [0058] and [0059] of Japanese Patent Application Laid-Open No. 2002-29162.

As a cationic polymerization initiator that is particularly suitable for use in the present invention, onium salts may be used and diazonium salts, iodonium salts, sulfonium salts and iminium salts are preferred in terms of the photosensitivity upon initiation of photo-polymerization and the stability of a compound material. Of these, iodonium salts are most preferred in terms of light resistance.

Specific examples of the onium salt that may suitably be used in the present invention may include amylated sulfonium salts disclosed in paragraph [0035] of Japanese Patent Application Laid-Open No. 9-268205, diaryl iodonium salts or triaryl sulfonium salts disclosed in paragraphs [0010] and [0011] of Japanese Patent Application Laid-Open No. 2000-71366, sulfonium salts of thiobenzoic acid S-phenyl ester described in paragraph [0017] of Japanese Patent Application Laid-Open No. 2001-288205, and onium salts disclosed in paragraphs [0030] to [0033] of Japanese Patent Application Laid-Open No. 2001-133696.

Other examples thereof may include compounds such as organometallic/organic halogenated compounds, photo acid generators having an o-nitrobenzyl type protective group, and compounds that are photo-decomposed to generate a sulfonic acid (such as iminosulfonate), which are disclosed in paragraphs [0059] to [0062] of Japanese Patent Application Laid-Open No. 2002-29162.

Specific examples of the iodonium salt-based cationic polymerization initiator may include B2380 (manufactured by Tokyo Chemical Industry Co., Ltd.), BBI-102 (manufactured by Midori Kagaku), WPI-113, WPI-124, WPI-169 and WPI-170 (manufactured by Wako Pure Chemical Industries, Ltd.) and DTBPI-PFBS (Toyo Gosei Co., Ltd.).

As the component (d), a single compound may be used or two or more compounds may be used together. When the total solid content in the hard coat layer forming composition of the present invention is 100% by mass, the component (d) is contained in an amount of 0.1% by mass to 10% by mass and preferably 0.5% by mass to 3.0% by mass. These content ranges are preferable in terms of the stability and polymer reactivity of curable composition.

[(e) Inorganic Particle Reactive with an Epoxy Group or an Ethylenically Unsaturated Double Bond Group]

The hard coat layer forming composition according to the present invention preferably contains (e) an inorganic particle reactive with an epoxy group or an ethylenically unsaturated double bond group. The inorganic particle reactive with an epoxy group or an ethylenically unsaturated double bond group will also be referred to as component (e).

The addition of the inorganic particles is able to reduce the amount of cure shrinkage in a cured layer and thus reduce the film curling. Also, the use of inorganic particles reactive with an epoxy group or an ethylenically unsaturated double bond group makes it possible to improve pencil hardness. Examples of the inorganic particles may include a silica particle, titanium dioxide particle, zirconium oxide particle and aluminum oxide particle. Of these particles, a silica particle is preferred.

In general, since inorganic particles have low affinity with organic components, such as polyfunctional vinyl monomers, a simple mixture thereof may merely form an aggregate or tends to easily cause a crack in a cured layer. Thus, the component (e) in the present invention is treated on its surface with a surface modifier containing an organic segment in order to increase affinity between inorganic particles and organic components.

The surface modifier preferably comprises a functional group forming a bond with inorganic particles or absorbable to inorganic particles and a functional group having high affinity with organic components in a molecule. The surface modifier comprising a functional group bonded with or absorbable to inorganic particles is preferably a metal alkoxide surface modifier, such as slime, aluminum, titanium and zirconium or a surface modifier having an anionic group, such as a phosphoric group, a sulfuric acid, a sulfonic acid group and a carboxylic acid group. Also, a functional group having high affinity with organic components may only need to adjust the hydrophilic-hydrophobic balance, but preferred is a functional group capable of chemically bonding with organic components, and particularly preferred is an ethylenically unsaturated double bond group or a open-ring polymerizable group.

The preferred inorganic particle surface modifier in the present invention is a curable resin having a metal alkoxide or an anionic group and an ethylenically unsaturated double bond group or ring-opened polymerizable group in a molecule. By chemically bonding with organic components, the cross-linking density of a hard coat layer increases, which in turn increases the pencil hardness.

Representative examples of these surface modifiers may include an unsaturated double bond-containing coupling agent, a phosphoric acid-containing organic curable resin, a sulfuric acid-containing organic curable resin and a carboxylic acid-containing organic curable resin, as listed below.

| | |
|---|---|
| $H_2C=C(X)COOC_3H_6Si(OCH_3)_3$ | S-1 |
| $H_2C=C(X)COOC_2H_4OTi(OC_2H_5)_3$ | S-2 |
| $H_2C=C(X)COOC_2H_4OCOC_5H_{10}OPO(OH)_2$ | S-3 |
| $(H_2C=C(X)COOC_2H_4OCOC_5H_{10}O)_2POOH$ | S-4 |
| $H_2C=C(X)COOC_2H_4OSO_3H$ | S-5 |
| $H_2C=C(X)COO(C_5H_{10}COO)_2H$ | S-6 |
| $H_2C=C(X)COOC_5H_{10}COOH$ | S-7 |
| $CH_2CH(O)CH_2OC_3H_6Si(OCH_3)_2$ | S-8 |

(wherein X represents H or $CH_3$.)

Preferably, these inorganic fine particles are preferably subjected to surface modification in a solution. The inorganic fine particles may be mechanically micro-dispersed together with a surface modifier, or may first be micro-dispersed and then, after the addition of the surface modifier, stirred, or may be subjected to surface modification before micro-dispersed (optionally followed by heating, heating after drying or pH adjustment) and then micro-dispersed. A solution for dissolving the surface modifier is preferably an organic solvent having high polarity, and specifically a known solvent, such as alcohol, ketone, ester, etc.

When the total solid content in the hard coat layer forming composition of the present invention is 100% by mass, the omponent (e) is preferably contained in an amount of 5% by mass to 40% by mass and more preferably from 10 mass % to 30 mass % in terms of the balance between the hardness and brittleness of a coated layer.

The organic fine particles have a particle size (average primary particle size) of preferably 10 nm to 100 nm and more preferably 10 nm to 60 nm. The average particle size of fine particles can be obtained from an electron micrograph. If the particle size of inorganic fine particles is overly small, no improvement of hardness is achieved and if the particle size is overly large, it may increase a haze.

It is no matter whether inorganic fine particles have a spherical or non-spherical shape, but non-spherical shape in which 2 to 10 inorganic fine particles are connected is preferred in terms of giving hardness. It is presumed that by using inorganic fine particles having a chained shape in which several inorganic fine particles are connected, a strong particle network structure may be formed to thereby increase hardness.

Specific examples of inorganic fine particles may include ELECOM V-8802 (spherical silica fine particles having an average particle size of 12 nm manufactured by Nikki Kabushiki Kaisha) or ELECOM V-8803 (non-spherical silica fine particles manufactured by Nikki Kabushiki Kaisha), MiBK-SD (spherical silica fine particles having an average particle size of 10 nm to 20 nm manufactured by Nissan Chemical), MEK-AC-2140Z (spherical silica fine particles having an average particle size of 10 nm to 20 nm manufactured by Nissan Chemical), MEK-AC-4130C (spherical silica fine particles having an average particle size of 40 nm to 50 nm manufactured by Nissan Chemical), MiBK-SD-L (spherical silica fine particles having an average particle size of 40 nm to 50 nm manufactured by Nissan Chemical) and MEK-AC-5140 Z (spherical silica fine particles having an average particle size of 70 nm to 100 nm manufactured by Nissan Chemical). Of these, ELECOM V-8803, no-spherical silica fine particles, is preferred in terms of giving hardness.

[(f) UV Absorber]

The hard coat layer forming composition according to the present invention preferably comprises (f) UV absorber. The UV absorbent (f) will also be referred to as the component (f).

The UV absorber attributes to the improvement of film durability. Particularly in an aspect that uses a hard coat film as a surface protective film of an image display device, the addition of a UV absorber has a valid effect. UV absorbability may be imparted only to a transparent support. However, this function deteriorates as a transparent support becomes thinner. Thus, it is preferable to give UV absorbability to the hard coat layer as well. Examples of the UV absorber used in the present invention may include, although not specifically limited to, those compounds listed in paragraphs [0107] to [0185] of Japanese Patent Application Laid-Open No. 2006-184874. In particular, a polymer UV absorber is preferred and such a preferred polymer UV absorber is disclosed in Japanese Patent Application Laid-Open No. 6-148430.

The amount of the component (f) in use varies depending on the types of compound, use conditions, etc. However, when the total solid content in the hard coat layer forming composition according to the present invention is 100% by mass, the component (f) is contained in an amount of preferably 0.1% by mass to 10% by mass.

Examples of Component (1) may include UV-1 to UV-4, but not limited thereto.

[Chem. 5]

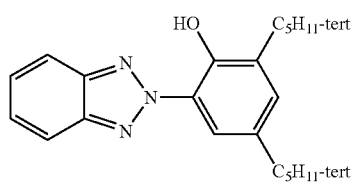

UV-1

[Chem. 6]

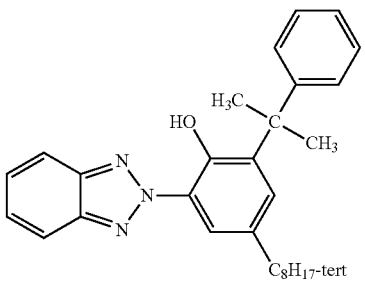

UV-2

[Chem. 7]

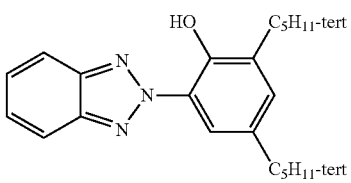

UV-3

[Chem. 8]

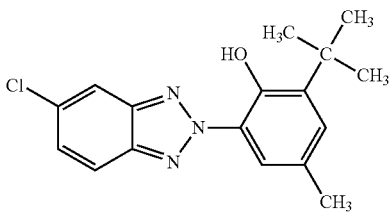

UV-4

When a UV absorber is used, it is preferred that the type of (c) radical polymerization initiator combined with the UV absorber is selected such that the absorption wavelength of the UV absorber and the radical initiator does not overlap with each other. Specifically, preferred are phosphineoxide-based compounds that absorbs light at a long wavelength, as follows: bis(2,4,6-trimethylbenzoyl)-phenlyphospineoxide (e.g., IRGACURE 819 manufactured by BASF), bis(2,6-dimethoxybenzoyl)-2,4,4-trimethly-pentylphosphineoxide, and 2,4,6-trimethylbenzoyl-diphenyl-phosphineoxide (e.g., LUCIRIN TPO manufactured by BASF). By using the radical initiator as listed above, it is possible to suppress the reduction of curing caused by the UV absorber. The type of (d) cationic polymerization initiator combined is preferably combined with IRGACURE PAG 103, IRGACURE PAG 121 and CGI 725, which have absorption at a long wavelength.

In addition to combining the initiator having absorption at a long wavelength with the UV absorbent as above, a curing accelerator (sensitizer) may be used together. By adding a sensitizer, it is possible to reduce the added amount of the initiator and a material may be selected from a broader range of materials. As a sensitizer that can be used tougher, a photo-sensitizer may be used, and specific examples thereof may include n-butylamine, triethylamine, try-n-butylphosphine, Michler's ketone, tioxanton, anthracene, diphenylbutadiene, distyryl benzene and acridone.

[Solvent]

The hard coat layer forming composition according to the present invention may contain a solvent. As a solvent, varies types of solvent selected may be used in terms of dissolving or decomposing each component, achieving a uniform in-plane in coating and drying, securing the preservability of liquid and having an appropriate saturation vapor pressure.

Two or more different types of solvent may be used in combination. Particularly in terms of drying load, it is preferred to contain a solvent having a boiling point of 100° C. or ower under atmospheric and room temperature as a main component and a solvent having a boiling point exceeding 100° C. in a small amount to adjust the drying speed.

The hard coat layer forming composition according to the present invention contain a solvent having a boiling point of 80° C. or less in an amount of preferably 30% by mass to 80% by mass and more preferably 50% by mass to 70% by mass relative to the total solvent content in the coating composition in order to prevent settling of particles. By limiting the compositional ratio of the solvent having a boiling point of 80° C. or less within the above ranges, it is possible to appropriately prevent a resin component from permeating into a transparent support, and also due to the increasing viscosity increase speed by drying, it is possible to suppress the settling of particles.

Examples of the solvent having a boiling point of 100° C. or less may include hydrocarbons such as hexane (boiling point: 68.7° C.), heptane (98.4° C.), cyclohexane (80.7° C.) and benzene (80.1° C.), halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.), ethers such as diethyl ether (34.6° C.), diisopropyl ether (68.5° C.), dipropyl ether (90.5° C.) and tetrahydrofuran (66° C.), esters such as ethyl formate (54.2° C.), methyl acetate (57.8° C.), ethyl acetate (77.1° C.) and isopropyl acetate (89° C.), ketones such as acetone (56.1° C.) and 2-butanone (=methyl ethyl ketone, 79.6° C.), alcohols such as methanol (64.5° C.), ethanol (78.3° C.), 2-propanol (82.4° C.) and 1-propanol (97.2° C.), cyano compounds such as acetonitrile (81.6° C.) and propionitrile (97.4° C.), and carbon disulfide (46.2° C.). Of these examples, ketones and esters are preferred and ketones are particularly preferred. Of ketones, 2-butanone is particularly preferred.

Examples of the solvent having a boiling point exceeding 100° C. may include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (=MIBK, 115.9° C.), 1-butanol (117.7° C.), N,N-dimethylformamide (153° C.), N,N-dimethylacetamide (166° C.) and dimethylsulfoxide (189° C.). Preferred are cyclohexanone and 2-methyl-4-pentanone.

[Surfactant]

The hard coat layer forming composition according to the present invention may be appropriate for use with various types of surfactant. Generally, a surfactant may prevent uneven layer thickness caused by unevenness of drying resulting from a local distribution of drying wind and the like.

Specific examples of the surfactant may preferably include a fluorine-based surfactant or a silicon-based surfactant or both thereof. Also, as the surfactant, oligomer or polymer is more preferred than a low molecular compound.

Preferred examples of the fluorine-based surfactant may include a fluoro aliphatic group-containing copolymer (sometimes referred to as a "fluorine-based polymer" hereinafter), and as the fluorine-based polymer, an acrylic or methacrylic resin containing a repeating unit corresponding to the following monomer (i) and a repeating unit corresponding to the following monomer (ii), or a copolymer with a vinyl-based monomer copolymerizable with these resins is useful.

(i) Fluoroaliphatic group-containing monomer represented by Formula A below:

[Chem. 9]

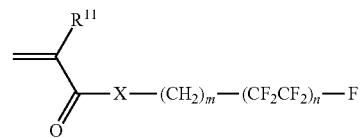

Formula A

In Formula A, $R^{11}$ represents a hydrogen atom or a methyl group, X represents an oxygen atom, a sulfur atom or —N(R12)-, m represents an integer of 1 to 6, and n represents an integer of 2 to 4. R12 represents a hydrogen atom or an alkyl group having 1 to 4 carbon atoms, specifically a methyl group, an ethyl group, a propyl group and a butyl group and preferably a hydrogen atom or a methyl group. X is preferably an oxygen atom.

(ii) Monomer represented by the following Formula B copolymerizable with the above monomer (i):

[Chem. 10]

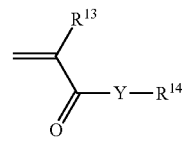

Formula B

In Formula B, $R^{13}$ represents a hydrogen atom or a methyl group, Y represents an oxygen atom, a sulfur atom or —N(R15)-, R15 represents a hydrogen atom or an alkyl group having 1 to 4 carbon atoms, specifically a methyl group, an ethyl group, a propyl group and a butyl group and preferably a hydrogen atom or a methyl group. Y is preferably an oxygen atom, —N(H)— and —N(CH$_3$)—.

$R^{14}$ represents a straight, branched or cyclic alkyl group having 4 to 20 carbon atoms. Examples of the substituent of the alkyl group represented by $R^{14}$ may include a halogen atom such as a hydroxyl group, an alkyl carbonyl group, aryl carbonyl group, a carboxyl group, an alkyl ether group, an aryl ether group, a fluorine atom, a chlorine atom and a bromine atom, a nitro group, a cyano group and an amino group, but are not limited thereto. As a straight, branched or cyclic alkyl group having 4 to 20 carbon atoms, a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group and an eicosenyl group, which may be linear or branched, a monocyclic cycloalkyl group such as a cyclohexyl group and a cycloheptyl group, and a polycyclic cycloalkyl group such as a bicycloheptyl group, a bicyclodecyl group, a tricycloundecyl group, a tetracyclododecyl group, an adamantly group, a norbonyl group and a tetracyclodecyl group are appropriately used.

These fluoroaliphatic group-containing monomers represented by Formula A used in a fluorine-based polymer is contained in an amount of 10 mol %, preferably from 15 mol % to 70 mol % and more preferably from 20 mol % to 60 mol % based on each monomer in the fluorine-based polymer.

A fluorine base polymer preferably has an average mass molecular weight of ranging from 3,000 to 100,000 and more preferably 5,000 to 80,000. Also, the fluorine base polymer is added in amount of preferably 0.001 parts by mass to 5 parts by mass, more preferably from 0.005 parts by mass to 3 parts by mass, and still more preferably 0.01 parts by mass to 1 part by mass relative to 100 parts by mass of the coating liquid. If the content of the fluorine-based polymer is 0.001 parts by mass or greater, the resulting effect is sufficient, and if the content is 5 parts by mass or less, no problems, such as failing to fully drying the coating layer or deteriorating the performance of the coating layer, are raised.

Preferred examples of the silicone-based compound may include, but are not limited to, "X-22-174DX," "X-22-2426," "X22-164C" and "X-22-176D" (all trade names), manufactured by Shin Etsu Chemical Co., Ltd.; "FM-7725," "FM-5521" and "FM-6621" (all trade names) manufactured by Chisso Corp.; "DMS-U22" and "RMS-033" (both trade names) manufactured by Gelest; "SH200," "DC11PA," "ST80PA," "L7604," "FZ-2105," "L-7604," "Y-7006" and "SS-2801" (all trade names) manufactured by Dow Corning Toray Silicone Co., Ltd.; and "TSF400" (trade name) manufactured by Momentive Performance Materials Japan, Inc.

The silicon-based surfactant is contained in an amount of preferably 0.01% by mass to 0.5% by mass and more preferably 0.01% by mass to 0.3% by mass when the total solid content in the hard coat layer forming composition according to the present invention is 100% by mass.
(Matt Particle)

The hard coat layer may contain a matt particle having an average particle size of from 1.0 μm to 10.0 μm and preferably 1.5 μm to 5.0 μm, for purposes of imparting inner dispersity or surface unevenness. Also, the matt particles are contained in an amount of preferably 1.0% by mass to 30% by mass and more preferably 5% by mass to 20% by mass based on 100% by mass of the total solid content in the hard coat layer forming composition. Also, in order to adjust the viscosity of the coating liquid, a polymer compound or an inorganic layer type compound may be contained. The component (e) may be used as the matt particle.
[Transparent Support]

As a material for forming a transparent support in the present invention, a polymer superior in terms of optical transparency, mechanical strength, thermal stability, isotropy, etc. is preferred. Transparency in the present invention means that the transmissivity of visible light is 60% or greater, preferably 80% or greater, and particularly preferably 90% or greater. For instance, examples of the polymer may include polycarbonate-based polymers, polyester-based polymers such as polyethyleneterephthalate or polyethylenenaphthalate, (meth)acrylic-based polymers such as polymethylmethacrylsate, and styrene-based polymers such as polystyrene or acrylonitrile styrene copolymer (AS resin). Also, polyolefins such as polyethylene and polypropylene, polyolefin-based polymers such as a copolymer of ethylene and propylene, vinyl chloride polymers, amide-based polymers such as nylon or aromatic polyamide, imide-based polymers, sulfone-based polymers, polyethersulfone-based polymers, polyetheretherketone-based polymers, polyphenylene sulfide based polymers, vinylidene chloride based polymers, vinyl butyral based polymers, allylate based polymers, polyoxymethylene based polymers, epoxy based polymers and mixtures of the above-mentioned polymers. A film comprising two or more layers of resin film may also be used.

As a material for forming the transparent support in the present invention, cellulose-based polymers represented by triacetyl cellulose (particularly preferably cellulose acylate), which has been used as a transparent protective film in a conventional polarizing plate, may also be preferred. Also, an acrylic film, which has recently been suggested as a polarizing plate protective film, may be preferred.

The transparent support formed to a thickness of approximately 10 μm to 1,000 μm may be used. Preferably, the thickness ranges from 10 μm to 80 μm, more preferably from 15 μm to 40 μm and still more preferably 15 μm to 30 μm. By making the transparent support thinner, it is possible to reduce the overall thickness of the film.

In a preferred aspect of the transparent support, a film comprising a compound represented by the following Formula I. Although a detailed mechanism is unclear, a film comprising a compound represented by the following Formula I is used as a transparent support, thereby improving the visibility of a display device even when the thickness of the transparent support is reduced. Use in combination with the hard coat layer forming composition according to the present invention may effectively function to suppress the reduction of visibility in a display device caused due to the moisture and heat and the lapse of time.
(Compounds Represented by Formula I)

[Chem. 11]

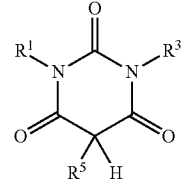

Formula I

In Formula I, each of $R^1$, $R^3$ and $R^5$ independently represents a hydrogen atom, an alkyl group, a cycloalkyl group, an alkenyl group or an aromatic group. The alkyl group, cycloalkyl group, alkenyl group and aromatic group may have a substituent. Any one of $R^1$, $R^3$ and $R^5$ is an alkyl group or a cycloalkyl group which is substituted with a group having a ring structure. Also, the total number of the ring structures present in $R^1$, $R^3$ and $R^5$ is equal to or greater than 3.

In $R^1$, $R^3$ and $R^5$, the alkyl group preferably has 1 to 20 carbon atoms, more preferably 1 to 10 carbon atoms, still more preferably 1 to 5 carbon atoms, and particularly preferably 1 to 3 carbon atoms. Of these, a methyl group or an ethyl group is preferred. In case of an alkyl group which is substituted with a group having a ring structure, it preferably has 7 to 20 carbon atoms, more preferably 7 to 12 carbon atoms, and still more preferably 7 to 10 carbon atoms. In an alkyl group having a ring structure, the ring structure may be an aromatic ring (including an aromatic heterocyclic ring) or may be an aliphatic ring. Preferred is an aromatic hydrocarbon ring or an aliphatic ring.

In $R^1$, $R^3$ and $R^5$, the cycloalkyl group preferably has 3 to 20 carbon atoms, more preferably 3 to 10 carbon atoms, still more preferably from 4 to 8 carbon atoms, and particularly preferably 5 or 6 carbon atoms. Specific examples of the cycloalkyl group preferably may include cyclopropyl, cyclopentyl and cyclohexyl. Cyclohexyl is particularly preferred.

In $R^1$, $R^3$ and $R^5$, the alkenyl group preferably has 2 to 20 carbon atoms, more preferably 2 to 10 carbon atoms, and still more preferably 2 to 5 carbon atoms. Examples thereof may include vinyl and allyl.

In $R^1$, $R^3$ and $R^5$, the aromatic group may be an aromatic hydrocarbon group or a aromatic heterocyclic ring group. Preferred is an aromatic hydrocarbon group. The aromatic group preferably has 6 to 20 carbon atoms, more preferably 6 to 16 carbon atoms, and still more preferably 6 to 12 carbon atoms.

Of aromatic groups, an aromatic hydrocarbon group may preferably be phenyl and naphthyl. More preferred is phenyl.

Each of the above groups in $R^1$, $R^3$ and $R^5$ may have a substituent.

Although not specifically limited, examples of the substituent may include an alkyl group (preferably having 1 to 10 carbon atoms, such as methyl, ethyl, isopropyl, t-butyl, pentyl, heptyl, 1-ethylpentyl and benzyl), an alkenyl group (preferably having 2 to 20 carbon atoms, such as vinyl, allyl and oleyl), an alkynyl group (preferably having 2 to 20 carbon atoms, such as ethinyl, 2-butynyl and phenylethinyl), a cycloalkyl group (preferably having 3 to 20 carbon atoms, such as cyclopropyl, cyclopentyl, cyclohexyl and 4-methyl cyclohexyl), an aryl group (preferably having 6 to 26 carbon atoms, such as phenyl, 1-naphthyl, 4-methoxyphenyl, 2-chlorophenyl and 3-methylphenyl), a heterocyclic group (preferably having 0 to 20 carbon atoms, wherein the ring constituting heteroatoms are preferably an oxygen atom, a nitrogen atom and a sulfur atom, the ring may be a 5-membered or 6-membered ring, which may be condensed to a benzene ring or a heterocyclic ring, such as 2-pyridinyl, 3-pyridinyl, 4-pyridinyl, 2-imidazolyl, 2-benzimidazolyl, 2-thiazolyl and 2-oxazolyl), an alkoxy group (preferably having 1 to 20 carbon atoms, such as methoxy, ethoxy, isopropyloxy and benzyloxy), an aryloxy group (preferably having 6 to 26 carbon atoms, such as phenoxy, 1-naphthyloxy, 3-methylphenoxy and 4-methoxyphenoxy), an alkylthio group (preferably having 1 to 20 carbon atoms, such as methylthio, ethylthio, isopropylthio and benzylthio), an arylthio group (preferably having 6 to 26 carbon atoms, such as phenylthio, 1-naphthylthio, 3-methylphenylthio and 4-methoxyphenylthio), a sulfonyl group (preferably an alkyl- or aryl-sulfonyl group and preferably having 1 to 20 carbon atoms, such as methylsulfonyl, ethylsulfonyl, benzene sulfonyl and toluene sulfonyl), an acyl group (including an alkylcarbonyl group, an alkenylcarbonyl group, an arylcarbonyl group and a heterocyclic carbonyl group and preferably having 20 carbon atoms or less, such as acetyl, pyvaloyl, acryloyl, methacryloyl, benzoyl and nicotinoyl), an alkoxycarbonyl group (preferably having 2 to 20 carbon atoms, such as ethoxycarbonyl and 2-ethylhexyloxycarbonyl), an aryloxycarbonyl group (preferably having 7 to 20 carbon atoms, such as phenyloxycarbonyl and naphthyloxycarbonyl), an amino group (including an amino group, an alkylamino group, an arylamino group and a heterocyclic amino group and preferably having 0 to 20 carbon atoms, such as amino, N,N-dimethylamino, N,N-diethylamino, N-ethylamino, anilino, 1-pyrrolidinyl, piperidino and morphonyl), a sulfonamide group (preferably an alkyl- or aryl-sulfonamide group and preferably having 0 to 20 carbon atoms, such as N,N-dimethyl sulfonamide and N-phenyl sulfonamide), a sulfamoyl group (preferably an alkyl- or aryl-sulfamoyl group and preferably having 0 to 20 carbon atoms, such as N,N-dimethylsulfamoyl and N-phenylsulfamoyl), an acyloxy group (preferably having 1 to 20 carbon atoms, such as acetyloxy and benzoyloxy), a carbamoyl group (preferably an alkyl- or aryl-carbamoyl group and preferably having 1 to 20 carbon atoms, such as N,N-dimethylcarbamoyl and N-phenylcarbamoyl), an acylamino group (preferably having 1 to 20 carbon atoms, such as acetylamino, acryloylamino, benzoylamino and nicotinamide), a cyano group, a hydroxyl group, a mercapto group, a carboxyl group or a halogen atom (such as a fluorine atom, a chlorine atom, a bromine atom and an iodine atom).

The above substituents may be further substituted by the above substituents. Examples thereof may include a perfluoroalkyl group such as trifluoromethyl, an aralkyl group, and an alkyl group substituted with an acyl group.

Also, these substituents are applied in the substituents for the compounds disclosed in the specification as well as the substituents that each group of $R^1$, $R^3$ and $R^5$ may have.

Herein, of the above substituents which may be possessed by each group of $R^1$, $R^3$ and $R^5$, an alkyl group, an aryl group, an alkoxy group, an alkylthio group, an alkylsufonyl group, a halogen atom, and an acyl group are preferred, and an alkyl group, an aryl group, an alkoxy group, and an acyl group are more preferred, and an alkyl group and an alkoxy group are still more preferred.

In the compound represented by Formula 1, any of $R^1$, $R^3$ and $R^5$ is an alkyl group or a cycloalkyl group which is substituted with a group having a ring structure, and preferably an alkyl group which is substituted with a group having a ring structure.

Of them, it is preferred that $R^5$ is an alkyl group or a cycloalkyl group which is substituted with a group having a ring structure.

Herein, the ring of a group having a ring structure is preferably a benzene ring, a naphthalene ring, a cyclopentane ring, a cyclohexane ring and a nitrogen-containing hetero aromatic ring (such as a pyrrol ring, a pyrazole ring, an imidazole ring, an oxazole ring, a thiazole ring, a pyrridine ring, an indole ring, and an isoindole ring).

Also, in the compound represented by Formula I, at least two of $R^1$, $R^3$ and $R^5$ are preferably an alkyl group or a cycloalkyl group having a ring structure as a substituent. Among others, each of $R^1$ and $R^3$ is preferably independently an alkyl group which may have a substituent, an aromatic group which may have a substituent or a cycloalkyl group.

In the compound represented by Formula I, it is more preferred that the substituent of $R^1$, $R^3$ and $R^5$ has up to 4 ring structures.

$R^5$ is preferably an alkyl group or a cycloalkyl group which may be substituted with a group having a ring structure or an acyl group, more preferably an alkyl group which is substituted with an aryl group, an alkyl group or a cycloalkyl group which is substituted with an acyl group, and still more preferably an alkyl group or a cycloalkyl group which is substituted with an aryl group.

Hereinafter, the above-described preferred alkly group or cycloalkyl group in $R^5$ will be further described.

Of the alkyl groups, examples of an unsubstituted alkyl group may include methyl, ethyl, propyl, isopropyl, n-butyl, n-hexyl, 2-ethylhexyl and n-octyl.

Examples of an alkyl group which is substituted with a group having a ring structure may include an aralkyl group, such as benzyl, phenetyl, 3-phenylpropyl and naphthylmethyl, pyridine-2-ylmethyl, pyridine-3-ylmethyl, pyridine-4-ylmethyl and indole-3-ylmethyl.

Examples of an acyl group in an alkyl group which is substituted with the acyl group may preferably include an alkylcarbonyl group, a cycloalkylcarbonyl group and an aryl carbonyl group. Of these, a cycloalkylcarbonyl and an aryl carbonyl group having a ring structure are preferred. Particularly preferred is an arylcarbonyl group.

Examples of the alkylcarbonyl group may include acetyl, propionyl, butyryl and pivaloyl, examples of the cycloalkycarbonyl group may include cyclopropylcarbonyl, cyclophentylcarbonyl, and cyclohexycarbonyl, and examples of the arylcarbonyl group may include benzoyl, toluoyl and naphtoyl.

Examples of the alkyl group which is substituted with an acyl group may include a 2-acylethyl group, a 3-acylpropyl group and a 2-acypropyl group and preferably a 2-acylethyl group.

Examples of the cycloalkyl group may include those illustrated in $R^1$, $R^3$ and $R^5$.

Although a mechanism is unclear, it is believed that the wavelength of light absorbed by the compound represented by Formula I becomes shorter by suppressing the extension of the conjugated structure by $R^5$. It is believed that this compound effectively works with the material for the transparent support, thereby suppressing the coloring occurring over time and improving the adhesion to the hard coat layer.

Of the compounds represented by Formula I, preferred compounds may be listed as seen below.

A compound where at least one of $R^1$, $R^3$ and $R^5$ is an aromatic ring-substituted alkyl group.

Also, of aromatic ring-substituted alkyl groups, an alkyl group which is substituted with one or two aryl groups is preferred (in a case where two aryl groups are substituted, substitution to the same carbon atom is preferred). In addition, an aryl group and an acyl group (preferably an aryloyl group) are preferably substituted to the alkyl group.

A compound in which any one of $R^1$, $R^3$ and $R^5$ is a group including a cycloalkyl group, and preferably a group including a cycloalkyl group is a cycloalkyl group.

In a case where "the total number of ring structures present in $R^1$, $R^3$ and $R^5$ is 3 or greater," the ring structures include, in addition to a case where the basic structure of the substituent of $R^1$, $R^3$ and $R^5$ has a ring structure per se, a case where the substituent which may be possessed by $R^1$, $R^3$ and $R^5$ has a ring structure, as already illustrated.

As the ring structure as above, a saturated cyclic hydrocarbon structure or an aromatic ring structure (an aromatic hydrocarbon structure or an aromatic heterocyclic ring) is preferred. Also, the ring structure may be a condensed ring structure.

Where the ring structure is a saturated cyclic hydrocarbon structure, the saturated cyclic hydrocarbon structure preferably exists as a cycloalkyl group having 3 to 20 carbon atoms. More specifically, a cyclopropyl group, a cyclopentyl group or a cyclohexyl group is more preferred and a cyclohexyl group is particularly preferred.

Also, if the ring structure is an aromatic ring structure, an aromatic hydrocarbon structure is preferred. The aromatic hydrocarbon structure exists preferably as an aryl group having 6 to 20 carbon atoms. More specifically, a benzene ring and a naphthalene ring are preferred, and a benzene ring is particularly preferred.

The ring structure may have a substituent. In case of having a substituent, the preferred scope of the substituent is the same as the substituent which may be possessed by each group of $R^1$, $R^3$ and $R^5$.

The compound represented by Formula I is more preferred where $R^1$, $R^3$ and $R^5$ are alkyl groups, alkenyl groups or aryl groups. Also, each of $R^1$, $R^3$ and $R^5$ more preferably has one or more ring structures and still more preferably has one ring structure.

The molecular weight of the compound represented by Formula I is preferably 250 to 1,200, more preferably 300 to 800 and particularly preferably 350 to 600.

By limiting the molecular weight to these ranges, the compound represented by Formula I is superior in suppressing volatilization from a film, thereby resulting in a highly transparent film.

The compound represented by Formula I will be described with reference to specific examples below, but not limited thereto.

[Chem. 12]

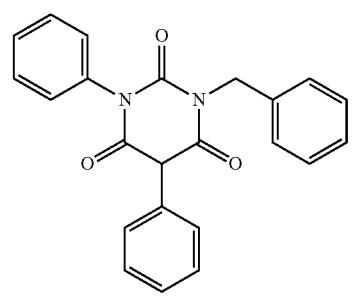

A-1

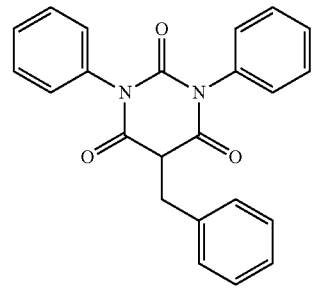

A-2

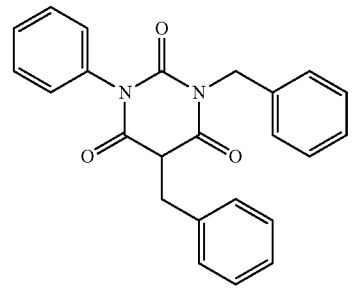

A-3

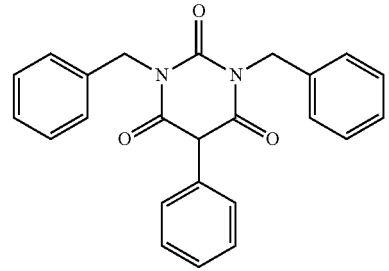

A-4

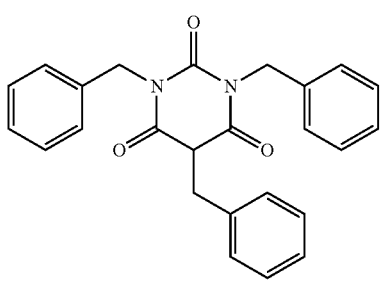
A-5
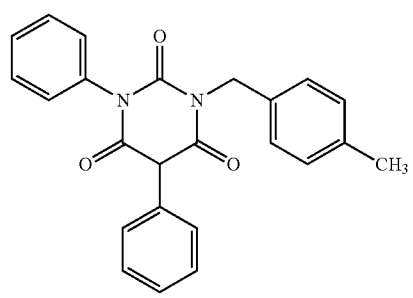
A-10
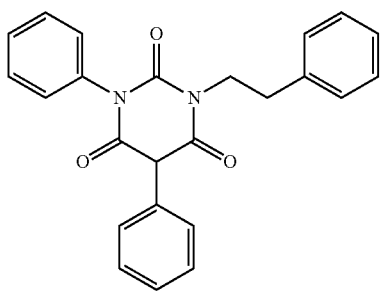
A-6
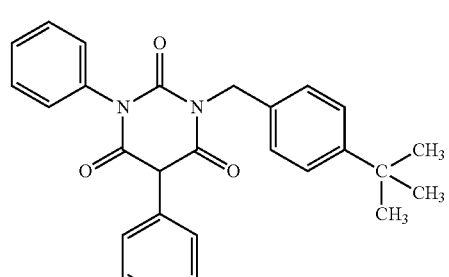
A-11
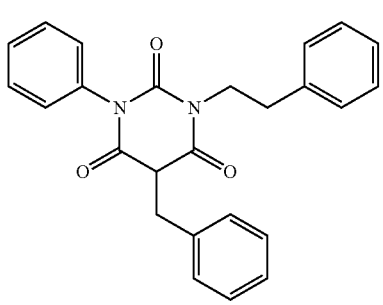
A-7
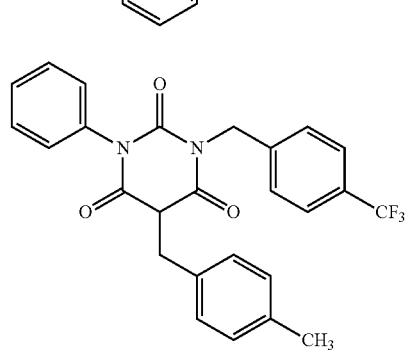
A-12
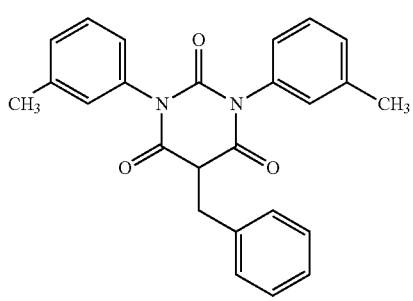
A-8
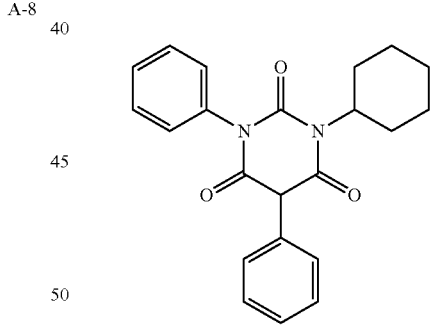
A-13
[Chem. 13]
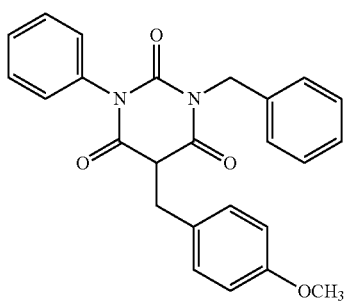
A-9
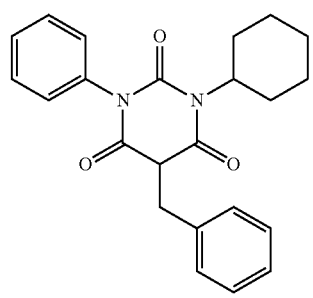
A-14

A-15
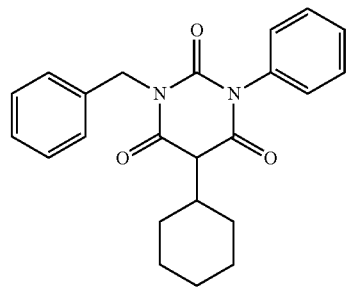
A-16
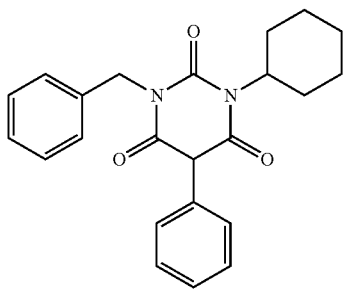
A-17
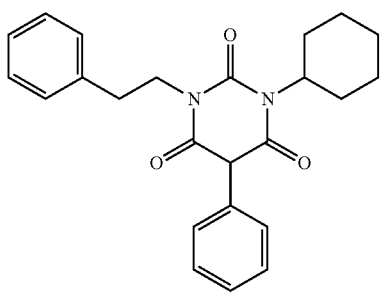
A-18
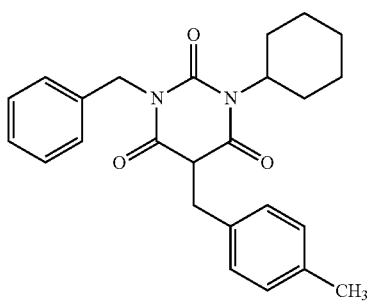
A-19
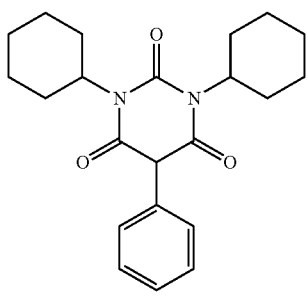
[Chem. 14]
A-20
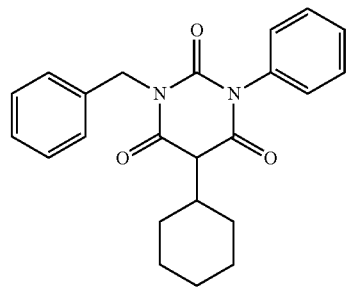
A-21
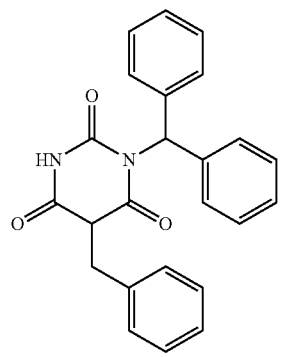
A-22
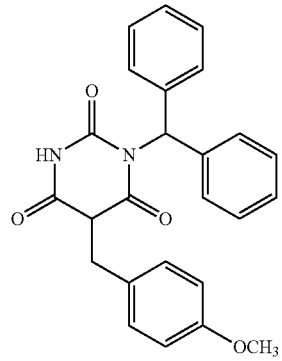
A-23
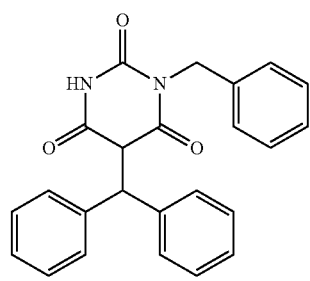

A-24
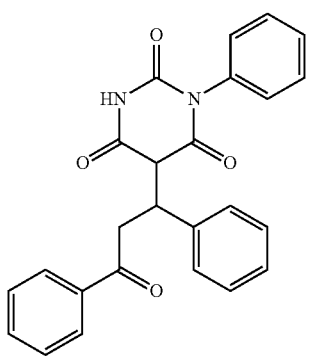
[Chem. 15]
A-25
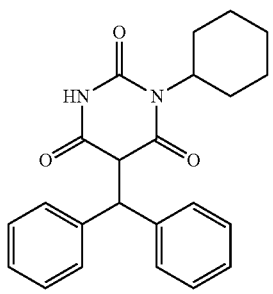
A-26
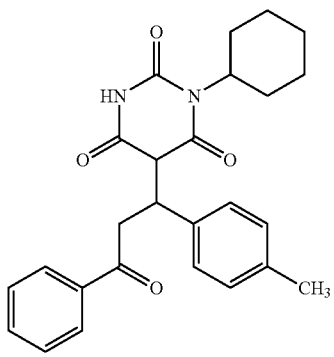
A-27
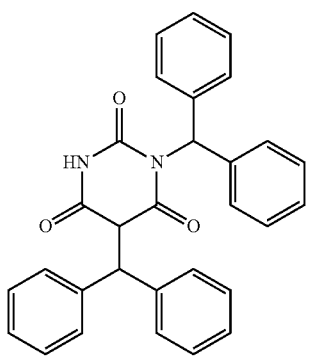
A-28
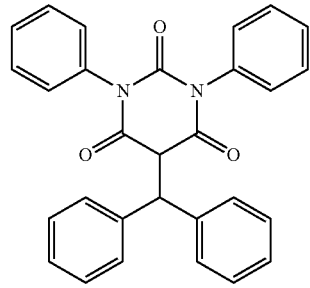
A-29
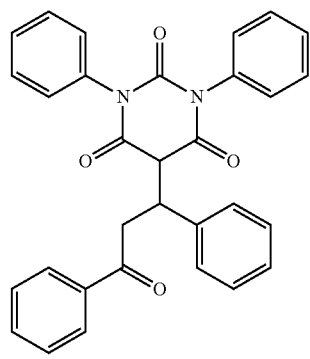
A-30
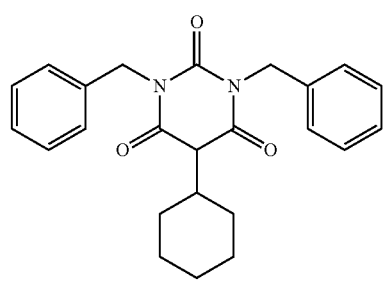
A-31
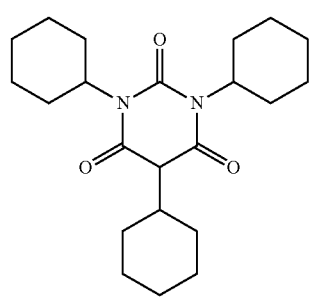
A-32
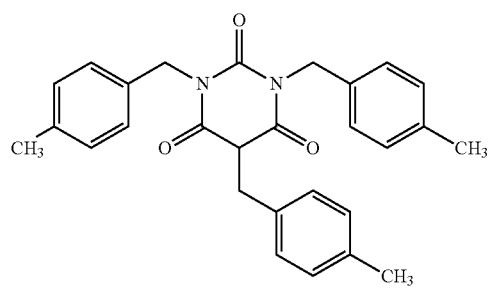

A-33 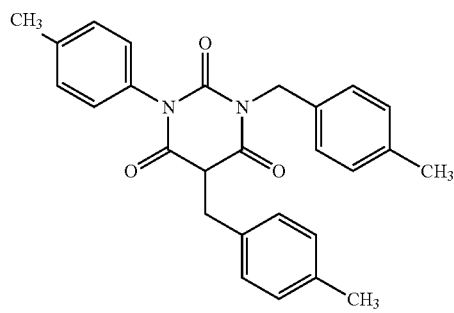
A-34 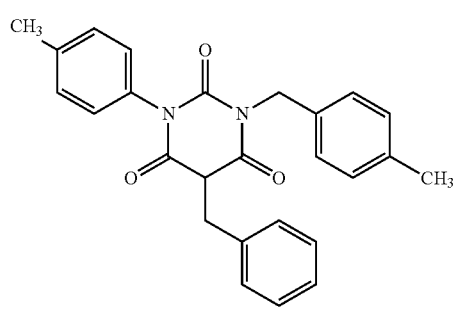
A-35 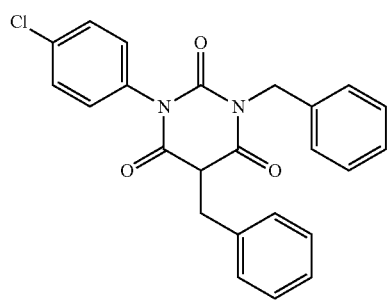
A-36 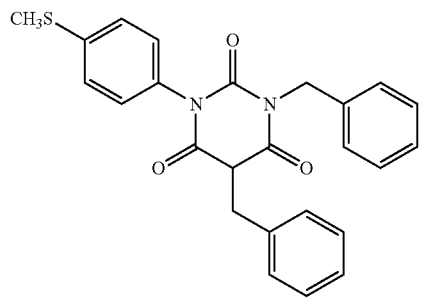
A-37 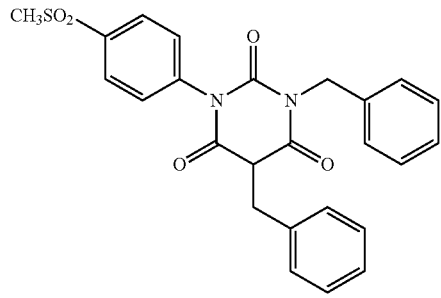
[Chem. 16]
A-38 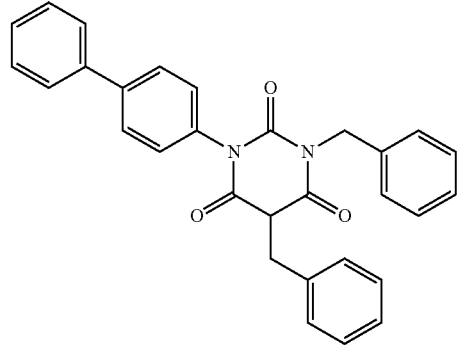
A-39 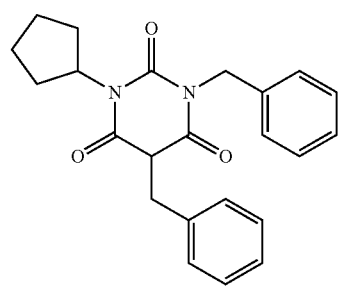
A-40 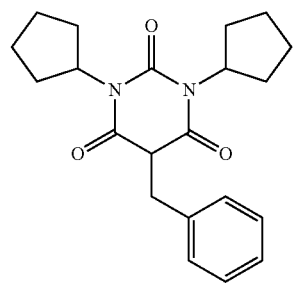
[Chem. 17]
A-41 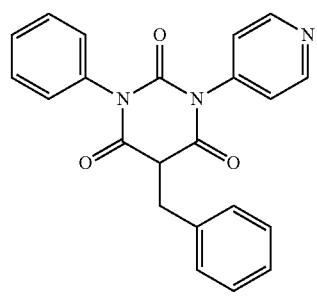
A-42 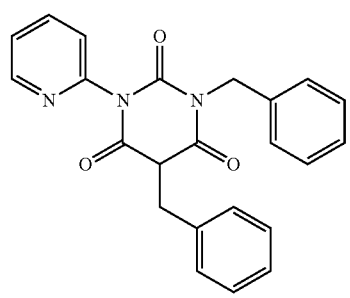

A-43 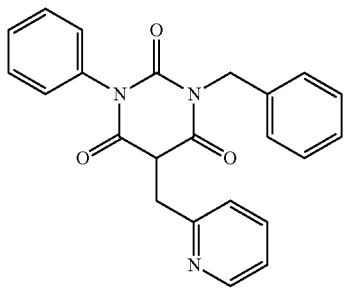

A-44 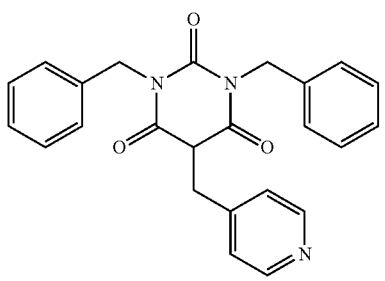

A-45 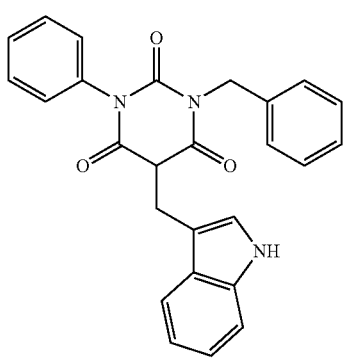

A-46 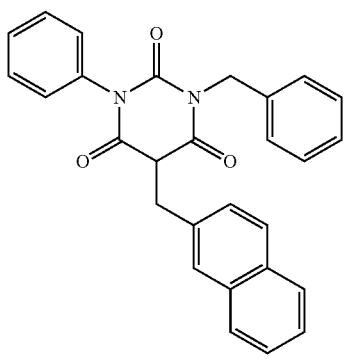

A-47 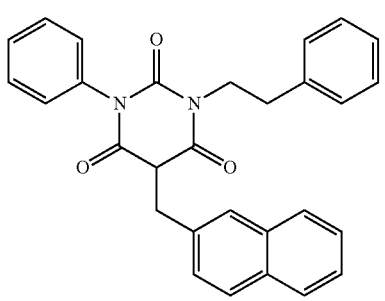

A-48 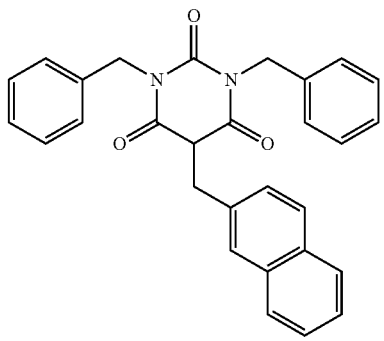

The compound represented by Formula I has been known as being synthesized using a barbituric acid synthesis that condenses a derivative of urea and a derivative of malonic acid. Barbituric acid having two substituents on a nitrogen atom is obtained by heating an N,N'-disubstituted urea and a chloride malonate or blending and heating the N,N'-disubstituted urea and an activator, such as a malonic acid or acetic anhydride. For instance, methods disclosed in Journal of the American Chemical Society, Vol. 61, p. 1,015 (1939), Journal of Medicinal Chemistry, Vol. 54, p. 2,409 (2011), Tetrahedron Letters, Vol. 40, p. 8,029 (1999), the PCT pamphlet of International Publication No. 2007/150011, etc.

The malonic acid used in condensation may be unsubstituted or may have a substituent. If a malonic acid having a substituent corresponding to $R^5$ is used, it is possible to synthesize the compound represented by Formula I by constructing a barbituric acid. Also, if an unsubstituted malonic acid and a urea derivative are condensed, a 5-position unsubstituted barbituric acid is obtained and by modifying this, the compound represented by Formula I may be synthesized.

As a method of modifying the 5-position, an addition reaction, such as a nucleophilic substitution reaction with a halogenated alkyl or the like or Michael addition, may be used. Preferably, a method that generates an alkylidene or an arylidene compound by a dehydration synthesis with aldehyde or ketone and thereafter reduces a double bond may be used. For instance, a zinc reduction method is disclosed in Tetrahedron Letters, Vol. 44, p. 2,203 (2003), a contact reduction method is disclosed in Tetrahedron Letters, Vol. 42, p. 4,103 (2001) or the Journal of the American Chemical Society, Vol. 119, p. 12,849 (1997) and a reduction by NaBH4 is disclosed in Tetrahedron Letters, Vol. 28, p. 4,173 (1987). All of these methods are synthesis methods that may preferably be used in case of having an aralkyl group or a cycloalkyl group at the 5-position.

Also, methods of synthesizing the compound represented by Formula I are not limited to the above-listed ones.

The content of the compound represented by Formula I in a transparent support is not specifically limited, but is preferably 0.1 parts by mass to 20 parts by mass, more preferably 0.2 parts by mass to 15 parts by mass and particularly preferably 0.3 parts by mass to 10 parts by mass relative to 100 parts by mass of the resin forming a transparent substrate.

By limiting the added amount of the compound represented by Formula I, it is possible to effectively lower the moisture permeability and suppress the generation of a haze.

The compound represented by Formula I may be added in the form of a hydrate, a solvate or a salt. According to the present invention, the hydrate may contain an organic solvent, and the solvate may contain water. In other words, the "hydrate" and "solvate" include a mixture solvate containing both water and organic solvent.

Examples of a solvent contained in the solvate may include all of generally used organic solvents. Specific examples may include alcohol (such as methanol, ethanol, 2-propanol, 1-butanol, 1-methoxy-2-propanol and t-butanol), ester (e.g., ethyl acetate), a hydrocarbon (either an aliphatic or aromatic hydrocarbon, such as toluene, hexane and heptane), ether (such as diethyl ether and tetrahydrofuran), nitryl (such as acetonitryl), and ketone (such as acetone and 2-butanone). Preferable examples may include a solvate of alcohol, and more preferable examples may include methanol, ethanol, 2-propanol and 1-butanol. These solvents may be reactive solvents used in synthesizing the compound represented by Formula I or solvents used in crystalizing and purifying after the synthesis or a mixture solvent thereof.

Also, two or more types of solvent may be contained simultaneously or water and a solvent may be contained (such as water and alcohol (such as methanol, ethanol and t-butanol)).

A salt includes an acid addition salt formed of an inorganic or organic acid. The inorganic acid includes a halogen acid (a hydrochloric acid and a hydrobromic acid), a sulfuric acid and a phosphoric acid. The organic acid includes an acetic acid, a trifluoroacetic acid, an oxalic acid and a citric acid, and further an alkansulfonic acid (methanesulfonic acid), an arylsulfonic acid (a benzenesulfonic acid, a 4-toluenesulfonic acid, and a 1,5-naphthalenedisulfonic acid).

The salt also includes a salt obtained when an acidic part existing in a parent compound is substituted by a metal ion (such as an alkali metal salt, such as a sodium salt or a potassium salt, an alkaline earth metal salt such as a potassium salt or a magnesium salt, an ammonium salt, an alkali metal ion, an alkaline earth metal ion or an aluminum ion) or prepared with an organic salt (ethanol amine, diethanol amine, triethanol amine, morpholine, piperidine), but not limited thereto. Of these, a sodium salt and a potassium salt are preferred.

(Polycondensation Ester Plasticizer)

In a preferred aspect, a film comprising a polycondensation ester compound may be used as a transparent support. More specifically, a polycondensation ester compound preferably contains a polycondensation ester plasticizer. The containment of the polycondensation ester plasticizer may improve the visibility of a display device even when the thickness of the transparent support is reduced.

The polycondensation ester plasticizer is obtained by polycondensation of at least one type of dicarboxylic acid represented by the following Formula (a) illustrated below and at least one type of diol represented by the following Formula (b) illustrated below:

[Chem. 18]

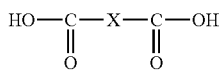

Formula (a)

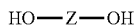

Formula (b)

In Formulae (a) and (b), X represents a divalent aliphatic group having 2 to 18 carbon atoms or a divalent aromatic group having 6 to 18 carbon atoms, and Z represents a divalent aliphatic group having 2 to 8 carbon atoms.

Herein, a divalent aliphatic group having 2 to 18 carbon atoms in X may be saturated or unsaturated and may be a divalent chained or cyclic aliphatic group (such as a cycloalkylene group). The divalent chained aliphatic group may be straight or branched. The divalent aliphatic group has preferably 2 to 12 carbon atoms and more preferably 2 to 6 carbon atoms. Of these, the divalent aliphatic group having 2 to 18 carbon atoms is preferably a divalent chained saturated aliphatic group, more preferably a chained alkylene group, and still more preferably a straight alkylene group. Examples of the chained aliphatic group having 2 to 18 carbon atoms may include ethylene, trimethylene, tetramethylene, pentamethylene, hexamethylene, heptamethylene, octamethylene, decamethylene, dodecamethylene, propylene, 2-methyltrimethylene, 2,2,-dimethyltrimethylene, cyclopentylene and cyclohexylene.

A divalent aromatic group having 6 to 18 carbon atoms in X may be a divalent aromatic hydrocarbon group or a divalent heterocyclic group. The divalent aromatic group preferably has 6 to 15 carbon atoms, and more preferably 6 to 12 carbon atoms. The aromatic ring in the divalent aromatic hydrocarbon group is preferably a benzene ring, a naphthalene ring, an anthracene ring, a biphenyl ring or a terphenyl ring, and more preferably a benzene ring, a naphthalene ring or a biphenyl ring. The aromatic heterocyclic ring in the divalent aromatic heterocyclic group preferably comprises any of an oxygen atom, a nitrogen atom and a surfur atom as a ring constituting atom. The aromatic heterocyclic ring include: a furan ring, a pyrrole ring, a thiophene ring, an imidazole ring, a pyrazole ring, a pyridine ring, a pyrazine ring, a pyridazine ring, a triazole ring, a triazine ring, an indole ring, an indazole ring, a purine ring, a thiazoline ring, a thiadiazole ring, an oxazoline ring, oxazole ring, an oxadiazole ring, a quinoline ring, an isoquinoline ring, a phthalazine ring, a naphthyridine ring, a quinoxaline ring, a quinazoline ring, a cinnoline ring, a pteridine ring, an acridine ring, a phenanthroline ring, a phenazine ring, a tetrazole ring, a benzimidazol ring, a benzoxazole ring, a benzthiazol ring, a benzotriazole ring, and a tetrazaindene ring. The pyridine ring, triazine ring, and quinoline ring are more preferred.

Z represents a divalent aliphatic group having 2 to 8 carbon atoms. The divalent aliphatic group having 2 to 8 carbon atoms may be saturated or unsaturated and may be a divalent chained or cyclic aliphatic group (such as a cycloalkylene group). The divalent chained aliphatic group may be a divalent straight or branched aliphatic group. The divalent aliphatic group preferably has 2 to 6 carbon atoms, and more preferably 2 to 4 carbon atoms. Of these, the divalent aliphatic group having 2 to 8 carbon atoms is preferably a divalent chained saturated aliphatic group, more preferably a chained alkylene group, and still more preferably a straight alkylene group. Examples of a chained alkylene group having 5 to 10 carbon atoms may include ethylene, trimethylene, tetramethylene, pentamethylene, hexamethylene, heptamethylene, octamethylene, decamethylene, propylene, 2-methyltrimethylene and 2,2-dimethyltrimethylene.

Also, the divalent cycloalkylene group includes cyclopenthylene and cyclohexylene.

The aliphatic diol represented by Formula (b) is more preferably at least one selected from ethylene glycol, 1,2-propanediol and 1,3-propanediol, and particularly preferably at least one selected from ethylene glycol and 1,2-propanediol in terms of preventing the crystallization of a polycondensation ester plasticizer.

The aliphatic diol residue in the polycondensation ester plasticizer preferably includes an ethylene glycol residue in an amount of 10 mol % to 100 mol %, and more preferably 20 mol % to 100 mol %.

The polycondensation ester plasticizer is preferably a compound obtained from at least one of dicarboxylic acids (also called aromatic dicarboxylic acids) wherein X is the above divalent aromatic group and at least one of diols (also called aliphatic diols) where Z is the above aliphatic group. Also, the polycondensation ester plasticizer may preferably be obtained from a mixture of at least one aromatic dicarboxylic acid and at least one dicarboxylic acid in which X is the above divalent aliphatic group (also called aliphatic dicarboxylic acid) and at least one of aliphatic diols having an average carbon number of 2.5 to 8.0.

In the description of the polycondensation ester plasticizer, the average carbon number of the dicarboxylic acid or the dicarboxylic acid residue has a value obtained by dividing the total carbon number all of the dicarboxylic acids used have or all of the dicarboxylic acid residues in the polycondensation ester plasticizer have by the mol number of the dicarboxylic acids used or the mol number of the dicarboxylic residues in the polycondensation ester plasticizer. For instance, if each of the adipic acid residue and the phthalic acid residue is contained in an amount of 50 mol % in the total content of the dicarboxylic acid residues, the average carbon number of the dicarboxylic acid residues is 7.0. The average carbon number of diols or diol residues is calculated in the same fashion. For instance, if an ethylene glycol residue and a 1,2-propanediol residue are contained in an amount of 50 mol % respectively, the average carbon number of the diol residues is 2.5.

The number average molecular weight (Mn) of the polycondensation ester plasticizer is preferably 500 to 2,000, more preferably 600 to 1,500 and still more preferably 700 to 1,200. If the number average molecular weight of the polycondensation ester plasticizer is 500 or more, the volatilizing effect is reduced, thereby preventing a film failure or process fouling by volatilization under a high temperature condition when stretching the film of the transparent support.

Also, if the number average molecular weight is 2,000 or less, its compatibility with the transparent support is increased, thereby preventing the bleed out during layer fabrication and heating and stretching.

The number average molecular weight of the polycondensation ester plasticizer may be measured and evaluated by gel permeation chromatography. Also, for polyester polyol whose terminal is uncapped, the number average molecular weight may be calculated based on the amount of hydroxyl group by mass (hereinafter, the hydroxyl value). In the present invention, the hydroxyl value may be obtained by acetylating polyester polyol and measuring the amount (mg) of potassium hydroxide necessary for neutralizing the excessive amount of acetic acid.

When a mixture of an aromatic dicarboxylic acid and an aliphatic dicarboxylic acid is used as a dicarboxylic acid component, the average carbon number of the dicarboxylic acid component is preferably 5.5 to 10.0, and more preferably 5.6 to 8.

By limiting the average carbon number to 5.5 or greater, durability results in a superior polarizing plate. Also, by limiting the average carbon number to 10.0 or less, compatibility with the transparent support is superior and the bleed out is prevented during film layer manufacturing.

The polycondensation ester obtained by using an aromatic dicarboxylic acid contains an aromatic dicarboxylic acid residue.

In the dicarboxylic acid residue in the polycondensation ester plasticizer, the ratio of the aromatic dicarboxylic acid residue is preferably 40 mol % or greater and more preferably 40 mol % to 100 mol %.

By limiting the ratio of the aromatic dicarboxylic residue in the dicarboxylic acid residue to 40 mol % to 100 mol %, if the material for the transparent support is a cellulose-based polymer, the compatibility with the cellulose-based polymer is superior and the bleed out is prevented during film layer manufacturing and heating and stretching.

The dicarboxylic residue is a partial structure of the polycondensation ester, and for instance, the dicarboxylic reside formed of the dicarboxylic acid HOC(=O)—X—CO$_2$H is —C(=O)—X—C(=O)—.

The aromatic dicarboxylic acid that may be used in the synthesis of the polycondensation ester plasticizer is preferably at least one selected from a phthalic acid, a terephthalic acid, an isophthalic acid, a 1,5-naphthalenedicarboxylic acid, a 1,4-naphthalenedicarobxylic acid, a 1,8-naphthalendicarboxylic acid, a 2,8-naphthalenedicarboxylic acid and a 2,6-naphthalenedicarboxylic acid. Of these, at least one selected from the phthalic acid, terephthalic acid and 2,6-naphthalenedicarboxylic acid is more preferred, and at least one selected from the phthalic acid and telephthalic aid is still more preferred.

The polycondensation ester obtained by using an aliphatic dicarboxylic acid contains an aliphatic dicarboxylic acid residue.

The aliphatic dicarboxylic acid used in the synthesis of the polycondensation ester plasticizer is preferably at least one selected from an oxalic acid, a malonic acid, a succinic acid, a maleic acid, a fumaric acid, a glutaric acid, an adipic acid, a pimelic acid, a suberic acid, an azelaic acid, a sebacic acid, a dodecandicarboxylic acid and a 1,4-cyclohexanedicarboxylic acid.

The average carbon number of the aliphatic dicarboxylic acid residue is preferably 5.5 to 10.0, more preferably 5.5 to 8.0, and still more preferably 5.5 to 7.0. If the average carbon number of the aliphatic dicarboxylic acid residue is 10.0 or less, it is possible to reduce the heating loss of the compound and prevent the occurrence of in-plane defects regarded as causing process fouling by bleeding out during web drying. Also, the average carbon number of the aliphatic dicarboxylic acid residue is preferably 5.5 or greater, which results in a superior compatibility and hardly causes precipitation of the polycondensation ester plasticizer.

Specifically, the aliphatic dicarboxylic acid reside in the polycondensation ester plasticizer preferably includes a succinic acid residue. Also, if the two or more types of aliphatic dicarboxylic acid residues are contained in the polycondensation ester plasticizer, the aliphatic dicarboxylic acid residue preferably includes a succinic acid residue and an adipic acid residue.

The polycondensation ester plasticizer contains a diol residue.

The diol residue formed by a diol compound (HO—Z—OH) represented by Formula (b) is —O—Z—O—.

The polycondensation ester plasticizer contains an aliphatic idol residue having an average carbon number of preferably 2.0 to 7.0, and more preferably 2.0 to 4.0.

When the average carbon number of the aliphatic diol residue is 7.0 or less, if the material for the transparent support is a cellulose-based polymer, compatibility with the cellulose-based polymer is improved and the bleed out hardly occurs. Further, the heating loss of a compound hardly increases, thereby preventing the generation of in-plane defects regarded as causing process fouling during the process of web drying. Also, if the average carbon number of the aliphatic diol residue is 2.0 or greater, it is easy to perform a synthesis. Specific examples of the aliphatic diol residue in the polycondensation ester plasticizer preferably include ethanol, propanediol, and cyclohexanedimethanol.

The terminal of the polycondensation ester plasticizer may be used in the form of a diol or a carboxylic acid without being capped (i.e., the terminal of the polymer chain is —OH or —CO$_2$H), and further the so-called terminal capping may be performed by reacting a monocarboxylic acid with the terminal —OH or reacting monoalcohol with the terminal —CO$_2$H. Also, by capping the terminal of the polycondensation ester plasticizer, it hardly exists in a solid state at room temperature, and is thus easily handled. In addition, even when the thickness of the transparent support is reduced, it is possible to improve the visibility of a display device.

A monocarboxylic acid used in capping is preferably at least one selected from an acetic acid, a propionic acid, a butanoic acid, and a benzoic acid. A monoalcohol used in capping is preferably at least one selected from methanol, ethanol, propanol, isopropanol, butanol and isobutanol and most preferably methanol. If the monocarboxylic acid used at the terminal of the polycondensation ester has 7 or less carbon atoms, the heating loss of the compound is reduced and the effect of preventing the generation of in-plane defects is superior.

Specific examples J-1 to J-44 of the polycondensation ester plasticizer are illustrated in Table 1 below, but not limited thereto.

TABLE 1

| | Dicarboxylic acid | | | Diol | | | |
| --- | --- | --- | --- | --- | --- | --- | --- |
| No. | Aromatic dicarboxylic acid | Aliphatic dicarboxylic acid | Dicarboxylic acid molar ratio (mol %) | Diol 1 | Diol 2 | Diol Ratio (mol %) | Terminal |
| J-1 | TPA | SA | 45/55 | Ethane-diol | propanediol | 45/55 | acetyl ester group |
| J-2 | TPA | SA | 50/50 | Ethane-diol | propanediol | 45/55 | acetyl ester group |
| J-3 | TPA | SA | 55/45 | Ethane-diol | propanediol | 45/55 | acetyl ester group |
| J-4 | TPA | SA | 65/35 | Ethane-diol | propanediol | 45/55 | acetyl ester group |
| J-5 | TPA | SA | 55/45 | Ethane-diol | propanediol | 25/75 | acetyl ester group |
| J-6 | TPA | SA | 55/45 | Ethane-diol | propanediol | 10/90 | acetyl ester group |
| J-7 | 2.6-NPA | SA | 50/50 | Ethane-diol | propanediol | 25/75 | acetyl ester group |
| J-8 | 2.6-NPA | SA | 50/50 | Ethane-diol | propanediol | 45/55 | acetyl ester group |
| J-9 | TPA/PA | SA | 45/5/50 | Ethane-diol | propanediol | 45/55 | acetyl ester group |
| J-10 | TPA/PA | SA | 40/10/50 | Ethane-diol | propanediol | 45/55 | acetyl ester group |
| J-11 | TPA | SA/AA | 50/30/20 | Ethane-diol | propanediol | 45/55 | acetyl ester group |
| J-12 | TPA | SA/AA | 50/20/30 | Ethane-diol | propanediol | 45/55 | acetyl ester group |
| J-13 | TPA | SA | 50/50 | Ethane-diol | propanediol | 25/75 | acetyl ester group |
| J-14 | TPA | SA | 80/20 | Ethane-diol | propanediol | 45/55 | acetyl ester group |
| J-15 | TPA | SA | 55/45 | Ethane-diol | Cyclohexanedimethanol | 45/55 | acetyl ester group |
| J-16 | TPA | SA | 45/55 | Ethane-diol | propanediol | 45/55 | hydroxyl group |
| J-17 | TPA | SA | 50/50 | Ethane-diol | propanediol | 45/55 | hydroxyl group |
| J-18 | TPA | SA | 55/45 | Ethane-diol | propanediol | 45/55 | hydroxyl group |
| J-19 | TPA | SA | 65/35 | Ethane-diol | propanediol | 45/55 | hydroxyl group |
| J-20 | TPA | SA | 55/45 | Ethane-diol | propanediol | 25/75 | hydroxyl group |
| J-21 | TPA | SA | 55/45 | Ethane-diol | propanediol | 10/90 | hydroxyl group |
| J-22 | 2.6-NPA | SA | 50/50 | Ethane-diol | propanediol | 25/75 | hydroxyl group |
| J-23 | 2.6-NPA | SA | 50/50 | Ethane-diol | propanediol | 45/55 | hydroxyl group |
| J-24 | 2.6-NPA | SA | 45/5/50 | Ethane-diol | propanediol | 25/75 | hydroxyl group |
| J-25 | 2.6-NPA | SA | 40/10/50 | Ethane-diol | propanediol | 25/75 | hydroxyl group |
| J-26 | TPA | SA/AA | 50/30/20 | Ethane-diol | propanediol | 25/75 | hydroxyl group |
| J-27 | TPA | SA/AA | 50/20/30 | Ethane-diol | propanediol | 25/75 | hydroxyl group |
| J-28 | TPA | SA | 50/50 | Ethane-diol | propanediol | 25/75 | hydroxyl group |
| J-29 | TPA | SA | 80/20 | Ethane-diol | propanediol | 25/75 | hydroxyl group |
| J-30 | TPA | SA | 55/45 | Ethane-diol | Cyclohexanedimethanol | 25/75 | hydroxyl group |
| J-31 | TPA | SA | 55/45 | Ethane-diol | propanediol | 45/55 | propionyl ester group |
| J-32 | TPA | — | 100/0 | Ethane-diol | propanediol | 50/50 | hydroxyl group |
| J-33 | TPA | — | 100/0 | Ethane-diol | propanediol | 40/60 | acetyl ester group |
| J-34 | TPA | SA | 50/50 | Ethane-diol | propanediol | 45/55 | benzoyl ester group |
| J-35 | TPA | SA | 55/45 | Ethane-diol | propanediol | 50/50 | hydroxyl group |
| J-36 | TPA | SA | 55/45 | Ethane-diol | propanediol | 50/50 | acetyl ester group |
| J-38 | TPA | SA | 80/20 | Ethane-diol | propanediol | 50/50 | acetyl ester group |
| J-39 | PA | AA | 10/90 | Ethane-diol | — | 100/0 | acetyl ester group |
| J-40 | PA | AA | 25/75 | Ethane-diol | — | 100/0 | acetyl ester group |
| J-41 | PA | AA | 50/50 | Ethane-diol | — | 100/0 | acetyl ester group |
| J-42 | PA | — | 100/0 | Ethane-diol | — | 100/0 | acetyl ester group |
| J-43 | — | AA | 0/100 | Ethane-diol | propanediol | 70/30 | acetyl ester group |
| J-44 | — | AA | 0/100 | Ethane-diol | propanediol | 50/50 | acetyl ester group |

Herein, of the abbreviations in Table 1 above, PA represents a phthalic acid, TPA represents a terephthalic acid, AA represents an adipic acid, SA represents a succinic acid, and 2,6-NPA represents 2,6-naphthalenedicarbyoxylic acid.

The synthesis of the polycondensation ester plasticizer may be easily carried out in a conventional manner using any of a thermal melt condensation based on a polyesterification reaction or an ester exchange reaction of a diol and a dicarboxylic acid or a method of an interfacial condensation of acid chloride of these acids with glycols. Also, the polycondensation ester is described in detail in "Plasticizer—its theory and application" authored and edited by Koichi Murai (First edition published by Saiwai Shobo Kabushiki Kaisha, Mar. 1, 1973) and the compounds thereof may be used.

As the polycondensation ester plasticizer according to the present invention, compounds disclosed in Japanese Patent Application Laid-Open No. 5-155809, Japanese Patent Application Laid-Open No. 5-155810, Japanese Patent Application Laid-Open No. 5-197073, Japanese Patent Application Laid-Open No. 2006-259494, Japanese Patent Application Laid-Open No. 7-330670, Japanese Patent Application Laid-Open No. 2006-342227 and Japanese Patent Application Laid-Open No. 2007-003679 may be used.

(Hydrocarbon Derivative Plasticizer)

In a preferred aspect, a film further comprising a hydrocarbon derivative plasticizer may be used as a transparent support. The containment of the hydrocarbon derivative plasticizer improves the visibility of a display device even when the thickness of the transparent support is reduced.

As the hydrocarbon derivative plasticizer, a hydrocarbon derivative containing a monosaccharide or 2 to 10 monosaccharide units is preferred.

A monosacharide or a polysaccharide that preferably constitutes a hydrocarbon derivative plasticizer is substituted by a substituent in some or all of substitutable groups in its molecule (such as a hydroxyl group, a carboxyl group, an amino group and a mercapto group). A substituent which may be possessed by the hydrocarbon derivative plasticizer includes an alkyl group, an aryl group, an acyl group, etc. More details will be described hereinafter. Further examples thereof may include an ether structure formed by substituting a hydroxyl group by an alkyl group or an aryl group, an ester structure formed by substituting the hydroxyl group by an aryl group, and an amide structure or an imide structure formed by being substituted by an amino group.

Examples of carbohydrates containing a monosaccharide units or two to ten monosaccharides may include erythrose, threose, ribose, arabinose, xylose, lyxose, arose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltotriose, manninotriose, melezitose, panose, planteose, raffinose, solatriose, umbelliferose, lycotetraose, maltotetraose, stachyose, baltopentaose, belbalcose, maltohexaose, α-cyclodextrin, β-cyclodextrin, γ-cyclodextrin, δ-cyclodextin, xylitol and sorbitol.

More preferred are ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, and sorbitol; still more preferred are arabinose, xylose, glucose, fructose, mannose, galactose, maltose, cellobiose, sucrose, β-cyclodextrin, and γ-cyclodextrin; and particularly preferred are xylose, glucose, fructose, mannose, galactose, maltose, cellobiose, sucrose, xylitol and sorbitol.

Preferred examples of the substituents which may be possessed by the carbohydrate derivative plasticizer may include alkyl groups (preferably having 1 to 22 carbon atoms, more preferably 1 to 12 carbon atoms, and particularly preferably 1 to 8 carbon atoms, such as methyl, ethyl, propyl, hydroxyethyl, hydroxypropyl, 2-cyanoethyl and benzyl), aryl groups (preferably having 6 to 24 carbon atoms, more preferably 6 to 18 carbon atoms, and particularly preferably 6 to 12 carbon atoms, such as phenyl and naphthyl), acyl groups (including an alkyl carbonyl group, an aryl carbonyl group and a heterocyclic carbonyl group and preferably having 1 to 22 carbon atoms, more preferably 2 to 12 carbon atoms, and particularly preferably 2 to 8 carbon atoms, such as acetyl, propionyl, butyryl, pentanoyl, hexanoyl, octanoyl, benzoyl, tolyl, phthalyl and naphtol). Further, preferable examples of the structure formed by substitution with an amino group may include an amide structure (preferably having 1 to 22 carbon atoms, more preferably 2 to 12 carbon atoms, and particularly preferably 2 to 8 carbon atoms, such as formamide and acetamide), and an imido structure (preferably having 4 to 22 carbon atoms, more preferably 4 to 12 carbon atoms, and particularly preferably 4 to 8 carbon atoms, such as succinimide and phthalimide).

The substituent which is possessed by the hydrocarbon derivative plasticizer is preferably at least one selected from an alkyl group, an aryl group and an acyl group and more preferably an acyl group.

Preferred examples of the carbohydrate plasticizer may include, but not be limited to, at least one selected from xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

More preferred examples may include at least one selected from xylose tetraacetate, glucose pentaacetate, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

Still more preferred examples may include at least one selected from maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

The hydrocarbon derivative plasticizer preferably has a pyranose structure or a furnose structure.

As the hydrocarbon derivative plasticizer, the compounds illustrated below are particularly preferred. However, the hydrocarbon derivative plasticizer that may be used in the present invention is not limited thereto.

Also, in the structural formula below, each of R independently represents an optional substituent, and a plurality of R's may be the same as or different from each other.

In Tables 2-5 below, for instance in Table 2, eight (8) hydroxyl groups (all of R's are hydrogen atoms) are acylated by two types of acylation agent. One side of R introduced in the two types of acylation agent is represented as Substituent 1 and another side of R is represented as Substituent 2, and the degree of substitution indicates the number of substituents in the total of 8 hydroxyl groups.

The number of all R's is 5 in Table 3 and 8 in Tables 4-5. Herein, "phenyl acetyl" represents —C(=O)—CH$_2$—C$_6$H$_5$.

[Chem. 19]

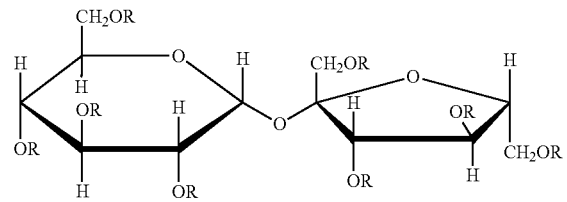

[Chem. 20]

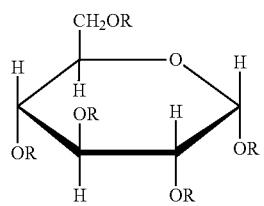

TABLE 3

| Compound | Substituent 1 Type | Substituent 1 Degree of Substitution | Substituent 2 Type | Substituent 2 Degree of Substitution | Molecular Weight |
|---|---|---|---|---|---|
| K-201 | acetyl | 4 | benzoyl | 1 | 468 |
| K-202 | acetyl | 3 | benzoyl | 2 | 514 |
| K-203 | acetyl | 2 | benzoyl | 3 | 577 |
| K-204 | acetyl | 4 | benzyl | 1 | 454 |
| K-205 | acetyl | 3 | benzyl | 2 | 489 |
| K-206 | acetyl | 2 | benzyl | 3 | 535 |
| K-207 | acetyl | 4 | phenylacetyl | 1 | 466 |
| K-208 | acetyl | 3 | phenylacetyl | 2 | 543 |
| K-209 | acetyl | 2 | phenylacetyl | 3 | 619 |
| K-210 | phenylacetyl | 1 | none | 0 | 298 |
| K-211 | phenylacetyl | 2 | none | 0 | 416 |
| K-212 | phenylacetyl | 3 | none | 0 | 535 |
| K-213 | phenylacetyl | 4 | none | 0 | 654 |
| K-214 | acetyl | 1 | benzoyl | 4 | 639 |
| K-215 | acetyl | 0 | benzoyl | 5 | 701 |

TABLE 2

| Compound | Substituent 1 Type | Substituent 1 Degree of Substitution | Substituent 2 Type | Substituent 2 Degree of Substitution | Molecular Weight |
|---|---|---|---|---|---|
| K-101 | acetyl | 7 | benzyl | 1 | 727 |
| K-102 | acetyl | 6 | benzyl | 2 | 775 |
| K-103 | acetyl | 7 | benzoyl | 1 | 741 |
| K-104 | acetyl | 6 | benzoyl | 2 | 802 |
| K-105 | benzyl | 2 | none | 0 | 523 |
| K-106 | benzyl | 3 | none | 0 | 613 |
| K-107 | benzyl | 4 | none | 0 | 702 |
| K-108 | acetyl | 7 | phenylacetyl | 1 | 771 |
| K-109 | acetyl | 6 | phenylacetyl | 2 | 847 |
| K-110 | benzoyl | 1 | none | 0 | 446 |
| K-111 | benzoyl | 2 | none | 0 | 551 |
| K-112 | benzoyl | 3 | none | 0 | 655 |
| K-113 | benzoyl | 4 | none | 0 | 759 |
| K-114 | benzoyl | 5 | none | 0 | 863 |
| K-115 | benzoyl | 6 | none | 0 | 967 |
| K-116 | benzoyl | 7 | none | 0 | 1071 |
| K-117 | benzoyl | 8 | none | 0 | 1175 |

[Chem. 21]

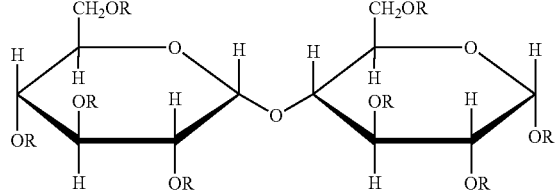

TABLE 4

| Compound | Substituent 1 Type | Substituent 1 Degree of Substitution | Substituent 2 Type | Substituent 2 Degree of Substitution | Molecular Weight |
|---|---|---|---|---|---|
| K-301 | acetyl | 6 | benzoyl | 2 | 803 |
| K-302 | acetyl | 6 | benzyl | 2 | 775 |
| K-303 | acetyl | 6 | phenylacetyl | 2 | 831 |
| K-304 | benzoyl | 2 | none | 0 | 551 |
| K-305 | benzyl | 2 | none | 0 | 522 |
| K-306 | phenylacetyl | 2 | none | 0 | 579 |

[Chem. 22]

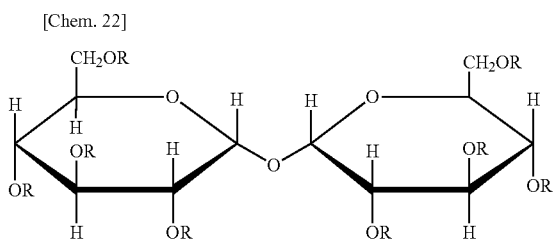

TABLE 5

| Compound | Substituent 1 Type | Degree of Substitution | Substituent 2 Type | Degree of Substitution | Molecular Weight |
|---|---|---|---|---|---|
| K-401 | acetyl | 6 | benzoyl | 2 | 803 |
| K-402 | acetyl | 6 | benzyl | 2 | 775 |
| K-403 | acetyl | 6 | phenylacetyl | 2 | 831 |
| K-404 | benzoyl | 2 | none | 0 | 551 |
| K-405 | benzyl | 2 | none | 0 | 523 |
| K-406 | phenylester | 2 | none | 0 | 579 |

The carbohydrate derivative plasticizer is commercially available, for instance, from Tokyo Chemical Industry Co., Ltd. and Sigma-Aldrich Corporation. Alternatively, the carbohydrate derivative can be synthesized by subjecting a commercially available carbohydrate to an esterification (for example, a method described in Japanese Patent Application Laid-Open No. 8-245678).

The added amount of a plasticizer in a transparent support is preferably from 1 to 20 parts by mass relative to 100 parts by mass of the material for the transparent support. When the added amount is 1 part by mass or greater relative to 100 parts by mass of the material for the transparent support, the effect of improvement in the present invention can be easily achieved. When the added amount is 20 parts by mass or less, bleeding out is suppressed. The added amount is more preferably 2 to 15 parts by mass and particularly preferably from 5 to 15 parts by mass relative to 100 parts by mass of the material for the transparent support.

As the plasticizer, two or more of these plasticizers may be added. In that event, specific examples and preferred ranges of the added amount are the same as illustrated above.

(Deterioration Inhibitor)

In a preferred aspect, a film containing a deterioration inhibitor (such as an antioxidant, a peroxide decomposer, a radical retardant, a metal deactivator, an acid scavenger and amine) may be used as a transparent support. A UV absorber is also a deterioration inhibitor. These deterioration inhibitors are also disclosed in Japanese Patent Application Laid-Open No. 60-235852, Japanese Patent Application Laid-Open No. 3-199201, Japanese Patent Application Laid-Open No. 5-1907073, Japanese Patent Application Laid-Open No. 5-194789, Japanese Patent Application Laid-Open No. 5-271471, Japanese Patent Application Laid-Open No. 6-107854, Japanese Patent Application Laid-Open No. 6-118233, Japanese Patent Application Laid-Open No. 6-148430, Japanese Patent Application Laid-Open No. 7-11056, Japanese Patent Application Laid-Open No. 7-11055, Japanese Patent Application Laid-Open No. 7-11056, Japanese Patent Application Laid-Open No. 8-29619, Japanese Patent Application Laid-Open No. 8-239509, and Japanese Patent Application Laid-Open No. 2000-204173.

Also, all of the commercially available stabilizers disclosed in "Polymer Additive Handbook" (published by CMC), pp. 21-69 are preferred.

(Antioxidant)

In a preferred aspect, a film containing an antioxidant may be used as a transparent support. The containment of the antioxidant allows the compound represented by Formula I to effectively function to thereby result in an effect of better improvement.

Examples of the antioxidant may include phenol-based and hydroquinone-based antioxidants, such as 2,6-di-tert-butyl-4-methylphenol, 4,4'-thiobis-(6-tert-butyl-3-methylphenol), 1,1'-bis(4-hydroxyphenyl)cyclohexane, 2,2'-methylenebis(4-ethyl-6-tert-butylphenol), 2,5-di-tert-butylhydroquinone and pentaerythrityl-tetrakis[3-(3,5-di-tert-butyl-4-hydroxyphenyl)propionate].

Further, it is preferable to use a phosphorus-based antioxidant, such as tris(4-methoxy-3,5-diphenyl)phosphite, tris(nonylphenyl)phosphite, tris(2,4-di-tert-butylphenyl)phosphite, bis(2,6-di-tert-butyl-4-methylphenyl)pentaerythritol diphosphite, and bis(2,4-di-tert-butylphenyl)pentaerythritol diphosphite, or a hydroxylamine-based antioxidant, such as N,N-dioctadecyl hydroxyl amine and N,N-dibenzyl hydroxyl amine. As a hydroxyl amine-based compound, it is preferred to use the compounds disclosed in paragraphs [0005]-[0020] and [0022]-[0026] of Japanese Patent Application Laid-Open No. 8-62767.

Reductones represented by the following Formula (A) or subsequently described Formula (B) are preferred for use as an antioxidant in a transparent support.

[Chem. 23]

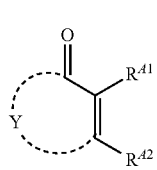

Formula (A)

In Formula (A), each of $R^{41}$ and $R^{42}$ independently represents a hydroxyl group, an amino group, an acylamino group, an alkylsulfonylamino group, an arylsulfonylamino group, an alkoxycarbonylamino group, a mercapto group or an alkylthio group. Y represents a group of nonmetallic atoms composed of carbon atoms and an oxygen atom and/or a nitrogen atom and forming a 5- to 6-membered ring, such as —C(=O)—C($R^{41}$)=C($R^{42}$)—.

$R^{41}$ and $R^{42}$ are preferably hydroxyl groups, amino groups, alkylsulfonylamino groups or arylsulfonylamino groups, more preferably hydroxyl groups or amino groups, and still more preferably hydroxyl groups.

Preferably, Y has at least one —O— bond and is formed by combining one or two or more of —C($R^{43}$)($R^{44}$)—, —C($R^{45}$)=, —C(=O)—, N(Ra)— and —N=. Herein, each of $R^{43}$ to $R^{45}$ and Ra independently represents a hydrogen atom, an alkyl group having 1 to 10 carbon atoms which may have a substituent, an aryl group having 6 to 15 carbon atoms which may have a substituent, a hydroxyl group or a carboxylic group.

Examples of the 5- to 6-membered ring formed by Y may include a cyclopentenone ring (2-cyclopenten-1-one ring; a formed compound is a reductic acid), a furanone ring [2(5H)-furanone ring], a dihydropyranone ring [3,4-dihydro-2H-pyran-4-one ring (2,3-dihydro-4H-pyrone ring), a 3,6-dihydro-2H-pyran-2-one ring, a 3,6-dihydro-2H-pyran-6-one ring (5,6-dihydro-2-pyrone ring)], and a 3,4-dihydro-2H-pyrone ring. Preferred are the cyclopentenone ring, furanone ring, and dihydropyrone ring, and particularly preferred is the furanone ring.

These rings may be condensed, and a condensed ring may be any of a saturated ring and an unsaturated ring.

Of reductones represented by Formula (A), a compound represented by the following Formula (A1) is preferred and a compound represented by the following Formula (A2) is preferred.

[Chem. 24]

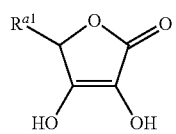

Formula (A1)

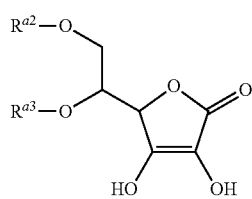

Formula (A2)

In Formula (A1), $R^{a1}$ represents a hydrogen atom, an alkyl group, an aryl group or a heterocyclic group, and these groups may have a substituent.

$R^{a1}$ is preferably an alkyl group which may have a substituent, and —CH(OR$^{a3}$)CH$_2$OR$^{a2}$ is more preferred and in this case, the preferred compound is the compound represented by Formula (A2).

In Formula (A2), each of $R^{a2}$ and $R^{a3}$ independently represents a hydrogen atom, an alkyl group, an acyl group or an alkoxycarbonyl group, $R^{a2}$ and $R^{a3}$ may be combined to form a ring. A formed ring is preferably a 1,3-dioxolane ring, and the ring may have a substituent. A compound having a dioxolane ring can be synthesized by acetalization or ketalization based on the reaction of ascorbic acid with ketones or aldehydes, and ketones and aldehydes as raw materials can be used without particular limitation.

One of particularly preferred combinations of substituents is a compound wherein $R^{a2}$ is an acyl group and $R^{a3}$ is a hydrogen atom, and the acyl group may be any of an aliphatic acyl group and an aromatic acyl group, and the aliphatic acyl group preferably has 2 to 30 carbon atoms, more preferably 4 to 24 carbon atoms, and still more preferably 8 to 18 carbon atoms. The aromatic acyl group preferably has 7 to 24 carbon atoms, more preferably 7 to 22 carbon atoms, and still more preferably 7 to 18 carbon atoms. Specific examples of the preferred acyl group may include butanoyl, hexanoyl, 2-ethylhexanoyl, decanoyl, lauroyl, myristoyl, palmitoyl, stearoyl, palmitoleyl, myristoleyl, oleoyl, benzoyl, 4-methyl-benzoyl and 2-methylbenzoyl.

As an antioxidant used in a transparent support, a compound represented by the following Formula (B) as well as a compound represented by Formula (A) is preferred.

[Chem. 25]

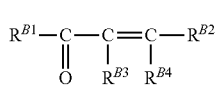

Formula (B)

In Formula (B), each of $R^{B1}$ and $R^{B2}$ independently represents a hydrogen atom, an alkyl group, an alkenyl group, a cycloalkyl group, an aryl group, an acyl group, a carboxyl group, an amino group, an alkoxy group, an alkoxycarbonyl group or a heterocyclic group, and each of $R^{B3}$ and $R^{B4}$ independently represents a hydroxyl group, an amino group, an acylamino group, an alkylsulfonyl group, an arylsulfonyl group, an alkoxycarbonylamino group or a mercapto group.

The alkyl group in $R^{B1}$ and $R^{B2}$ preferably has 1 to 10 carbon atoms, and is preferably methyl, ethyl and t-butyl.

The alkyl group in $R^{B1}$ and $R^{B2}$ preferably has 1 to 10 carbon atoms. The alkenyl group in $R^{B1}$ and $R^{B2}$ preferably has 2 to 10 carbon atoms, and is preferably vinyl and allyl and particularly preferably vinyl.

The cycloalkyl group in $R^{B1}$ and $R^{B2}$ preferably has 3 to 10 carbon atoms, and is preferably cyclopropyl, cyclopentyl and cyclohexyl.

These alkyl group, alkenyl group and cycloalkyl group may have a substituent, and the substituent is preferably at least one selected from a hydroxyl group, a carboxyl group and a sulfo group.

In the case the alkenyl group is vinyl, a vinyl group substituted with a carboxyl group is preferred.

The aryl group in $R^{B1}$ and $R^{B2}$ preferably has 6 to 12 carbon atoms. The aryl group may have a substituent, and the substituent is at least one selected from an alkyl group, a hydroxyl group, a carboxyl group, a sulfo group, a halogen atom, a nitro group and a cyano group.

The acyl group in $R^{B1}$ and $R^{B2}$ is preferably formyl, acetyl, isobutyryl and benzoyl.

The amino group in $R^{B1}$ and $R^{B2}$ includes an amino group, an alkylamino group, and an aryl amino group. Amino, methylamino, dimethylamino, ethylamino, diethylamino, dipropylamino, phenylamino, N-methyl-N-phenyl amino are preferred.

The alkoxy group in $R^{B1}$ and $R^{B2}$ preferably has 1 to 10 carbon atoms, and is preferably methoxy or ethoxy.

The alkoxycarbonyl group in $R^{B1}$ and $R^{B2}$ is preferably methoxycarbonyl.

As for the heterocyclic group in $R^{B1}$ and $R^{B2}$, ring constituting heteroatoms are preferably an oxygen atom, a sulfur atom and a nitrogen atom, and the ring structure is preferably a 5- or 6-membered ring. The heterocyclic group can be either an aromatic heterocyclic group or a saturated heterocyclic group and may be condensed.

The heterocyclic rings in the heterocyclic group are preferably a pyridine ring, a pyrimidine ring, a pyrrole ring, a furan ring group, a thiophene ring, a pyrazole ring, piperidine ring, a piperazine ring and a morpholine ring.

$R^{B1}$ and $R^{B2}$ is more preferably an alkyl group having 1 to 6 carbon atoms or an aryl group having 6 to 12 carbon atoms.

The amino group in $R^{B3}$ and $R^{B4}$ includes an amino group, an alkylamino group and an arylamino group, and an alkyl amino group, such as methylamino, ethylamino, n-butylamino and hydroxyethylamino, is preferred.

The acylamino group in $R^{B3}$ and $R^{B4}$ is preferably acetylamino and benzoylamino.

The alkylsulfonylamino group in $R^{B3}$ and $R^{B4}$ is preferably methylsulfonylamino.

The arylsulfonylamino group in $R^{B3}$ and $R^{B4}$ is preferably benzenesulfonylamino and p-toluenesulfonyl amino.

The alkoxycarbonylamino group in $R^{B3}$ and $R^{B4}$ is preferably methoxycarbonylamino.

$R^{B3}$ and $R^{B4}$ are more preferably hydroxyl groups, amino groups, alkylsulfonylamino groups and arylsulfonylamino groups.

As an antioxidant used in the present invention, reductones are more preferred. Specific examples thereof may include compounds illustrated in paragraphs [0014] to [0034] of Japanese Patent Application Laid-Open No. 6-27599, paragraphs [0012] to [0020] of Japanese Patent Application Laid-Open No. 6-110163, and paragraphs [0022] to [0031] of Japanese Patent Application Laid-Open No. 8114899.

Among them, myristic acid esters of L-ascorbic acid, palmitic acid esters and stearic acid esters are particularly preferred.

Timing when the antioxidant is added to the transparent support film is not particularly limited as long as it is added during film manufacturing. For example, it may be added when synthesizing the transparent support with a solvent or after preparing a mixture solution of a transparent support and a solvent.

The content of the antioxidant added in the transparent support film is preferably 0.0001 to 5.0 parts by mass relative to 100 parts by mass of the transparent support. By limiting the content of the antioxidant within this range, it is possible to obtain a sufficient antioxidation effect and a sufficient durability of polarizing plate. The content of the antioxidant in the transparent support film is more preferably 0.001 to 1.0 part by mass and more preferably 0.01 parts by mass to 0.5 parts by mass relative to 100 parts by mass of the transparent support.

(Radical Scavenger)

As a transparent support, a film containing a radical scavenger may preferably used. The containment of the radical scavenger inhibits the decomposition of the compound represented by Formula (I), thereby resulting in a polarizer having a better durability.

As the radical scavenger, a compound represented by the Formula (H) (HALS) is preferred.

[Chem. 26]

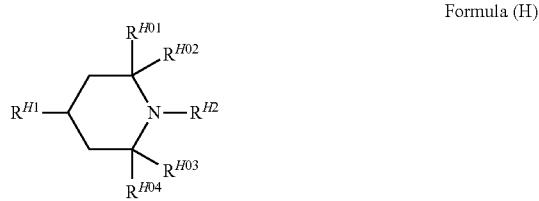

Formula (H)

In Formula (H), each of $R^{H1}$ and $R^{H2}$ independently represents a hydrogen atom or a substituent, and each of $R^{H01}$ to $R^{H04}$ independently represents an alkyl group.

Although substituents in $R^{H1}$ are not particularly limited, an alkyl group or a substituent bonded to a piperidine ring by a nitrogen atom or an oxygen atom is preferred. The substituent bonded to a piperidine ring by a nitrogen atom or an oxygen atom is preferably an amino group, an acylamino group, a hydroxyl group, an alkoxy group, an aryloxy group or an acyloxy group. These groups may have a substituent.

The substituent in $R^{H1}$ is preferably an alkyl group and an amino group having an aryl group or a heterocyclic group and further a hydroxyl group, an alkoxy group or an acyloxy group.

Although not specifically limited, the substituent in $R^{H2}$ preferably includes an alkyl group (preferably having 1 to 20 carbon atoms, more preferably 1 to 12 carbon atoms, and still more preferably 1 to 8 carbon atoms, and of them, including methyl, ethyl, isopropyl, tert-butyl, n-octyl, 2-ethylhexyl, n-decyl, n-hexadecyl), an alkenyl group (preferably having 2 to 20 carbon atoms, more preferably 2 to 12 carbon atoms, and still more preferably 2 to 8 carbon atoms, and more preferably including vinyl, allyl, 2-butenyl or 3-pentenyl), an alkynyl group (preferably having 2 to 20 carbon atoms, more preferably 2 to 12 carbon atoms, and still more preferably 2 to 8 carbon atoms, and more preferably including propargyl or 3-pentynyl), a cycloalkyl group (preferably having 3 to 20 carbon atoms, more preferably 3 to 12 carbon atoms, and still more preferably 3 to 8 carbon atoms, and including cyclopropyl, cyclopentyl or cyclohexyl), an aryl group (preferably having 6 to 30 carbon atoms, more preferably 6 to 20 carbon atoms, and still more preferably 6 to 12 carbon atoms, and more preferably including phenyl, biphenyl or naphthyl), an amino group (including an amino group, an alkylamino group, an arylamino includes, preferably having 0 to 20 carbon atoms, more preferably 0 to 10 carbon atoms, and still more preferably 0 to 6 carbon atoms, and more preferably including amino, methylamino, dimethylamino, diethylamino, phenylamino, N-methyl-N-phenylamino or dibenzylamino), an alkoxy group (preferably having 1 to 20 carbon atoms, more preferably 1 to 12 carbon atoms, and still more preferably 1 to 8 carbon atoms, and more preferably including methoxy, ethoxy, butoxy), a cycloalkyloxy group (the cycloalkyl ring in the cycloalkyloxy group is preferably a 3- to 8-membered ring, preferably having 3 to 20 carbon atoms, and preferably including cyclopropyloxy, cyclopentyloxy and cyclohexyloxy), an acyl group (including an alkylcarbonyl group and an arylcarbonyl group, preferably having 2 to 20 carbon atoms, more preferably 2 to 16 carbon atoms, and still more preferably 2 to 8 carbon atoms, and more preferably including acetyl, propionyl, 2-ethyl hexanoyl or benzoyl), a hydroxyl group and an oxyradical group (—O⁻).

$R^{H01}$ to $R^{H04}$ are preferably an alkyl group having 1 to 6 carbon atoms and more preferably ethyl or methyl. Still more preferably, all of $R^{H01}$ to $R^{H04}$ are methyl.

A compound represented by Formula (H) is preferably at least one selected from 4-hydroxy-2,2,6,6-tetramethylpiperidine,1-allyl-4-hydroxy-2,2,6,6-tetramethylpiperidine,1-benzyl-4-hydroxy-2,2,6,6-tetramethylpiperidine,1(4-t-butyl-2-butenyl)-4-hydroxy-2,2,6,6-tetramethylpiperidine, 4-stearoyloxy-2,2,6,6-tetramethylpiperidine, 1-ethyl-4-salicyloyloxy-2,2,6,6-tetramethylpiperidine, 4-methacryloyloxy-1,2,2,6,6-penta methyl piperidine, 1,2,2,6,6-pentamethylpiperidine-4-yl-β (3,5-di-t-butyl-4-hydroxyphenyl)-propionate, 1-benzyl-2,2,6,6-tetramethylpiperidine-4-yl-maleinate, bis(2,2,6,6-tetramethylpiperidine-4-yl)adipate, bis(2,2,6,6-tetramethylpiperidin-4-yl)sebacate, bis(1,2,3,6-tetramethyl-2,6-diethyl-piperidin-4-yl)sebacate, bis(1-allyl-2,2,6,6-tetramethyl-piperidin-4-yl)phthalate, 1-acetyl-4-acetoxy-2,2,6,6-tetramethylpiperidine, trimellitic acid-tris(2,2,6,6-tetramethylpiperidine-4-yl)ester, 1-acryloyl-4-benzyloxy-2,2,6,6-tetramethylpiperidine, Dibutylmalonic acid-bis(1,2,2,6,6-pentamethyl-piperidin-4-yl)ester, dibenzylmalonic acid-bis(1,2,3,6-tetramethyl-2,6-diethyl-piperidin-4-yl)ester, dimethyl-bis(2,2,6,6-tetramethylpiperidin-4-yloxy)-silane, tris(1-propyl-2,2,6,6- tetramethylpiperidine-4-yl)-phosphite, tris(1-propyl-2,2,6,6-tetramethylpiperidine-4-yl)-phosphate, N,N'-bis(2,2,6,6-tetramethylpiperidine 4-yl)-hexamethylene-1,6-diamine, tetrakis(2,2,6,6-tetramethylpiperidin-4-yl)-1,2,3,4-butane tetracarboxylate, tetrakis(1,2,2,6,6-pentamethylpiperidine-4-yl)-1,2,3,4-butane tetracarboxylate, N,N'-bis-(2,2,6,6-tetramethylpiperidine 4-yl)-hexamethylene-1,6-diacetamide, 1-acetyl-4-(N-cyclohexyl acetamide)-2,2,6,6-tetramethylpiperidine, 4-benzylamino-2,2,6,6-tetramethylpiperidine, N,N-bis-(2,2,6,6-tetramethylpiperidine-4-yl)-N,N'-dibutyl-adipamide, N,N'-bis(2,2,6,6-tetramethylpiperidine-4-yl)-N,N'-dicyclohexyl-(2-hydroxy)propylenediamine, N,N'-bis-(2,2,6,6-tetramethylpiperidin-4-yl)-p-xylylene-diamine, 4-bis(2-hydroxyethyl)amino-1,2,2,6,6-pentamethylpiperidine, 4-methacrylamide-1,2,2,6,6-pentamethylpiperidine and α-cyano-β-methyl-β-[-(2,2,6,6-tetramethylpiperidin-4-yl)]-amino-acrylic acid methyl ester.

More preferably, a high molecular weight HALS to which a plurality of piperidine rings are bonded via a triazine structure, such as N,N',N'',N'''-tetrakis-[4,6-bis-[butyl-(N-methyl-2,2,6,6-tetramethylpiperidine-4-yl)amino]-triazin-2-yl]-4,7-diazadecane-1,10-diamine, a polycondensate of dibutylamine, 1,3,5-triazine.N,N'-bis(2,2,6,6-tetramethyl-4-piperidyl)-1,6-hexamethylenediamine and N-(2,2,6,6-tetramethyl-4-piperidyl)butylamine (CHIMASSORB 2020FDL manufactured by BASF), a polycondensate of dibutylamine, 1,3,5-triazine and N,N'-bis(2,2,6,6-tetramethyl-4-piperidyl)butylamine, poly[{(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino} (CHIMASSORB 944FDL manufactured by BASF), a polycondensate of 1,6-hexanediamine-N,N-bis(2,2,6,6-tetramethyl-4-piperidyl) and morpholin-2,4,6-trichloro-1,3,5-triazine, and poly[(6-morpholino-s-triazin-2,4-diyl)[(2,2,6,6,-tetramethyl-4-piperidyl)imino]-hexamethylene[(2,2,6,6-tetramethyl-4-piperidyl)imino]], or, a high molecular weight HALS to which a piperidine ring is bonded via an ester bond, such as a polycondensate of dimethyl succinate and 4-hydroxy-2,2,6,6-tetramethyl-1-piperidineethanol, and a mixed esterified product of 1,2,3,4-butanetetracarboxylic acid, 1,2,2,6,6-pentamethyl-4-piperidinol and 3,9-bis(2-hydroxy-1,1-dimethylethyl)-2,4,8,10-tetraoxaspiro[5,5]undecane, may be appropriately used. The present invention, however, is not limited thereto.

Among them, a polycondensate of dibutylamine, 1,3,5-triazine and N,N'-bis(2,2,6,6-tetramethyl-4-piperidyl)butylamine, poly[{(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino]] and a polycondensate of dimethyl succinate and 4-hydroxy-2,2,6,6-tetramethyl-1-piperidineethanol is selected, and the number average molecular weight (Mn) thereof is preferably 2,000 to 5,000.

As the radical scavenger, a compound represented by the following structure (Hα) (Trade Name: Sunlizer HA-622 manufactured by Sorting, Ltd.) and a compound represented by the following structure (Hβ) are also suitable.

[Chem. 27]

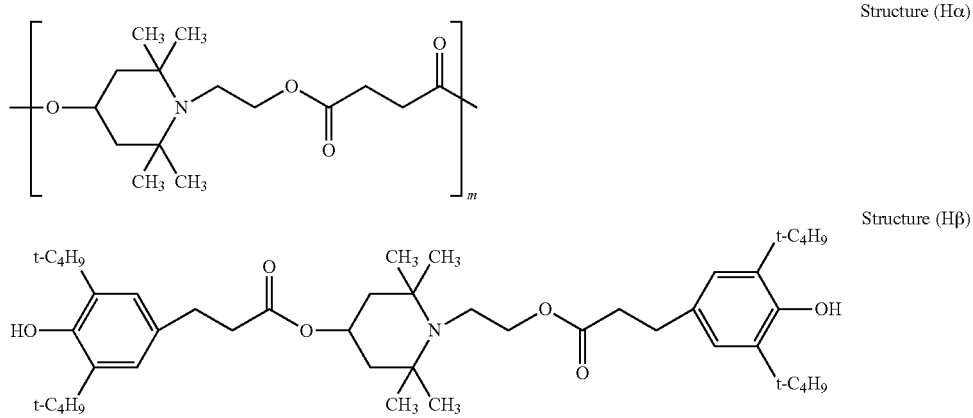

Structure (Hα)

Structure (Hβ)

Also, m in the above structure (Hα) represents 2 to 30.

The compound represented by the structure (Hα) or (Hβ) is commercially available under the trade names of CHIMASSORB 2020FDL (CAS-No. 192268-64-7), CHIMASSORB 944FDL (CAS-No. 71878-19-8) and TINUVIN 770DF (CAS-No. 52829-07-9), which were manufactured by BASF (former Ciba Specialty Chemicals Corporation), and under the trade names of Cyasorb UV-3346 (CAS-No. 82541-48-7) and Cyasorb UV-3529 (CAS-No. 193098-40-7), which were manufactured by Sun Chemical Co., Ltd.

A compound represented by the Formula (H1) is particularly preferably used as a transparent support in the present invention because it has a low basicity and has a little adverse effect in polarization performance.

[Chem. 28]

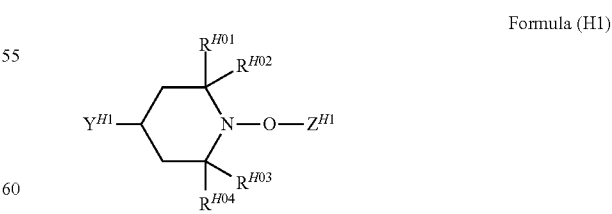

Formula (H1)

In Formula (H1), $Z^{H1}$ represents an alkyl group, a cycloalkyl group or an aryl group, $Y^{H1}$ represents a hydrogen atom or a substituent. $R^{H01}$ to $R^{H04}$ have the same meaning as $R^{H01}$ to $R^{H04}$ in Formula (H), and also have the same preferred aspects.

$Z^{H1}$ is preferably an alkyl group which may have a substituent or a cycloalkyl group, more preferably an unsubstituted alkyl group having a branched structure, an alkyl group that has an aryl group as a substituent or a cycloalkyl group, and still more preferably a cycloalkyl group. Also, the substituent possessed by $Z^{H1}$ is not particularly limited.

The alkyl group in $Z^{H1}$ preferably has 1 to 20 carbon atoms, and more preferably 1 to 14 carbon atoms. The cycloalkyl group in $Z^{H1}$ has preferably 3 to 20 carbon atoms, and more preferably 3 to 14 carbon atoms. In addition, the aryl group in $Z^{H1}$ has preferably 6 to 20 carbon atoms, and more preferably 6 to 14 carbon atoms.

$Y^{H1}$ is preferably a substituent. Although not particularly limited, the substituent in $Y^{H1}$ is preferably a substituent bonded to a piperidine ring by a nitrogen atom or an oxygen atom. Also, an amino group, a hydroxyl group and an alkoxy group which may have a substituent (having preferably 1 to 20 carbon atoms, and more preferably 1 to 14 carbon atoms), an aryloxy group (having preferably 6 to 20 carbon atoms, and more preferably 6 to 12 carbon atoms), or an acyloxy group (having preferably 2 to 20 carbon atoms, and more preferably 2 to 14 carbon atoms) is more preferred, and an alkyl group having 1 to 10 carbon atoms, an amino group having 6 to 12 carbon atoms having an aryl group or heterocyclic group as a substituent, an hydroxyl group, an alkoxy group having 1 to 10 carbon atoms or an acyloxy group having 2 to 10 carbon atoms is still more preferred.

A compound represented by Formula (H1) is characterized in that the nitrogen (N) of the piperidine ring is ether bonded to an alkyl group or aryl group which may have a substituent represented by $Z^{H1}$. In the present invention, a compound having a piperidine structure represented by Formula (H1) containing the "N—O—$Z^{H1}$" structure is referred to as "NOZ$^{H1}$ type."

In addition, a compound in which only hydrogen is bonded directly to the nitrogen (N) of the piperidine ring is referred to as a "NH type," a compound in which only a methyl group is bonded directly to the nitrogen (N) is called a "NCH$_3$ type." The NH type and NCH$_3$ type exhibit stronger basicity than the NOZ$^{H1}$ type. By using the NOZ$^{H1}$ type compound as the transparent support, it is possible to more effectively suppress the deterioration of a polarizer performance caused due to the long term use of the transparent support as inserted into a polarizing plate under a high temperature and high humidity condition.

The NOZ$^{H1}$ type compound represented by Formula (H1) is not limited as long as it has a predetermined piperidine structure. However, a compound represented by the following Formula (H1-1) or (H1-2) is preferred.

[Chem. 29]

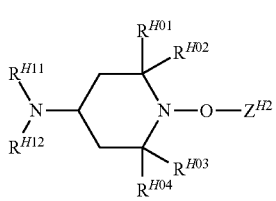

Formula (H1-1)

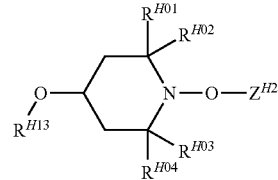

Formula (H1-2)

In Formulae (H1-1) and (H1-2), $R^{H01}$ to $R^{H04}$ have the same meaning as $R^{H01}$ to $R^{H04}$ in Formula (H) and also have the same preferred ranges. $Z^{H2}$ represents an alkyl group or an aryl group which may have a substituent. Each of $R^{H11}$ and $R^{H12}$ independently represents an alkyl group, an aryl group, an acyl group or a heterocyclic group. $R^{H13}$ represents a hydrogen atom, an alkyl group, an acyl group or an aryl group.

The preferred range of $Z^{H2}$ is the same as $Z^{H1}$ in Formula (H1).

$R^{H11}$ is more preferably a hydrogen atom or an alkyl group, still more preferably a hydrogen atom or an alkyl group having 1 to 6 carbon atoms and particularly preferably a propyl group or a butyl group.

$R^{H12}$ is more preferably an alkyl group or a heterocyclic group and particularly preferably an alkyl group having 1 to 6 carbon atoms or a heterocyclic group having 1 to 2 ring-membered nitrogen atoms. Triazine is particularly preferred.

$R^{H13}$ is preferably a hydrogen atom, an alkyl group having 1 to 12 carbon atoms, or an acyl group having 1 to 12 carbon atoms, and particularly preferably an acyl group having 1 to 12 carbon atoms.

Each of the above groups in $R^{H11}$ to $R^{H13}$ may be substituted with a substituent. Such substituent, for example, may be a substituent obtained by removing $Y^{H1}$ from Formula (H1).

The compound represented by Formula (H1-1) or (H1-2) is preferably a compound represented by any of following Formulae (H1-a) to (H1-c).

[Chem. 30]

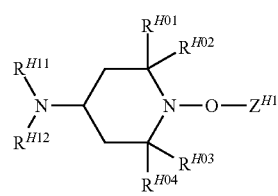

Formula (H1-a)

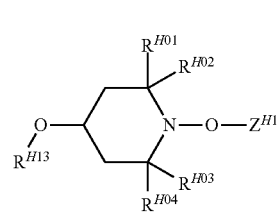

Formula (H1-b)

-continued

Formula (H1-c)

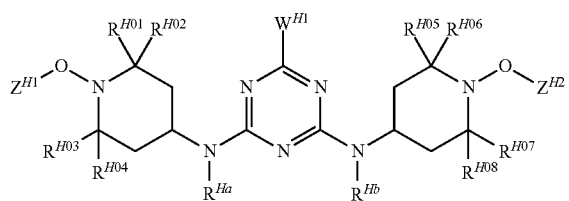

In Formulae (H1-a) to (H1-c), each of $R^{H11}$ to $R^{H13}$, $Z^{H1}$ and $Z^{H2}$ is the same as each of $R^{H11}$ to $R^{H13}$, $Z^{H1}$ and $Z^{H2}$ defined above and has also the same preferred ranges. $R^{H01}$ to $R^{H04}$ have the same meaning as $R^{H01}$ to $R^{H04}$ in Formula (H) and have also the same preferred ranges.

In Formula (H1-c), each of $R^{H05}$ to $R^{H08}$ independently represents an alkyl group, and each of $R^{Ha}$ and $R^{Hb}$ independently represents a hydrogen atom, an alkyl group, an aryl group or a heterocyclic group, and $W^{H1}$ represents a substituent.

Hereinafter, preferred examples of the compound represented by Formula (H) will be illustrated. However, the present invention is not limited thereto.

[Chem. 31]

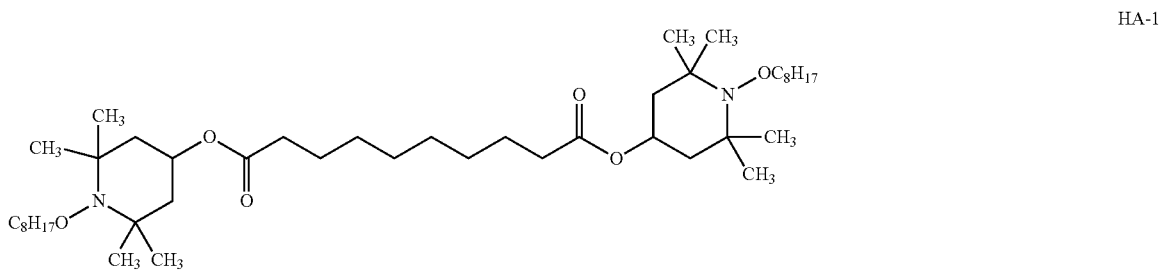

HA-1

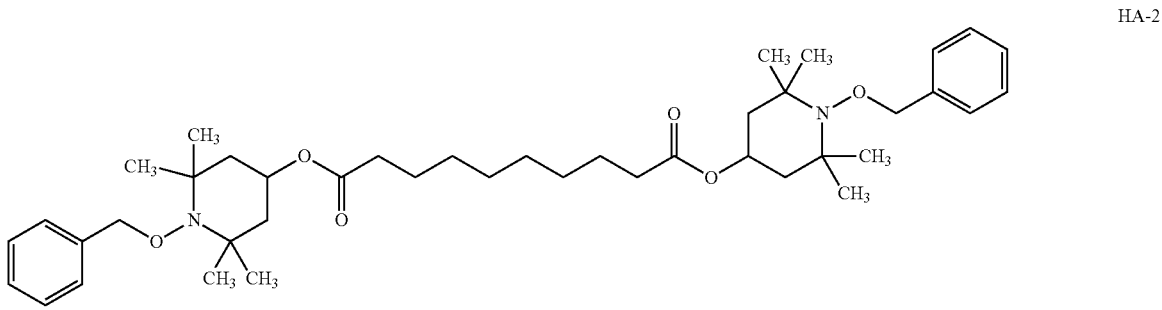

HA-2

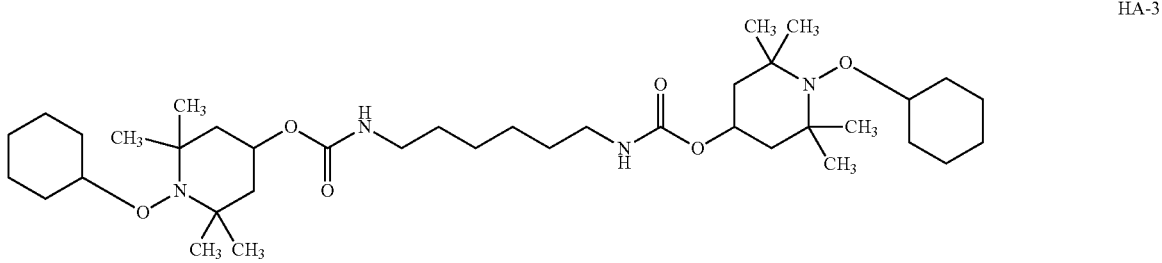

HA-3

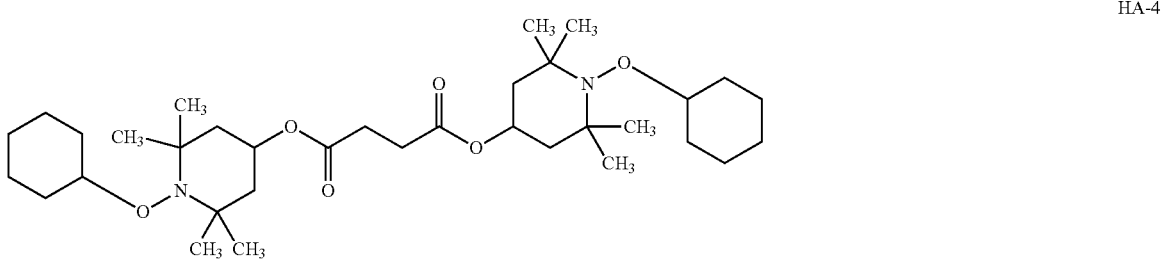

HA-4

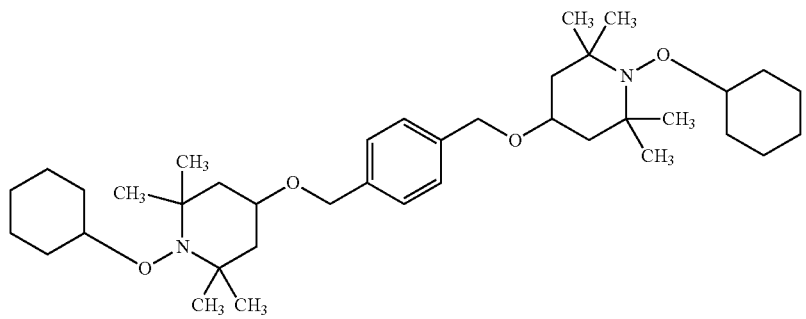
HA-5
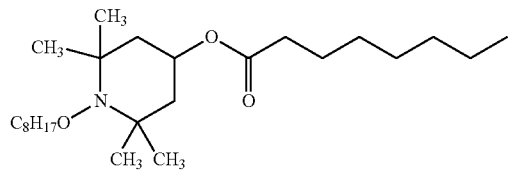
HA-6
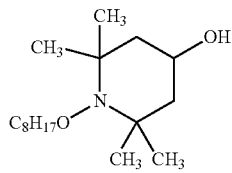
HA-7
[Chem. 32]
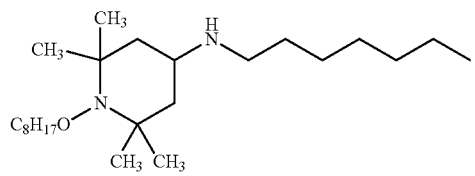
HA-8
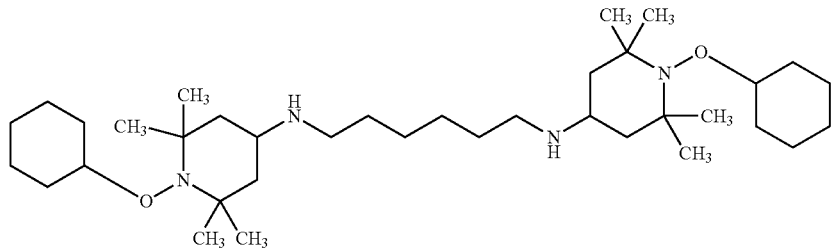
HA-9
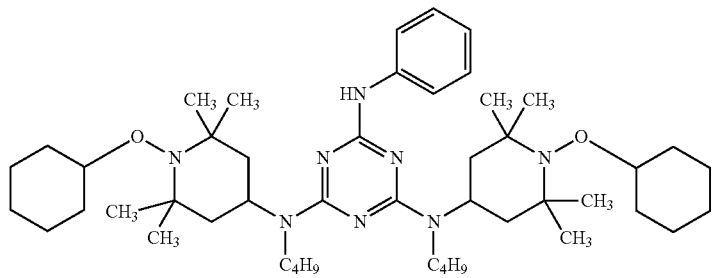
HA-10
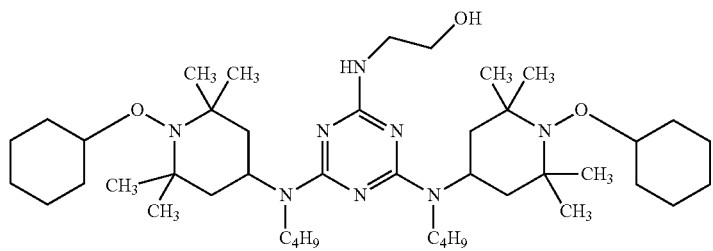
HA-11

HA-12

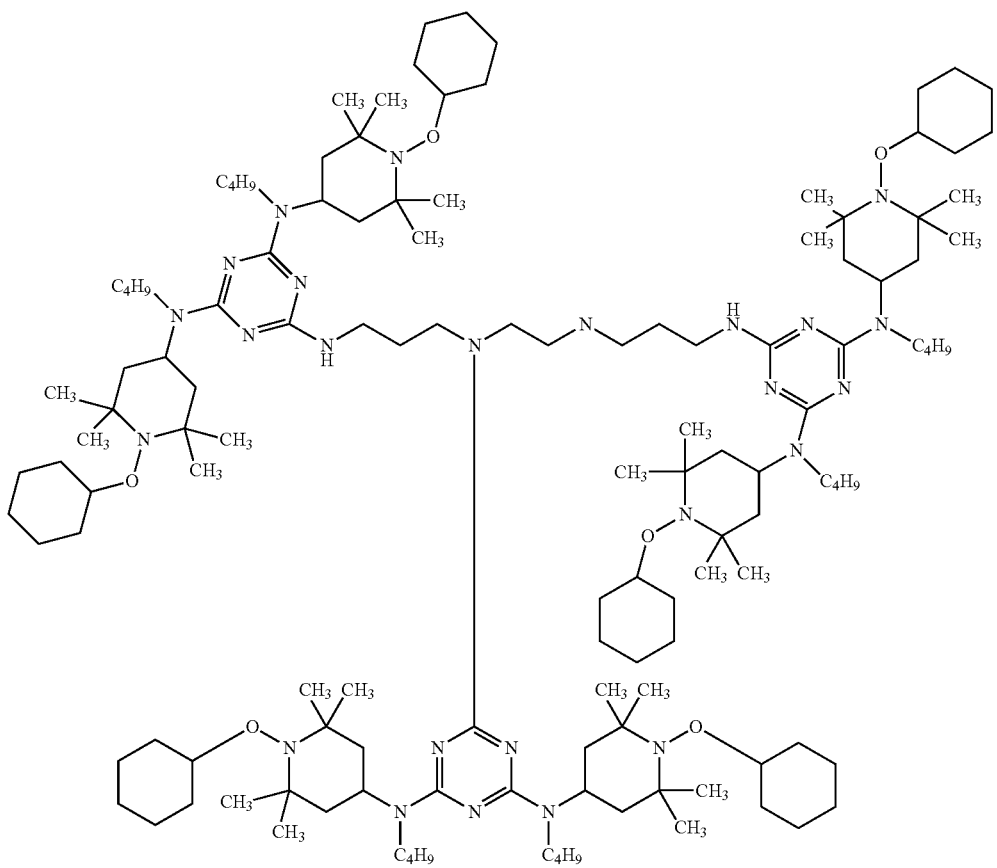

The above compounds HA-1 (Trade Name: "TINUVIN 123" manufactured by BASF, CAS-No. 129757-67-1), HA-11 (Trade Name: "TINUVIN 152" manufactured by BASF, CAS-No. 191743-75-6) and HA-12 (Trade Name: "FLAMESTAB NOR 116 FF" manufactured by BASF, CAS-No. 191680-81-6) are commercially available.

The compound represented by Formula (H) may be obtained from those commercially available as described above, but those produced by a synthesis may also be used. A method of synthesizing the compound represented by Formula (H) is not specifically limited and the compound may be synthesized by a method used in a conventional organic synthesis. Also, as a purification method, distillation, recrystallization, reprecipitation, and a method that uses a filtering agent and an absorbent may be appropriately used. Further, a compound that is commercially available at a low price may be a mixture, and not a single compound represented by Formula (H). In the present invention, anything can be used regardless of its manufacturing method, composition, melting point, acid value and the like as long as it used as a radical scavenger.

The compound represented by Formula (H) is not limited in terms of its molecular weight. In terms of suppressing volatility from the transparent support film, it preferably has large molecules to some extent like the molecular weight below. By adjusting the molecular weight to an appropriate level, it is possible to obtain a film having superior compatibility with the transparent support and a high transparency.

Thus, the molecular weight of the compound represented by Formula (H) is preferably 300 to 100,000, more preferably 500 to 50,000 and particularly preferably 700 to 30,000.

Timing when the compound represented by Formula (H) is added in the transparent support film is not particularly limited as long as it is added during film manufacturing. For example, it may be added at the time of synthesizing the transparent support and a solvent and may be added after preparing a mixed solution of the transparent support and the solvent.

The content of the compound represented by Formula (H) in the transparent support film is preferably from 0.0001 parts by mass to 5.0 parts by mass relative to 100 parts by mass of the transparent support. By limiting the content of the compound represented by Formula (H) in the transparent support film within the above range, it is possible to obtain a sufficient antioxdation effect and a polarizer durability. More preferably, the content of the compound represented by Formula (H) in the transparent support film is 0.001 parts by mass to 2.0 parts by mass and more preferably 0.01 parts by mass to 1.0 part by mass relative to 100 parts by mass of the transparent support.

(UV Absorber)

In a preferred aspect, a film containing a UV absorber may be used as a transparent support in terms of retarding the deterioration of a polarizing plate, a liquid crystal, etc. A preferred UV absorber exhibits a superior absorption to UV light having a wavelength of 370 mu or less and, in terms of sound display properties, exhibits a low absorption to a visible light having a wavelength of 400 nm or greater. A UV absorber used in the present invention is preferably at least one selected from hindered phenolic compounds, hydroxy benzophenone compounds, benzotriazole compounds, salicylic ester compounds, benzophenone compounds, cyanoacrylate compounds and nickel complex salt compounds.

The hindered phenol compound is not specifically limited. However, it is preferably at least one selected from 2,6-di-tert-butyl-p-cresol, pentaerythrityl-tetrakis [3-(3,5-di-tert-butyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl) benzene and tris-(3,5-di-tert-butyl-4-hydroxybenzyl)-isocyanurate.

The benzotriazole compound is not specifically limited. However, it is preferably at least one selected from 2-(2'-hydroxy-5'-methylphenyl)benzotriazole, 2,2-methylenebis [4-(1,1,3,3-tetramethylbutyl)-6-(2H-benzotriazol-2-yl)phenol], (2,4-bis-(n-octylthio)-6-(4-hydroxy-3,5-di-tert-butylamino)-1,3,5-triazine, triethyleneglycol-bis[3-(3-tert-butyl-5-methyl-4-hydroxyphenyl)propionate], N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, and pentaerythrityl-tetrakis [3-(3,5-di-tert-butyl-4-hydroxyphenyl)propionate, 2-(3,5-di-tert-amyl-2-hydroxyphenyl)benzotriazole, and 2-(2H-benzotriazole-2-yl)-6-(1-methyl-1-phenylethyl)-4-(1,1,3,3-tetramethylbutyl) phenol].

As these compounds, preferred are commercially available, such as TINUVIN 99-2, TINUVIN 109, TINUVIN 171, TINUVIN 320, TINUVIN 326, TINUVIN 327, TINUVIN 328, TINUVIN 329, TINUVIN 343, TINUVIN 900, TINUVIN 928, TINUVIN P and TINUVIN PS, all of which were manufactured by BASF.

The content of the UV absorber in the transparent support is preferably 1 ppm to 10%, more preferably 1 ppm to 5.0% and still more preferably 10 ppm to 30%.

(Matting Agent)

As a transparent support, a film containing a matting agent may be used in terms of a slip property and stable production of the film. The matting agent may be an inorganic compound-based matting agent or an organic compound-based matting agent.

The inorganic compound-based matting agent is preferably at least one selected from inorganic compounds containing silicon (for example, silicon dioxide, calcined calcium silicate, hydrated calcium silicate, aluminum silicate, and magnesium silicate), titanium oxide, zinc oxide, aluminum oxide, barium oxide, zirconium oxide, strontium oxide, antimony oxide, tin oxide, tin-oxdie.antimony, calcium carbonate, talc, clay, calcined kaolin and calcium phosphate. More preferred is at least one selected from inorganic compounds containing silicon and a zirconium oxide. Further, in terms of further reducing the turbidity of the transparent support, silicon dioxide is particularly preferred.

As fine particles of silicon dioxide, products available under trade names, such as Aerosil R972, R974, R812, 200, 300, R202, OX5 and TT600 (manufactured by Nippon Aerosil Co., Ltd.), may be used. As fine particles of zirconium oxide, products available under trade names, such as Aerosil R976 and R811 (manufactured by Nippon Aerosil Co.), may be used.

The organic compound-based matting agent is not specifically limited, but is preferably at least one selected from silicone resins, fluorine resins and acrylic resins. Of these, silicone resins are preferred. Of silicone resins, a 3D network structure is preferred. For example, products available under the trance names of Tospearl 103, Tospearl 105, Tospearl 108, Tospearl 120, Tospearl 145, Tospearl 3120 and Tospearl 240 (all manufactured by Toshiba Silicone Co.) may be used.

Timing when the matting agent is added to the transparent support is not particularly limited as long as it is added during film manufacturing. For example, it may be contained at the stage of mixing a material for the transparent film and a solvent, or after preparing a mixed solution of the transparent support and the solvent.

Also, it may be added and mixed before casting a dope, and the mixing is preferably carried out by installing a screw-type kneader on-line. Specifically, it is preferable to use a static mixer, such as a line mixer. As the in-line mixer, for example, a static mixer SWJ (Toray static pipe mixer, Hi-Mixer manufactured by Toray Engineering) is preferred.

For the inline addition, the method described in Japanese Patent Application Laid-Open No. 2003-053752 may be used in order to resolve the problems of uneven density, particle aggregation, etc. In addition, in order to provide a transparent support in which additives are less bled out, no delimitation occurs, and slip property and transparency is superior, the method described in Japanese Patent Application Laid-Open No. 2003-014933 may also be used.

The content of the matting agent in the transparent support is particularly preferably 0.05 to 1.0% by mass. By limiting to such range, the haze in the film does not increase. When used in a liquid crystal display device in actuality, it contributes to suppressing contrast decrease and bright spot generation. It is also possible to realize the friction and scratch resistance. In these respects, the content of the matting agent in the transparent support is particularly preferably 0.05 to 1.0% by mass.

(Peeling Accelerator)

In a preferred aspect, a film containing a peeling accelerator may be used in a transparent film. For instance, compounds disclosed in paragraphs [0048] to [0081] of Japanese Patent Application Laid-Open No. 2006-45497, paragraphs [0077] to [0086] of Japanese Patent Application Laid-Open No. 2002-322294, and paragraphs [0030] to [0056] of Japanese Patent Application Laid-Open No. 2012-72348 may be preferred.

(Organic Acid)

In a preferred aspect, a film containing an organic acid may be used as a transparent support.

An organic acid includes a compound disclosed in paragraphs [0079] to [0082] of Japanese Patent Application Laid-Open No. 2002-322294, may be used. Further examples thereof may include a citric acid, an oxalic acid, an adipic acid, a succinic acid, a malic acid and a tartaric acid.

As further organic acids, amino acids also are preferred, such as asparagine, aspartic acid, adenine, alanine, β-alanine, arginine, isoleucine, glycine, glutamine, glutamic acid, serine, tyrosine, tryptophan, threonine, norleucine, valine, phenylalanine, methionine, lysine and leucine.

The organic acid may be used as a free acid, and includes alkali metal salts, alkaline earth metal salts, and salts of heavy metals containing a transition metal. Of the metal of each salt, alkali metals include lithium, potassium, sodium, etc., alkaline earth metals include calcium, magnesium, barium, strontium, etc. Heavy metals containing a transition metal include aluminum, zinc, tin, nickel, iron, lead, copper, silver, etc. Salts of substituted or unsubstituted amines having 5 or less carbon atoms are preferred. Amine forming a salt includes ammonium, methyl amine, ethylamine, propylamine, butylamine, dimethylamine, trimethylamine, triethylamine, hydroxyethylamine, bis(hydroxyethyl)amine, and tris(hydroxyethyl) amine. Preferred metals include sodium among alkali metals, and calcium and magnesium among alkaline earth metals. These alkali metals and alkaline earth metals may be used in singular form or two or more may be used in combination. The alkali metal and the alkaline earth metal may be used together.

(Polycarboxylic Acid Derivative)

In a preferred aspect, a film containing a polycarboxylic acid (multivalent carboxylic acid) derivative may be used as a transparent support.

The polycarboxylic acid derivatives are preferably ester compounds and amide compounds.

The component of the carboxylic acid is a polycarboxylic acid, and the carboxylic acid may be any of aliphatic carboxylic acid or aromatic carboxylic acid. The aliphatic carboxylic acid is preferred. The aliphatic carboxylic acid may be saturated or unsaturated, may be a straight, branched or cyclic aliphatic carboxylic acid, and may have a substituent. The substituent includes an alkyl group, an alkenyl group, an aryl group, a hydroxyl group, an amino group, an alkoxy group, an alkenyloxy group, an acyloxy group and an acylamino group.

Aromatic carboxylic acids include a phthalic acid, a terephthalic acid, an isophthalic acid, and a1,3,5-benzene tricarboxylic acid, and aliphatic carboxylic acids include an oxalic acid, a malonic acid, a succinic acid, a glutaric acid, an adipic acid, and a sebacic acid. As aliphatic carboxylic acids having a substituent, examples thereof may include a malic acid, a citric acid and a tartaric acid.

In polycarboxylic acid ester, a group bonded to an oxygen atom of the —C(=O)—O— ester functional group which is an alcohol component is preferably a substituted or unsubstituted alkyl group [such as methyl, ethyl, isopupiru, t-butyl, 2-ethylhexyl, and —CH$_2$CH$_2$O—(CH$_2$CH$_2$)n-C$_2$H$_5$] or an alkenyl group (such as vinyl, allyl, 2-methyl-2-propenyl, 2-butenyl and oleyl). The total carbon number of the alcohol component (the group bonded to an oxygen atom) is preferably 1 to 200, more preferably 1 to 100, and still more preferably 1 to 50. The substituent which may be possessed by the alkyl group and the alkenyl group is preferably an alkoxy group, an alkenyloxy group, a hydroxyl group or an acyloxy group and more preferably an alkoxy group. The alkoxy group or the alkenyloxy group preferably includes a (poly)oxyalkylene group, and particularly the (poly)oxyalkylene group is preferably a poly(oxyethylene) group, a (poly)oxypropylene group, or a (poly)oxybutylene group.

Also, the raw material of alcohol in the alcohol component may be monohydric or polyhydric. The polyhydric alcohol includes ethylene glycol, propylene glycol, glycerin and pentaerythritol, and those in which the hydroxyl group moiety (—OH) is a polyoxyalkylene group [such as —(OCH$_2$CH$_2$,)n-OH and —(OC$_3$H$_6$)nOH] are also preferred.

In polycarboxylic acid amides, an amine compound which is the amine component may be primary or secondary and is not particularly limited. A substituent substituted on the nitrogen atom in the —C(=O)—N< amide functional group is preferably an alkyl group [such as methyl, ethyl, isopropyl, t-butyl, 2-ethylhexyl, and —CH$_2$CH$_2$O—(CH$_2$CH$_2$)n-C$_2$H$_5$] and an alkenyl group (such as vinyl, allyl, 2-methyl-2-propenyl and 2-butenyl). The total carbon number of the amine compound which is the amine component is preferably 1 to 200, more preferably 1 to 100 and still more preferably 1 to 50. The substituent which may be possessed by the alkyl group and the alkenyl group is preferably an alkoxy group, an alkenyloxy group, a hydroxyl group, an acyloxy group, an amino group and an acylamino group and more preferably an alkoxy group. The alkoxy group or the alkenyloxy group preferably includes a (poly)oxyalkylene group, and particularly the (poly)oxyalkylene group is preferably a poly(oxyethylene) group, a (poly)oxypropylene group, and a (poly)oxybutylene group. These polyoxyalkylene moieties preferably include a polyoxyalkylene group branched through glycerin.

Also, the amine compound as a raw material for the amine component may be monovalent or polyvalent.

Among the polycarboxylic acid derivatives, an organic acid monoglyceride having an unreactive and releasable carboxyl group is particularly preferred. Commercially available products thereof include Poem K-37V (glycerin citric acid oleic acid ester) manufactured by Riken Vitamin Co., Ltd. and STEP SS (glyceryl stearate/palmitate succinate ester) manufactured by Kao Corporation.

(Surfactant)

In a preferred aspect of the present invention, a film conning a surfactant may be used in the transparent support.

As the surfactant, compounds described in paragraphs [0050] and [0051] of Japanese Patent Application Laid-Open No. 2006-45497, and paragraphs [0127] and [0128] of Japanese Patent Application Laid-Open No. 2002-322294, may preferably be used. Specific examples of a nonionic surfactant may include polyoxyethylene alkyl ethers, polyoxyethylene alkylphenyl ethers, polyoxyethylene-polyoxypropylene glycol, polyhydric alcohol fatty acid partial esters, polyoxyethylene polyhydric alcohol fatty acid partial esters, polyoxyethylene fatty acid esters, polyglycerol fatty acid esters, fatty acid diethanolamides, triethanolamine fatty acid partial esters and polyether amines. In addition, commercially available products include Nymeen L-202, Star Home DO and Star Home DL (NOF).

(Chelating Agent)

In a preferred aspect of the present invention, a film containing a chelating agent may be used in the transparent support.

The chelating agent is a compound that binds with (chelate) polyvalent metal ions, such as metal ions including iron ions or alkaline earth metal ions including calcium ions. As the chelating agent, any of different chelating agents represented by amino polycarboxylic acids, amino polyphosphonic acids, alkyl phosphonic acids and phosphonocarboxylic acids. As the chelating agent, it is possible to use the compounds disclosed in Japanese Patent Application Laid-Open No. 6-8956, Japanese Patent Application Laid-Open No. 11-190892, Japanese Patent Application Laid-Open No. 2000-18038, Japanese Patent Application Laid-Open No. 2010-158640, Japanese Patent Application Laid-Open No. 2006-328203, Japanese Patent Application Laid-Open No. 2005-68246 and Japanese Patent Application Laid-Open No. 2006-306969.

Specific examples may include ethylenediaminetetraacetic acid, hydroxyethylethylenediaminetriacetic acid, diethylenetriaminepentaacetic acid, nitrilotriacetic acid, triethylenetetraminehexaacetic acid, cyclohexane diamine tetraacetic acid, hydroxyethyl iminodiacetic acid, ethylene glycolbis(2-aminoethyl ether)tetra acid, 1,3-diaminopropane tetraacetic acid, phosphonic acid, 1-hydroxy-1,1-diphosphonic acid, nitrilo-N,N,N-trimethylene phosphonic acid, ethylenediamine-N,N,N,N-tetramethylene phosphonic acid, ethylenediamine-di(o-hydroxyphenylacetic acid), DL-alanine-N,N-diacetic acid, aspartic acid-N,N-diacetic acid, glutamic acid-N,N-diacetic acid, serine-N,N-diacetate, polyacrylic acid, isoamylene-maleic acid copolymer, acrylic acid-maleic acid copolymer, acrylic acid-methacrylic acid copolymer, silicic acid, gluconic acid, hydroxybenzyl iminodiacetic acid, and iminodiacetic acid. Commercial products thereof are available from Chelest Corp, Nagase Chemtex Corporation, Dojindo Laboratories, etc.

It is also preferred to use an oil soluble chelating agent. Commercially available products, such as Tekuran DO (by Nagase Chemtex Corp) and Chelest MZ-2 and Chelest MZ-8 (by Chelest Corp), may be used.

[Hard Coat Film]

The hard coat film according to the present invention is manufactured according to the hard coat film manufacturing method of the present invention.

Generally, the basic form of the hard coat film according to the present invention is provided with a hard coat layer on a transparent support.

Examples of a preferred layer constitution of the hard coat film according to the present invention are illustrated below, but not particularly limited thereto.

Support/hart coat layer
Support/hart coat layer/low refractive index layer
Support/hart coat layer/antiglare layer (antistatic layer)/low refractive index layer
Support/hart coat layer/antiglare layer/antistatic layer/low refractive index layer
Support/hart coat layer/antistatic layer/anti-glare layer/low refractive index layer
Support/hart coat layer/(antistatic layer)/antiglare layer/low refractive index layer
Support/hart coat layer/high refractive index layer/antistatic layer/low refractive index layer
Support/hard coat layer/high refractive index layer/(antistatic layer)/low refractive index layer
Support/hard coat layer/antistatic layer/high refractive index layer/low refractive index layer
Support/hard coat layer/intermediate refractive index layer/high refractive index layer (antistatic layer)/low refractive index layer
Support/hard coat layer/intermediate refractive index layer (antistatic layer)/high refractive index layer/low refractive index layer
Support/hard coat layer (antistatic layer)/intermediate refractive index layer/high refractive index layer/low refractive index layer
Support/antistatic layer/hard coat layer/intermediate refractive index layer/high refractive index layer/low refractive index layer
Antistatic layer/support/hard coat layer/intermediate refractive index layer/high refractive index layer/low refractive index layer Herein, the antistatic layer and the antiglare layer may have hard coatability.

The film thickness of the hard coat layer according to the present invention may be selected according to the desired hardness, and may preferably range between 1 μm and 50 μm. This is because forming the hard coat layer thick does not cause a handling problem due to a small amount of curling in the hard coat film of the present invention. Also when used as a polarizer protective film, the hard coat layer is preferably designed to a thickness of 3 μm to 10 μm.

In the hard coat film according to the present invention, the thickness ratio (tH/tT) of the transparent support thickness (tT) to the hard coat layer thickness (tH) is preferably 0.1 to 1.0 and more preferably 0.2 to 0.7.

[Low Refractive Index Layer]

In the present invention, a low refractive index layer may be formed on the hard coat layer in order to give an effect of reflectivity reduction. The low refractive index layer has a lower refractive index than the hard coat layer, and preferably has a thickness of 50 nm to 200 nm, more preferably 70 nm to 150 nm and most preferably 80 nm to 120 nm.

The low refractive index layer has a lower refractive index than the layer right below, and is preferably 1.20 to 1.55, more preferably 1.25 to 1.46, and particularly preferably 1.30 to 1.40. The thickness of the low refractive index layer is preferably 50 to 200 nm and more preferably 70 to 100 nm. The low refractive index layer is preferably formed by curing a curable composition suitable for forming a low refractive index layer.

Examples of preferred curable compositions for the formation of the low refractive index layer include:

(1) a composition comprising a fluorine-containing compound having a cross-linkable or polymerizable functional group;

(2) a composition comprising a hydrolysis condensation product of a fluorine-containing organosilane material as the main component; and (3) a composition comprising a monomer having two or more ethylenically unsaturated groups and inorganic fine particles (particularly preferred are inorganic fine particles having a hollow structure).

It is also preferred for the compositions (1) and (2) to comprise inorganic fine particles. The use of inorganic fine particles having a low refractive index and a hollow structure is particularly preferred in view of the lowered refractive indices, the amount of inorganic fine particles added and the adjustment of refractive indices.

(1) Fluorine-Containing Compound Having Cross-Linkable or Polymerizable Functional Group As the fluorine-containing compound having a cross-linkable or polymerizable functional group, one example is a copolymer of a fluorine-containing monomer and a monomer having a cross-linkable or polymerizable functional group. Specific examples of such fluorine-containing polymer are disclosed in Japanese Patent Application Laid-Open No. 2003-222702 and Japanese Patent Application Laid-Open No. 2003-183322.

The polymer may be used in combination with a curing agent that suitably has a polymerizable unsaturated group, as described in Japanese Patent Application Laid-Open No. 2000-17028. The polymer may also be used in combination with a compound having a fluorine-containing polyfunctional polymerizable unsaturated group, as described in Japanese Patent Application Laid-Open No. 2002-145952. Examples of a compound having a polyfunctional polymerizable unsaturated group may include a monomer having two or more ethylenically unsaturated groups, as already described as the curable resin compound of the antiglare layer. Hydrolysis condensation products of the organosilanes described in Japanese Patent Application Laid-Open No. 2004-170901 are also preferred, and hydrolysis condensation products of (meth)acryloyl group-containing organosilanes are particularly preferred. These compounds are preferred because the use of the compounds having a polymerizable unsaturated group in combination with the polymer main body has a great effect in improving the scratch resistance.

When the polymer alone is not sufficiently curable, it may be needed to be mixed with a cross-linkable compound to exhibit curability as required. In the case of the polymer containing a hydroxyl group in the main body thereof, it is preferred to use various amino compounds as curing agents. The amino compounds used as cross-linkable compounds contain two or more same or different groups selected from hydroxyalkylamino groups and alkoxyalkylamino groups.

Specific examples of such amino compounds may include melamine compounds, urea compounds, benzoguanamine compounds, and glycoluril compounds. These compounds are preferably cured using organic acids or salts thereof.

(2) Composition Comprising Hydrolysis Condensation Product of Fluorine-Containing Organosilane Material as Main Component The composition comprising a hydrolysis condensation product of a fluorine-containing organosilane compound as the main component is also preferred because it has low refractive index and exhibits high hardness on the surface of a coated film. Preferred is a condensation product of a compound containing a hydrolyzable silanol group at one or both ends of a fluorinated alkyl group and tetraalkoxysilane. Specific compositions are described in Japanese Patent Application Laid-Open No. 2002-265866 and Japanese Patent No. 317152.

(3) Composition Comprising Monomer Having Two or More Ethylenically Unsaturated Groups and Inorganic Fine Particles Having Hollow Structure Another preferred embodiment is a low refractive index layer formed by low refractive index particles and a binder. The low refractive index particles may be organic or inorganic and preferably those having cavities therein. Specific examples of such hollow particles may include silica particles described in Japanese Patent Application Laid-Open No. 2002-79616. The refractive index of the particles is preferably 1.15 to 1.40, and more preferably 1.20 to 1.30. The binder may, for example be a monomer having two or more ethylenically unsaturated groups mentioned in the above page describing the antiglare layer.

It is preferred to add the above-described photo-radical polymerization initiator or thermal radical polymerization initiator to the composition for the low refractive index layer used in the present invention. When the composition contains a radical polymerizable compound, the polymerization initiator may be used in an amount of 1 to 10 parts by mass and preferably 1 to 5 parts by mass relative to the compound.

In the low refractive index layer used in the present invention, inorganic particles may be used together. In order to give an effect of scratch resistance, it is possible to use fine particles having a particle diameter corresponding to 15% to 150%, preferably 30% to 100% and more preferably 45% to 60% of the thickness of the low refractive index layer.

Suitable additives known in the art, such as polysiloxane-based or fluorine-based antifouling agents and slip agents, may be suitably added to the low refractive index layer of the present invention to impart characteristics, such as antifouling, water resistance, chemical resistance and slip properties.

As additives having a polysiloxane structure, preferred are reactive group-containing polysiloxanes {trade names such as "KF-100T," "X-22-169AS," "KF-102," "X-22-37011E," "X-22-164B," "X-22-5002," "X-22-173B," "X-22-174D," "X-22-167B" and "X-22-161AS" (made by Shin-Etsu Chemical Co., Ltd.); "AK-5," "AK-30" and "AK-32" (made by Toagosei Co., Ltd.); and "Silaplain FM0725" and "Silaplain FM0721" (made by Chisso Corporation).} The use of the silicone compounds described in Tables 2-3 in Japanese Patent Application Laid-Open No. 2003-112383 is also preferred.

The fluorine-based compounds preferably have a fluoroalkyl group. The fluoroalkyl group preferably has 1 to 20 carbon atoms and more preferably 1 to 10 carbon atoms. The fluoroalkyl group may be straight [e.g., $-CF_2CF_3$, $-CH_2(CF_2)_4H$, $-CH_2(CF_2)_8CF_3$ and $-CH_2CH_2(CF_2)_4H$], branched [e.g., $CH(CF_3)_2$, $CH_2CF(CF_3)_2$, $CH(CH_3)CF_2CF_3$ and $CH(CH_3)(CF_2)_5CF_2H$] or alicyclic (preferably 5-membered or 6-membered ring, such as a perfluorocyclohexyl group, a perfluorocyclopentyl group or an alkyl group substituted with them), or may have an ether bond (e.g., $CH_2OCH_2CF_2CF_3$, $CH_2CH_2OCH_2C_4F_8H$, $CH_2CH_2OCH_2CH_2C_8F_{17}$ and $CH_2CH_2OCF_2CF_2OCF_2CF_2H$). Two or more of the fluoroalkyl groups above may be included in the same molecule.

It is preferred that the fluorine-based compounds have one or more substituents contributing to the formation of bonds and compatibility with the coating of the low refractive index layer. The substituents may be the same as or different from each other and the compound preferably has two or more substituents. Examples of preferred substituents may include acryloyl groups, methacryloyl groups, vinyl groups, aryl groups, cinnamoyl groups, epoxy groups, oxetanyl groups, hydroxyl groups, polyoxyalkylene groups, carboxyl groups and amino groups. The fluorine-based compounds may form polymers or oligomers with compounds containing no fluorine atom. There is no particular restriction on the molecular weight of the fluorine-based compounds. The content of fluorine atoms in the fluorine-based compounds is not particularly limited but is preferably 20% by mass or more, particularly preferably 30% to 70% by mass and most preferably 40% to 70% by mass. Examples of preferred fluorine-based compounds may include, but are not limited to; R-2020, M-2020, R-3833, M-3833, OPTOOL DAC (trade names of Daikin Industries Ltd.); and Megafac F-171, F-172, F-179A, DEFENSA MCF-300 and MCF-323 (trade names of DIC Corporation).

These polysiloxane-based fluorinated compounds or compounds having a polysiloxane structure are preferably added in an amount of 0.1% to 10% by mass and particularly preferably 1% to 5% by mass, based on the total solid content in the low refractive index layer.

[Coating Method]

Each of the layers on the hard coat film according to the present invention can be formed by the following well-known coating methods, but not limited to: dip coating, air knife coating, curtain coating, roller coating, wire bar coating, gravure coating, slide coating, extrusion coating (die coating) (see the specification of Japanese Patent Application Laid-Open No. 2003-164788), and microgravure coating. Of these, microgravure coating and die coating are preferred.

[Drying and Curing Conditions]

Preferred examples of a method of drying and curing used when forming a layer by coating, like the hard coat layer of the present invention, will be described hereinafter.

In the present invention, curing is effective by performing heat treatment before, simultaneously with or after irradiation with ionizing radiation.

Some patterns of manufacturing process are illustrated below, but the present invention is not limited thereto. (In the following, "-" indicates that heat treatment is not performed.)

Before irradiation→Simultaneously with irradiation-→After irradiation (1) Heat treatment→Curing by ionizing radiation→-

(2) Heat treatment→Curing by ionization radiation-→Heat treatment (3) -→Curing by ionization radiation→Heat treatment It is also preferred to perform heat treatment simultaneously with curing by ionization radiation.

In the present invention, it is preferred to perform heat treatment in combination with irradiation with ionizing radiation, as described above. Although not particularly restricted as long as the layers constituting the hard coat film, including the support and the hard coat layer, are not damaged, the heat treatment is performed preferably at a temperature of 40° C. to 150° C. and more preferably 40° C. to 80° C.

Although it varies depending on various factors, such as the molecular weight of the component used, the interaction with other components and the viscosity, the time required for the heat treatment is 15 sec to 1 hr, preferably 20 sec to 30 min and most preferably 30 sec to 5 min.

Although not particularly limited in terms of type, the ionization radiation may be, for example, X-ray, electron beam, UV light, visible light and infrared light. UV light is widely used. For example, when a coating layer is UV curable, it is preferred to cure each layer by irradiating with a UV light dose of 10 mJ/cm$^2$ to 1,000 mJ/cm$^2$ using a UV lamp. Upon irradiation, the light may be applied in a single dose or in divided doses. It is particularly preferred to irradiate UV light in two or more divided doses in terms of reducing performance non-uniformity in the in-plane of the coating film and improving curling. It is preferred that a low UV light dose of 150 mJ/cm$^2$ or less is first irradiated at an initial stage, and a high UV light does of 50 mJ/cm$^2$ or greater is irradiated at a later stage. It is preferred that the dose of UV light irradiated at the later stage is higher than that irradiated at the initial stage.

[Polarizing Plate]

The hard coat film according to the present invention provided in a polarizing plate comprising a polarizing film and protective films on its both sides is used in one or both of the protective films to thereby give hard coatability to the polarizing plate.

The hard coat film of the present invention may be used as a protective film for one side and a general cellulose acetate film may be used as a protective film for the other side. As a protective film for the other side, a cellulose acetate film that is prepared by a solution film-forming process and stretched at a drawing ratio of 10% to 100% in the width direction of a roll film is preferred.

In a preferred aspect, of the two protective films on the polarizing film, the other film than the hard coat film of the present invention is an optical compensation film having an optical compensation layer including an optically anisotropic layer. The use of the optical compensation film (phase difference film) can improve the viewing angle of a screen of a liquid crystal display. Although the optical compensation film may be any of those known in the art, preferred is the optical compensation film described in Japanese Patent Application Laid-Open No. 2001-100042 in terms of widening the viewing angle.

As polarizing films, iodine-based polarizing films, dye-based polarizing films using dichroic dyes or polyene-based polarizing films have been known. The iodine-based polarizing films and dye-based polarizing films are generally prepared using polyvinyl alcohol films.

The polarizing film may also be any of those known in the art or may be one that is cut from a lengthy polarizing film whose absorption axis is neither parallel nor perpendicular to the longitudinal direction. The lengthy polarizing film is prepared by the following procedure.

A continuously supplied polymer film, such as a polyvinyl alcohol film, is stretched by applying tension thereto while maintaining both ends of the polymer film using a retaining means. The polymer film is stretched by at least 1.1 to 20.0 times in the width direction of the film. The difference in the running speed between the longitudinal directions of the retaining apparatus at both ends of the film is maintained within 3%. The stretching is performed by bending the running direction of the film in a state in which both ends of the film is maintained such that the running direction of the film at the outlet of the process for maintaining both ends of the film is inclined at an angle of 20° to 70° relative to the actual stretching direction of the film. It is particularly preferred to adjust the inclination angle to 45° in terms of productivity.

A detailed description of a method of stretching a polymer film can be found in paragraphs [0020] to [0030] of Japanese Patent Application Laid-Open No. 2002-86554.

[Image Display Device]

The hard coat film or polarizing plate of the present invention can be used in image display device, such as liquid crystal display device (LCD), plasma display panel (PDP), electroluminescence display (ELD) and cathode ray tube display device (CRT).

Particularly preferred is a liquid crystal display device including a liquid crystal cell, a polarizing plate of the present invention disposed on at least one side of the liquid crystal cell, and a hard coat film of the present invention disposed on its outermost surface.

EXAMPLES

The present invention will be described in detail with reference to the following examples but is not limited thereto.

(Preparation of Coating Liquid for Hard Coat Layer)

Each component was added based on its composition shown in Tables 6-8 below and filtration was performed using a polypropylene filter having a hole diameter of 10 μm to prepare a coating liquid for a hard coat layer A01-A39, A50 and A51 (hard coat layer forming composition). The numerical values in the tables represent the "solid content ratio (mass %) in each component."

As for a material diluted in a solvent for use as ELECOM V-8802, it was added in an amount controlled such that its solid content ratio reaches the value listed in the tables. For the solvent, it is controlled such that its ratio reaches the value listed in the tables to prepare a coating liquid in which the solid content is 35% by mass.

TABLE 6

| | Coating liquid for hard coat layer | A01 | A02 | A03 | A04 | A05 | A06 | A07 |
|---|---|---|---|---|---|---|---|---|
| (a) Component | 3,4-epoxy cyclohexylmethyl methacrylate | | | | 10.00% | 20.00% | 30.00% | 30.00% |
| | 3,4-epoxy cyclohexyl methacrylate | | | 30.00% | | | | |
| | 3,4-epoxy cyclohexylbutyl | 30.00% | | | | | | |

TABLE 6-continued

| | | | | | | | | |
|---|---|---|---|---|---|---|---|---|
| | | methacrylate | | | | | | |
| | | epoxy compound A | | 30.00% | | | | |
| (b) Component | DPHA | | 65.95% | 65.95% | 65.95% | 85.95% | 75.95% | 65.95% | 55.95% |
| | ATMMT | | | | | | | | 10.00% |
| | UV1700B | | | | | | | | |
| (c) Component | IRGACURE127 | | 3.00% | 3.00% | 3.00% | 3.00% | 3.00% | 3.00% | 3.00% |
| (d) Component | IRGACURE290 | | 1.00% | 1.00% | 1.00% | 1.00% | 1.00% | 1.00% | 1.00% |
| | IRGACURE270 | | | | | | | | |
| | B2380 | | | | | | | | |
| | CGI 725 | | | | | | | | |
| (e) Component | ELECOM V-8802 | | | | | | | | |
| | MiBK-ST | | | | | | | | |
| Wind unevenness inhibitor | FP-1 | | 0.05% | 0.05% | 0.05% | 0.05% | 0.05% | 0.05% | 0.05% |
| Solvent | MEK | | 50% | 50% | 50% | 50% | 50% | 50% | 50% |
| | MiBK | | 30% | 30% | 30% | 30% | 30% | 30% | 30% |
| | methylacetate | | 20% | 20% | 20% | 20% | 20% | 20% | 20% |
| | Remarks | | Example | Example | Example | Example | Example | Example | Example |

| | Coating liquid for hard coat layer | | A08 | A09 | A10 | A11 | A12 | A13 |
|---|---|---|---|---|---|---|---|---|
| (a) Component | 3,4-epoxy cyclohexylmethyl methacrylate | | 30.00% | 20.00% | 20.00% | 20.00% | 20.00% | 20.00% |
| | 3,4-epoxy cyclohexyl methacrylate | | | | | | | |
| | 3,4-epoxy cyclohexylbutyl methacrylate | | | | | | | |
| | epoxy compound A | | | | | | | |
| (b) Component | DPHA | | | 65.95% | 65.95% | 65.95% | 50.95% | 50.95% |
| | ATMMT | | 10.00% | 10.00% | 10.00% | 10.00% | 10.00% | 10.00% |
| | UV1700B | | 55.95% | | | | | |
| (c) Component | IRGACURE127 | | 3.00% | 3.00% | 3.00% | 3.00% | 3.00% | 3.00% |
| (d) Component | IRGACURE290 | | 1.00% | | | | | |
| | IRGACURE270 | | | 1.00% | | | | |
| | B2380 | | | | 1.00% | | 1.00% | 1.00% |
| | CGI 725 | | | | | 1.00% | | |
| (e) Component | ELECOM V-8802 | | | | | | | 15.00% |
| | MiBK-ST | | | | | | 15.00% | |
| Wind unevenness inhibitor | FP-1 | | 0.05% | 0.05% | 0.05% | 0.05% | 0.05% | 0.05% |
| Solvent | MEK | | 50% | 50% | 50% | 50% | 50% | 50% |
| | MiBK | | 30% | 30% | 30% | 30% | 30% | 30% |
| | methylacetate | | 20% | 20% | 20% | 20% | 20% | 20% |
| | Remarks | | Example | Example | Example | Example | Example | Example |

TABLE 7

| | Coating liquid for hard coat layer | A14 | A15 | A16 | A17 | A18 | A19 |
|---|---|---|---|---|---|---|---|
| (a) Component | 3,4-epoxy cyclohexylmethyl methacrylate | 20.00% | 20.00% | 20.00% | 20.00% | 20.00% | 20.00% |
| (b) Component | DPHA | 50.95% | 50.95% | 50.95% | 50.95% | 48.45% | 47.45% |
| | ATMMT | 10.00% | 10.00% | 10.00% | 10.00% | 10.00% | 10.00% |
| (c) Component | IRGACURE127 | 3.00% | 3.00% | 3.00% | 3.00% | | |
| | IRGACURE819 | | | | | 3.00% | 3.00% |
| (d) Component | B2380 | 1.00% | 1.00% | 1.00% | 1.00% | 1.00% | 1.00% |
| | CGI 725 | | | | | | |
| (e) Component | ELECOM V-8803 | 15.00% | 15.00% | 15.00% | 15.00% | 15.00% | 15.00% |
| (f) Component | Tinuvin460 | | | | | 2.50% | 2.50% |
| | Tinuvin466 | | | | | | |
| | Tinuvin928 | | | | | | |
| Wind unevenness inhibitor | FP-1 | 0.05% | 0.05% | 0.05% | 0.05% | 0.05% | 0.05% |
| Sensitizing agent | 2,4-diethylthioxanthone (sensitizing agent) | | | | | | 1.00% |

TABLE 7-continued

| Solvent | MEK | 50% | 50% | 50% | 50% | 50% | 50% |
|---|---|---|---|---|---|---|---|
| | MiBK | 30% | 30% | 30% | 30% | 30% | 30% |
| | methylacetate | 20% | 20% | 20% | 20% | 20% | 20% |
| | Remarks | Example | Example | Example | Example | Example | Example |

| | Coating liquid for hard coat layer | A20 | A21 | A22 | A23 | A24 | A25 |
|---|---|---|---|---|---|---|---|
| (a) Component | 3,4-epoxy cyclohexylmethyl methacrylate | 20.00% | 20.00% | 20.00% | 20.00% | 20.00% | 20.00% |
| (b) Component | DPHA | 46.85% | 48.45% | 48.95% | 46.65% | 45.65% | 47.45% |
| (c) Component | ATMMT | 10.00% | 10.00% | 10.00% | 10.00% | 10.00% | 10.00% |
| | IRGACURE127 | | | | | | 3.00% |
| (d) Component | IRGACURE819 | 3.00% | 3.00% | 3.00% | 3.00% | 3.00% | |
| | B2380 | 1.00% | | | | | 1.00% |
| | CGI 725 | | 1.00% | 1.00% | 1.00% | 1.00% | |
| (e) Component | ELECOM V-8803 | 15.00% | 15.00% | 15.00% | 15.00% | 15.00% | 15.00% |
| (f) Component | Tinuvin460 | 3.10% | 2.50% | | | | 2.50% |
| | Tinuvin466 | | | 2.00% | | | |
| | Tinuvin928 | | | | 4.30% | 4.30% | |
| Wind unevenness inhibitor | FP-1 | 0.05% | 0.05% | 0.05% | 0.05% | 0.05% | 0.05% |
| Sensitizing agent | 2,4-diethylthioxanthone (sensitizing agent) | 1.00% | | | 1.00% | 1.00% | |
| Solvent | MEK | 50% | 50% | 50% | 50% | 50% | 50% |
| | MiBK | 30% | 30% | 30% | 30% | 30% | 30% |
| | methylacetate | 20% | 20% | 20% | 20% | 20% | 20% |
| | Remarks | Example | Example | Example | Example | Example | Example |

TABLE 8

| | Coating liquid for hard coat layer | A26 | A27 | A28 | A29 | A30 | A31 | A32 | A33 |
|---|---|---|---|---|---|---|---|---|---|
| (a) Component | 3,4-epoxycyclohexylmethylmethacrylate | | | | | | | 5.00% | 50.00% |
| (b) Component | DPHA | 65.95% | 95.95% | 95.95% | 95.95% | 95.95% | 90.95% | 45.95% | 76.95% |
| (c) Component | IRGACURE127 | 3.00% | 3.00% | 3.00% | 3.00% | 3.00% | 3.00% | 3.00% | 3.00% |
| (d) Component | IRGACURE290 | 1.00% | 1.00% | 1.00% | 1.00% | 1.00% | 1.00% | 1.00% | 1.00% |
| Wind unevenness inhibitor | FP-1 | 0.05% | 0.05% | 0.05% | 0.05% | 0.05% | 0.05% | 0.05% | 0.05% |
| Others | Glycydyl methacrylate | 30.00% | | | | | | | |
| | Ethyleneglycol dimethacrylate | | | | | | | | |
| | Celloxide2D21P | | | | | | | | |
| | Epoxy compound B | | | | | | | | 20% |
| | Bisphenol A-type diepoxyacrylate | | | | | | | | |
| Solvent | MEK | 50% | 50% | 50% | 50% | 50% | 50% | 50% | 50% |
| | MiBK | 30% | 30% | 30% | 30% | 30% | 30% | 30% | 30% |
| | Methyl acetate | 20% | 20% | 20% | 20% | 20% | 20% | 20% | 20% |
| | Remarks | Comp. Example | Comp. Example | Comp. Example | Comp. Example | Comp. Example | Comp. Example | Comp. Example | Comp. Example |

| | Coating liquid for hard coat layer | A34 | A35 | A36 | A37 | A38 | A39 | A50 | A51 |
|---|---|---|---|---|---|---|---|---|---|
| (a) Component | 3,4-epoxycyclohexylmethylmethacrylate | 20.00% | 20.00% | 20.00% | 20.00% | | | 60.00% | 95.95% |
| (b) Component | DPHA | 30.00% | 76.95% | 76.90% | 61.95% | 75.95% | 95.95% | 34.95% | |
| (c) Component | IRGACURE127 | 3.00% | 3.00% | 3.00% | 3.00% | 3.00% | 3.00% | 3.00% | 2.00% |
| (d) Component | IRGACURE290 | 1.00% | | 0.05% | 15.00% | 1.00% | 1.00% | 2.00% | 2.00% |
| Wind unevenness inhibitor | FP-1 | 0.05% | 0.05% | 0.05% | 0.05% | 0.05% | 0.05% | 0.05% | 0.05% |
| Others | Glycydyl methacrylate | | | | | | | | |
| | Ethyleneglycol dimethacrylate | 45.95% | | | | | | | |
| | Celloxide2D21P | | | | | 20.00% | | | |

TABLE 8-continued

| Solvent | | | | | | | | | | |
|---|---|---|---|---|---|---|---|---|---|---|
| | Epoxy compound B | | | | | | | | | |
| | Bisphenol A-type diepoxyacrylate | | | | | | 20% | | | |
| | MEK | 50% | 50% | 50% | 50% | 50% | 50% | 50% | 50% |
| | MiBK | 30% | 30% | 30% | 30% | 30% | 30% | 30% | 30% |
| | Methyl acetate | 20% | 20% | 20% | 20% | 20% | 20% | 20% | 20% |
| Remarks | | Comp. Example | Comp. Example | Comp. Example | Comp. Example | Comp. Example | Comp. Example | Comp. Example | Comp. Example |

Epoxy Compound A:

[Chem. 33]

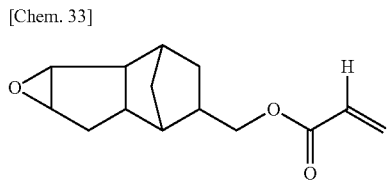

DPHA: KAYARD DPHA (manufactured by Nippon Kayaku Co., Ltd.)
ATMMT: Pentaerythritol tetraacrylate (manufactured by Shin Nakamura Kagaku K.K)
UV1700B: Urethane acrylate (manufactured by The Nippon Synthetic Chemical Industry Co., Ltd.)
IRGACURE127: Alkylphenol photo-polymerization inhibitor (manufactured by BASF)
IRGACURE819: Acylphosphine oxide photo-polymerization inhibitor (manufactured by BASF)
IRGACURE290: Sulfonium salt-based cationic polymerization initiator (manufactured by BASF)
IRGACURE270: Sulfonium salt-based cationic polymerization initiator (manufactured by BASF)
B2380: Iodonium salt-based cationic polymerization initiator (manufactured by Tokyo Kasei Kogyo Co., Ltd.)
CGI 725: Nonionic, cationic polymerization initiator (manufactured by BASF)
ELECOM V-8802: MiBK dispersion liquid having a 40% solid content by mass of spherical silica fine particles having an average particle size of 12 nm and a polymerizable group (manufactured by Nikki Kabushiki Kaisha)
ELECOM V-8803: MiBK dispersion liquid having a 40% solid content by mass of hetero (connected in a chain shape) silica fine particles having a polymerizable group (manufactured by Nikki Kabushiki Kaisha)
MiBK-ST: MiBK dispersion liquid having a 30% solid content by mass of silica fine particles having an average particle size of 10 nm to 20 nm and imparting no reactive group
FP-1: Florine-containing compounds listed below
Tinuvin 460, Tinuvin 466, Tinuvin 928: UV absorber (manufactured by BASF)

[Chem. 34]

FP-1

Celloxide 2021P: 3',4'-epoxycyclohexylemethyl 3,4-epoxy-cyclohexanecarboxylate (Daicell)

Epoxy Compound B:

[Chem. 35]

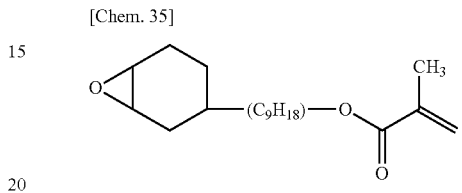

Bisphenol A-type diepoxyacrylate: Epoxyether 3000A (manufactured by Kyoeisha Chemical Co., Ltd)
(Coating of Hard Coat Layer)
Triacetyl cellulose films having a thickness of 40 μm, 25 μm and 20 μm were unwound into a roll shape, coating liquids for hard coat layers A01-A39, A50 and A51 were applied such that the layer thickness of the hard coat layers after film curing reaches the values listed in Tables 9-11 to thereby prepare hard coat films S01-S39, S50 and S51. In S16, the A16 liquid was applied on Technolloy C-101 (a three-layered structure in which PMMA film/polycarbonate film/PMMA film are stacked in the order named) having a thickness of 300 μm, manufactured by Sumika Acryl Co., Ltd., to form a hard coat layer.
In S40-S44, A01, A14, A18 or A27 liquids were applied on acrylic films prepared according to a method described below, and in S45-S47, the A01 liquid was applied on a cellulosacylate film prepared according to a method described below, to thereby prepare a hard coat layers on the respective substrates.
Specifically, each liquid was coated by a die coating method using the slot die described in Example 1 of Japanese Patent Application Laid-Open No. 2006-122889 at a conveying speed of 30 m/min and dried at 60° C. for 150 seconds. Then, at an oxygen concentration of approximately 0.1 volume % achieved by purging in the presence of nitrogen, the coated layer was cured by irradiating with an ultraviolet ray thereon in an irradiation dose of 500 mJ/cm$^2$ at an illuminance of 400 mW/cm$^2$ by using an air-cooled metal halide lamp (manufactured by Eye Graphics Co., Ltd.) of 160 W/cm, to thereby form a hard coat layer, which then was wound up.
[Preparation of 40 μm Acrylic Film]
In a reactor having an internal volume of 30 L and comprising a stirring device, a temperature sensor, a cooling tube, and a nitrogen inlet tube, 8,000 g of methyl methacrylate (MMA), 2,000 g of 2-(hydroxymethyl)methacrylate (MHMA) and 10,000 g of toluene as a polymerization solvent were charged, and while passing a nitrogen gas therethrough, the temperature was elevated to 105° C. When circulation began with the elevation of the temperature, 10.0 g of t-amylperoxyisononanoate was added as a polymerization initiator and a solution consisting of 20.0 g of t-amylperoxyisononanoate and 100 g of toluene dropped for two (2) hours to proceed with solution polymerization under a reflux at a temperature of about 105° C. to 110° C., and proceed with aging for another 4 hours. The polymerization reaction rate was 96.6%, and the content of MHMA in the resulting polymer (wt. %) was 20.0%.

Then, added to the resulting polymer solution was 10 g stearyl phosphate/distearyl phosphate mixture (Phoslex A-18 manufactured by Sakai Chemical Industry Co., Ltd.) to proceed with a cyclization condensation reaction for 5 hours under a reflux at approximately 80 to 100° C.

Then, the resulting polymer solution was introduced at the processing rate of 2.0 kg/h in terms of the amount of resin into a vent-type twin-screw extruder (screw diameter: φ=29.75 mm, the effective length: L/D=30) having a barrel temperature of 260° C., a rotation rate of 100 rpm, a vacuum degree of 13.3 to 400 hPa (10 to 300 mm Hg), a rear vent number of one (1) and a front vent number of four (4), followed by cyclization condensation reaction and devolatilization in the extruder. Then, after devolatilization was completed, the resin left in a hot molten state in the extruder was discharged from the tip of the extruder and then pelleted by a pelletizer to thereby obtain transparent pellets of acrylic resin having a lactone ring structure in the main chain. The weight average molecular weight of the resin was 148,000, the melt flow rate (compliant JISK7120, measured under a test temperature of 240° C. and a load of 10 kg, the same conditions as them were applied in the following preparation example) was 11.0 g/10 min, and the glass transition temperature was 130° C.

Then, the resulting pellets and AS resin (by Toyo Styrene Co., Ltd., Trade Name: Toyo AS AS20) were kneaded using a single screw extruder (screw diameter φ=30 mm) at a weight ratio of pellet/AS resin=90/10, to thereby resulting in a transparent pellet having a glass transition temperature of 127° C.

The pellets of resin composition prepared as above were melt-extruded from a coat hanger T-die using a twin-screw extruder to thereby prepare a resin film having a thickness of about 160 μm.

Then, the resulting unstretched resin film was simultaneously biaxially stretched, i.e., 2.0 times in the vertical direction (lengthwise) and 2.0 times in the horizontal direction (widthwise) to thereby prepare a polarizer protective film. The resulting acrylic-based film had a thickness of 40 μm, a total light transmittance of 92%, a haze of 0.3%, and a glass transition temperature of 127° C.

[Preparation of 30 μm Acrylic-Based Film]

Pellets having a glass transition temperature of 127° C., which were prepared in the same manner as the above 40 μm acrylic-based film, were melt-extruded from a coat hanger type T-die using a twin-screw extruder to thereby prepare a resin film having a thickness of about 120 μm.

Then, the resulting unstretched resin film was simultaneously biaxially stretched, i.e., 2.0 times in the vertical direction (lengthwise) and 2.0 times in the horizontal direction (widthwise) to thereby prepare a polarizer protective film. The resulting acrylic film had a thickness of 30 μm, a total light transmittance of 92%, a haze of 0.25%, and a glass transition temperature of 127° C.

(Preparation of 25 μm Cellulose Acylate Base Film)

The support of Sample No. S45 was prepared according to a method described below.

Also, supports of Sample Nos. S01-215, S17-S39, S50-S51 and S62 were prepared in the same manner as in Sample No. S45, except that a compound represented by Formula I was excluded, so that the casted amount of dope was controlled to reach the thickness values listed in Tables 9-12.

(Preparation of Cellulose acylate Dope for Core Layer)

The composition below was charged into a mixing tank and stirred to dissolve each component to obtain an adjusted cellulose acetate solution.

| | |
|---|---|
| Acetyl substitution degree 2.88 cellulose acetate having a weight average molecular weight of 260,000: | 100 parts by mass |
| Phthalateesteroligomer A: | 10 parts by mass |
| Compound (A-1) represented by Formula I: | 4 parts by mass |
| UV absorber (a compound having the following structural formula, manufactured by BASF): | 2.7 parts by mass |
| TINUVIN123 (HA-1, manufactured by BASF): | 0.18 parts by mass |
| Tekuran DO (N-alkenylpropylenediamine 3 acetic acid, manufactured by Nagase Chemtext): | 0.02 parts by mass |
| Methylenechloride (first solvent): | 430 parts by mass |
| Methanol (second solvent): | 64 parts by mass |

Phthalate ester oligomer A molecular weight (MW): 750

[Chem. 36]

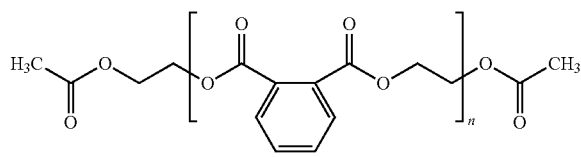

Compound (A-1) represented by Formula I

[Chem. 37]

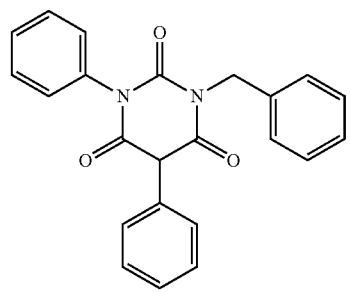

UV Absorber

[Chem. 38]

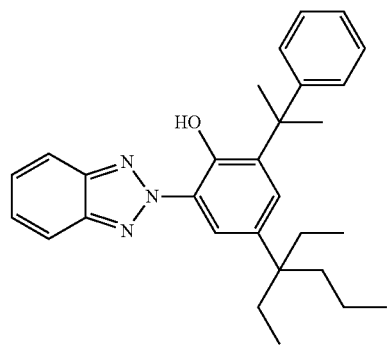

(Preparation of Cellulose Acylate Dope for External Layer)

10 parts by mass of a matting agent solution illustrated below was added to 90 parts by mass of cellulose acylate dope for the core layer to adjust a cellulose acetate solution for the external layer.

| | |
|---|---|
| Average particle size 20 nm silica particles (AEROSIL R972, manufactured by Nippon Aerosil Co.): | 2 parts by mass |
| Methylene chloride (first solvent): | 76 parts by mass |
| Methanol (second solvent): | 11 parts by mass |
| Cellulose acylate dope for core layer: | 1 part by mass |

(Preparation of Cellulose Acylate Film)

Three layers of cellulose acylate dope were casted simultaneously onto a drum having a temperature of 20° C. from a casting outlet. These layers were peeled off with the containment of 20% by mass of a solvent, were secured using tenter clips at both sides in the width direction of film, and with the containment of the residual solvent in an amount of 3% to 15%, were stretched by 1.18 times in the horizontal direction and then dried. Thereafter, passing between the rolls of a thermal treatment device, the layers were further dried to thereby prepare cellulose acylate films having a thickness of 25 μm.

Sample No. S46 was prepared under the same conditions as Sample No. S45, except that the compound represented by Formula I was replaced by the compound illustrated below.

[Chem. 39]

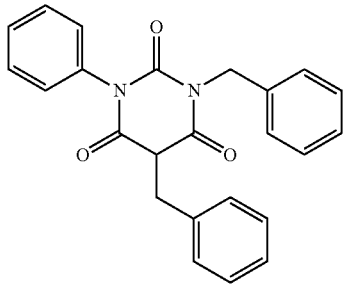

A-3

Sample No. S47 was prepared in the same manner as in Sample No. 46, except that 0.18 parts by mass of TINUVIN123 (HA-1) and 0.02 parts by mass of Tekuran DO were replaced by the following compound.

| | |
|---|---|
| Palmitate ester of ascorbic acid (6-O-palmitoyl-L-ascorbic acid, manufactured by Tokyo Kasei Kogyo Co., Ltd.): | 0.2 parts by mass |

[Chem. 40]

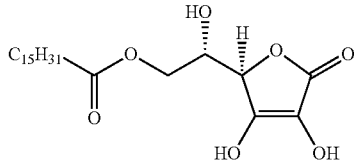

The prepared polarizing plate protective films S01-S47 and S50-S51 were evaluated in an evaluation method illustrated below.

(Film Thickness of Hard Coat Layer)

The film thickness of the hard coat layer was calculated by measuring the film thickness of a prepared hard coat film with a contact-type film thickness meter and subtracting the thickness of a support measured by the same film thickness meter from the measured hard coat film thickness.

(Pencil Hardness)

The pencil hardness test described in HS K 5600-5-4 (1999) was performed. The moisture of a hard coat film was controlled at a temperature of 25° C. and a relative humidity (RH) of 60% for 2 hours. Then, the surface of the film was scratched with 2H-4H test pencils defined in JIS S 6006 (2007) under a load of 4.9 N. The numerical values listed in the table indicate the number of times no damage occurred on the surface scratched five (5) times with each pencil.

Depending on the number, the hardness is determined as follows.

A: Three or more times no damage occurred when scratched the surface five (5) times with a 4H pencil.
B: Three or more times no damage occurred when scratched the surface five (5) times with a 3H pencil.
C: Three or more times damage occurred when scratched the surface five (5) times with a 3H pencil.

(Curl Evaluation)

A hard coat film was cut into a size of a 60 mm×60 mm film, whose moisture was then was controlled at a temperature of 25° C. and a relative humidity (RH) of 60% for 3 hours or greater. Thereafter, a weight is loaded on the film to allow the end face of the film to be drawn out by 1 cm to measure the raised height on the end face (=curl value K). This evaluation is performed in the coating direction and in the direction parallel to the coating to obtain an average value. Also, the positive (+) curl value in the table indicates that the coated surface (a surface having a hard coat layer) is curled inwards with respect to the support, and the negative (−) curl value indicates that the coating surface is curled outwards with respect to the support. Also, the curl was evaluated based on the following criteria.

A: Absolute value of less than 3.0 mm
B: Absolute value of 3.0 mm or greater and less than 6.0
C: Absolute value of 6.0 mm or greater and less than 8.0
D: Absolute value of 8.0 mm or greater (Evaluation of Moist and Heat Resistance: Change in Film After the Lapse of 1,000 Hours at a Temperature of 60° C. and a Relative Humidity of 90%)

A hard coat film was left at a temperature of 60° C. and a relative humidity of 90% for 1,000 hours and then its moist was controlled at at a temperature of 25° C. and a relative humidity of 60% to evaluate the general appearance of the film.

A: No change in the general appearance
B: Change in the general appearance, such as the clouding of the film and the like (Film Tranmissitivity)

The transmissivity of the prepared hard coat film was measured with a spectrometer UV3150 to obtain a film transmissivity at a wavelength of 380 nm.

[Saponification Treatment of Film Surface]

The hard coat films S01-S39 and the transparent supports used in these hard coat films were immersed in a 2.3 mol/L sodium hydroxide solution for three (3) minutes at a temperature of 55° C. Then, these films were washed in a washing bath at room temperature and neutralized using a 0.05 mol/L sulfuric acid at 30° C. Once again, the films were washed in a washing bath at room temperature, and then dried with a 100° C. warm air. In this way, a surface saponification treatment was performed on the film.
(Preparation of Polarizing Plates P01-P39 and P45-P47)

Surfaces of the hard coat films S01-S39 and S45-S47 treated with saponification on which hard coat layers were not stacked, stretched iodine PVA polarizers, and transparent supports treated with saponification were bonded in the order listed using a PVA adhesive and thermally dried to thereby obtain polarizing plates P01-039 and P45-P47.

In this case, the rolls of the prepared polarizers and the hard coat films S01-S39 and S45-S47 were arranged such that they were parallel to each other in the longitudinal direction. Also, the rolls of the polarizers and the rolls of the transparent support were arranged such that they were parallel to each other in the longitudinal direction.
(Preparation of Polarizing Plates P40-P43)

An active energy ray curable acrylic adhesive was applied to the surfaces of the polarizing plate protecting films S40-S43 on which hard coat was not laminated and to one side of the transparent supports used in these polarizing protective films by using a micro gravure coater (gravure roll: #180, rotational speed: 140%/line speed) so that the transparent protective films were coated to a thickness of 5 μm to thereby prepare transparent protective films having an adhesive.

Subsequently, the surface adhered to the polarizer was corona treated, and then the transparent protective film having an adhesive was adhered on both sides of the polarizer using a rolling device. From (both) sides of the adhered transparent protective film, irradiation of electron beams was performed to thereby result in a polarizing plate having a transparent protective film on both sides of the polarizer. The line speed was 20 m/min, the accelerated voltage was 250 kV, and the dose of irradiation was 20 kGy.

In this case, the rolls of the prepared polarizers and the protective films for the polarizing plates were arranged such that they were parallel to each other in the longitudinal direction. Also, the rolls of the polarizers and the rolls of transparent supports were arranged such that they were parallel to each other in the longitudinal direction.

[Preparation of Liquid Crystal Display Device]

A polarizing plate on the surface side in a commercially available IPS-type liquid crystal television (42LS5600 manufactured by LG Electronics) was removed, and then the polarizing plates P01-P47 were bonded to the front side via an adhesive in a manner of providing a hard coat layer as the outermost surface such that the absorption axis of the polarizing plate on the front side was defined in the longitudinal direction (right and left directions). The thickness of the glass used in the liquid crystal cell was 0.5 mm.

In this way, liquid crystal display devices C01-C47, C50 and C61 were obtained.

[Light Leakage Evaluation]

The moisture of the liquid crystal display devices prepared as above was controlled at 35° C. and a relative humidity of 90% for 24 hours and then the displays were left to stand at 25° C. and at a relative humidity of 60% for 2 hours. Then, the backlights of the liquid crystal display devices were turned on, and 10 hours therefrom, light leakage at the four corners of each panel was evaluated.

To evaluate light leakage, a black display screen was captured in front of the screen with a camera for measuring luminance "ProMetric" (manufactured by Radiant Imaging Inc.), and then a 3-step evaluation was performed based on the difference between the average luminance of the entire screen and the luminance at a site where the light leakage at the four corners was high.

Evaluation Index
A: No light leakage is visibly recognized at the four (4) corners of the panel
B: Slight light leakage is visibly recognized at first and second corners of the panel, among the four corners, but is still allowable
C: Strong light leakage is recognized at the four (4) corners of the panel and is not allowable

TABLE 9

| | | Sample No. | | | | | | | | | | | | |
|---|---|---|---|---|---|---|---|---|---|---|---|---|---|---|
| | | S01 | S02 | S03 | S04 | S05 | S06 | S07 | S08 | S09 | S10 | S11 | S12 | S13 |
| | | Hard coat coating liquid No. | | | | | | | | | | | | |
| | | A01 | A02 | A03 | A04 | A05 | A06 | A07 | A08 | A09 | A10 | A11 | A12 | A13 |
| Layer constitution | Support | 25 um TAC | 25 um TAC | 25 um TAC | 25 um TAC | 25 um TAC | 25 um TAC | 25 um TAC | 25 um TAC | 25 um TAC | 25 um TAC | 25 um TAC | 25 um TAC | 25 um TAC |
| | Film thickness of hard coat layer | 7.0 um | 7.0 um | 7.0 um | 7.0 um | 7.0 um | 7.0 um | 7.0 um | 7.0 um | 7.0 um | 7.0 um | 7.0 um | 7.0 um | 7.0 um |
| Evaluation result | Pencil hardness(8H) | 0 | 0 | 0 | 0 | 0 | 0 | 0 | 0 | 0 | 0 | 0 | 0 | 0 |
| | Pencil hardness(5H) | 0 | 0 | 0 | 0 | 0 | 0 | 0 | 0 | 0 | 0 | 0 | 0 | 0 |
| | Pencil hardness(4H) | 0 | 0 | 1 | 3 | 2 | 1 | 1 | 0 | 1 | 1 | 1 | 0 | 3 |
| | Pencil hardness(3H) | 5 | 4 | 5 | 5 | 5 | 5 | 5 | 4 | 5 | 5 | 5 | 5 | 5 |
| | Pencil hardness(2H) | 5 | 5 | 5 | 5 | 5 | 5 | 5 | 5 | 5 | 5 | 5 | 5 | 5 |
| | Pencil evaluation | B | B | B | A | B | B | B | B | B | B | B | B | A |
| | Curl [mm] | 2.5 mm | 3.0 mm | 0.0 min | 5.0 mm | 3.5 mm | 0.0 mm | 0.0 mm | 0.0 mm | 3.5 mm | 3.5 mm | 3.5 mm | 2.0 mm | 1.0 mm |
| | Curl evaluation | B | B | A | B | B | A | A | A | B | B | B | A | A |
| | Change in film after 1000 hr at 60° C., 90% | A | A | A | A | A | A | A | A | A | A | A | A | A |

TABLE 9-continued

| | | Sample No. | | | | | | | | | | | | |
|---|---|---|---|---|---|---|---|---|---|---|---|---|---|---|
| | | S01 | S02 | S03 | S04 | S05 | S06 | S07 | S08 | S09 | S10 | S11 | S12 | S13 |
| | | Hard coat coating liquid No. | | | | | | | | | | | | |
| | | A01 | A02 | A03 | A04 | A05 | A06 | A07 | A08 | A09 | A10 | A11 | A12 | A13 |
| | Film transmissivity (380 nm) | 19% | 19% | 19% | 19% | 19% | 19% | 19% | 19% | 19% | 19% | 19% | 19% | 19% |
| | Liquid crystal cell No. | C01 | C02 | C03 | C04 | C05 | C06 | C07 | C08 | C09 | C10 | C11 | C12 | C13 |
| | Light leakage evaluation | B | B | B | B | A | A | A | A | A | A | A | A | A |
| | Remarks | Ex. | Ex. | Ex. | Ex. | Ex. | Ex. | Ex. | Ex. | Ex. | Ex. | Ex. | Ex. | Ex. |

TABLE 10

| | | Sample No. | | | | | | | | | | | |
|---|---|---|---|---|---|---|---|---|---|---|---|---|---|
| | | S14 | S15 | S16 | S17 | S18 | S19 | S20 | S21 | S22 | S23 | S24 | S25 |
| | | Hard coat coating liquid No. | | | | | | | | | | | |
| | | A14 | A15 | A16 | A17 | A18 | A19 | A20 | A21 | A22 | A23 | A24 | A25 |
| Layer constitution | Support | 25 um TAC | 25 um TAC | 300 um Technolloy C101 | 25 um TAC | 25 um TAC | 25 um TAC | 25 um TAC | 25 um TAC | 25 um TAC | 25 um TAC | 25 um TAC | 25 um TAC |
| | Film thickness of hard coat layer | 7.0 um | 12.5 um | 30 um | 4.0 um | 7.0 um | 7.0 um | 7.0 um | 7.0 um | 7.0 um | 7.0 um | 7.0 um | 7.0 um |
| Evaluation result | Pencil hardness(8H) | 0 | 0 | 4 | 0 | 0 | 0 | 0 | 0 | 0 | 0 | 0 | 0 |
| | Pencil hardness(5H) | 0 | 4 | 5 | 0 | 0 | 0 | 0 | 0 | 0 | 0 | 0 | 0 |
| | Pencil hardness(4H) | 5 | 5 | 5 | 1 | 1 | 2 | 1 | 1 | 1 | 1 | 3 | 0 |
| | Pencil hardness(3H) | 5 | 5 | 5 | 5 | 5 | 5 | 5 | 5 | 5 | 5 | 5 | 5 |
| | Pencil hardness(2H) | 5 | 5 | 5 | 5 | 5 | 5 | 5 | 5 | 5 | 5 | 5 | 5 |
| | Pencil evaluation | A | A | A | B | B | B | B | B | B | B | A | B |
| | Curl [mm] | 1.0 mm | 1.5 mm | 2.0 mm | 0.0 mm | 4.0 mm | 3.0 mm | 3.5 mm | 3.0 mm | 3.0 mm | 3.0 mm | 1.5 mm | 3.0 mm |
| | Curl evaluation | A | A | A | A | B | B | B | B | B | B | A | B |
| | Change in film after 1000 hr at 60° C., 90% | A | A | A | A | A | A | A | A | A | A | A | A |
| | Film transmissivity (380 nm) | 19% | 19% | — | 19% | 9% | 9% | 9% | 9% | 8% | 8% | 8% | 9% |
| | Liquid crystal cell No. | C14 | C24 | — | C15 | C16 | C17 | C18 | C19 | C20 | C21 | C22 | C23 |
| | Light leakage evaluation | A | A | — | A | A | A | B | A | A | A | A | A |
| | Remarks | Ex. | Ex. | Ex. | Ex. | Ex. | Ex. | Ex. | Ex. | Ex. | Ex. | Ex. | Ex. |

TABLE 11

| | | Sample No. | | | | | | | |
|---|---|---|---|---|---|---|---|---|---|
| | | S26 | S27 | S28 | S29 | S30 | S31 | S32 | S33 |
| | | Hard coat coating liquid No. | | | | | | | |
| | | A26 | A27 | A28 | A29 | A30 | A31 | A32 | A33 |
| Layer constitution | Support | 25 um TAC | 25 um TAC | 40 um TAC | 25 um TAC | 20 um TAC | 25 um TAC | 25 um TAC | 25 um TAC |
| | Film thickness of hard coat layer | 7.0 um | 7.0 um | 3.0 um | 3.0 um | 3.0 um | 7.0 um | 7.0 um | 7.0 um |
| Evaluation result | Pencil hardness(4H) | 0 | 3 | 0 | 0 | 0 | 3 | 0 | 0 |
| | Pencil hardness(3H) | 5 | 5 | 2 | 1 | 0 | 5 | 0 | 2 |

TABLE 11-continued

| | | | | | | | | | |
|---|---|---|---|---|---|---|---|---|---|
| | Pencil hardness(2H) | 5 | 5 | 5 | 5 | 3 | 5 | 4 | 5 |
| | Pencil evaluation | B | A | C | C | C | A | C | C |
| | Curl [mm] | 7.5 mm | 8.0 mm | 6.0 mm | 8.0 mm | 8.0 mm | 7.5 mm | −6.0 mm | 6.0 mm |
| | Curl evaluation | C | D | C | D | D | C | C | C |
| | Change in film after 1000 hr at 60° C., 90% | A | A | A | A | A | A | A | A |
| | Film transmissivity (380 nm) | 19% | 19% | 9% | 19% | 24% | 19% | 19% | 19% |
| | Liquid crystal cell No. | C25 | C26 | C27 | C28 | C29 | C30 | C31 | C32 |
| | Light leakage evaluation | C | C | C | C | C | C | A | C |
| | Remarks | Comp. Ex. | Comp. Ex. | Comp. Ex. | Comp. Ex. | Comp. Ex. | Comp. Ex. | Comp. Ex. | Comp. Ex. |

| | | Sample No. | | | | | | | |
|---|---|---|---|---|---|---|---|---|---|
| | | S34 | S35 | S36 | S37 | S38 | S39 | S50 | S51 |
| | | Hard coat coating liquid No. | | | | | | | |
| | | A34 | A35 | A36 | A37 | A38 | A39 | A50 | A51 |
| Layer constitution | Support | 25 um TAC | 25 um TAC | 25 um TAC | 25 um TAC | 25 um TAC | 25 um TAC | 25 um TAC | 25 um TAC |
| | Film thickness of hard coat layer | 7.0 um | 7.0 um | 7.0 um | 7.0 um | 7.0 um | 7.0 um | 7.0 um | 7.0 um |
| Evaluation result | Pencil hardness(4H) | 0 | 0 | 0 | 0 | 0 | 0 | 0 | 0 |
| | Pencil hardness(3H) | 0 | 3 | 4 | 0 | 3 | 1 | 0 | 0 |
| | Pencil hardness(2H) | 3 | 5 | 5 | 3 | 5 | 5 | 1 | 0 |
| | Pencil evaluation | C | B | B | C | B | C | C | C |
| | Curl [mm] | 2.0 mm | 7.0 mm | 7.0 mm | 1.5 mm | 6.0 mm | 6.0 mm | −8.0 mm | −8.5 mm |
| | Curl evaluation | A | C | C | A | C | C | C | C |
| | Change in film after 1000 hr at 60° C., 90% | A | A | A | B | B | B | A | A |
| | Film transmissivity (380 nm) | 19% | 19% | 19% | 19% | 19% | 19% | 19% | 19% |
| | Liquid crystal cell No. | C33 | C34 | C35 | C36 | C37 | C38 | C50 | C51 |
| | Light leakage evaluation | C | B | B | C | C | C | C | C |
| | Remarks | Comp. Ex. | Comp. Ex. | Comp. Ex. | Comp. Ex. | Comp. Ex. | Comp. Ex. | Comp. Ex. | Comp. Ex. |

TABLE 12

| | | Sample No. | | | | | | | |
|---|---|---|---|---|---|---|---|---|---|
| | | S40 | S41 | S42 | S43 | S44 | S45 | S46 | S47 |
| | | Hard coat coating liquid No. | | | | | | | |
| | | A01 | A01 | A14 | A18 | A27 | A01 | A01 | A01 |
| Layer constitution | Support | 40 um acryl | 30 um acryl | 30 um acryl | 30 um acryl | 30 um acryl | 25 um TAC | 25 um TAC | 25 um TAC |
| | Film thickness of hard coat layer | 7.0 um | 7.0 um | 7.0 um | 7.0 um | 7.0 um | 7.0 um | 7.0 um | 7.0 um |
| Evaluation result | Pencil hardness(8H) | 0 | 0 | 0 | 0 | 0 | 0 | 0 | 0 |
| | Pencil hardness(5H) | 0 | 0 | 0 | 0 | 0 | 0 | 0 | 0 |
| | Pencil hardness(4H) | 0 | 0 | 3 | 0 | 1 | 3 | 3 | 3 |
| | Pencil hardness(3H) | 5 | 4 | 5 | 3 | 5 | 5 | 5 | 5 |
| | Pencil hardness(2H) | 5 | 5 | 5 | 4 | 5 | 5 | 5 | 5 |
| | Pencil evaluation | B | B | A | B | B | A | A | A |
| | Curl [mm] | 2.0 mm | 2.0 mm | 1.0 mm | 3.5 mm | 8.0 mm | 2.0 mm | 2.0 mm | 2.0 mm |
| | Curl evaluation | A | A | A | B | D | A | A | A |
| | Change in film after | A | A | A | A | A | A | A | A |

TABLE 12-continued

| | | Sample No. | | | | | | |
|---|---|---|---|---|---|---|---|---|
| | | S40 | S41 | S42 | S43 | S44 | S45 | S46 | S47 |
| | | Hard coat coating liquid No. | | | | | | | |
| | | A01 | A01 | A14 | A18 | A27 | A01 | A01 | A01 |
| 1000 hr at 60° C., 90% | | | | | | | | | |
| | Film transmissivity (380 nm) | 19% | 19% | 19% | 9% | 19% | 19% | 19% | 19% |
| | Liquid crystal cell No. | C39 | C40 | C41 | C42 | C43 | C44 | C45 | C46 |
| | Light leakage evaluation | A | A | A | A | B | A | A | A |
| | Remarks | Ex. | Ex. | Ex. | Ex. | Comp. Ex. | Ex. | Ex. | Ex. |

Also, coating liquids A60-A61 (antiglare hard coat layer coating liquids) for hard coat layers were prepared as described below. Thereafter, using the supports illustrated in the table below, hard coat films S60-S62 were prepared under the same conditions as hard coat film S01, except that they were set to have a hard coat layer thickness as listed. In addition, using S62, polarizing plates and liquid crystal displays were prepared in the same manner as described above and were evaluated in the same manner as described above.

<Preparation of Hard Coating Liquid A60 for Antiglare Hard Coat Layer>

To the coating liquid A-16 for a hard coat layer, cross-linkable aryl-styrene particles (an average particle size of 6.0 µm and a refractive index of 1.525) were mixed such that their content was 10% by mass relative to the total solid content in the hard coat layer coating liquid. In this case, the resin particles were added in the form of a dispersion liquid prepared according to the method described below. In an MEK (methylethyketone) solution being agitated, resin particles were added slowly until the solid content concentration of the dispersion liquid reaches 30% by mass and agitated for 30 minutes to thereby prepare a particle dispersion liquid. In addition, the solid content concentration of the coating liquid for a hard coat coating layer was adjusted to be 35% by mass at the same solvent ratio as A-16. Thereafter, the coating liquid was filtered off by a polypropylene filter having a hole diameter of 30 µm to prepare the coating liquid A60 for an antiglare hard coat.

[Preparation of Hard Coating Liquid A61 for Antiglare Hard Coat Layer]

Except that the cross-linking acrylic-styrene particles were mixed to be 20% by mass relative to the total solid content in the coating liquid for the hard coat layer, hard coating liquid A61 for an antiglare hard coat layer was prepared in the same method as A60 for an antiglare hard coat layer.

TABLE 13

| | | Sample No. | | |
|---|---|---|---|---|
| | | S60 | S61 | S62 |
| Layer constitution | Hard coat coating liquid No. | A60 | A61 | A60 |
| | Support | 300 µm Technolloy C101 | 300 µm Technolloy C101 | 25 µm TAC |
| | Film thickness of hard coat layer | 30 µm | 30 µm | 7.0 µm |
| Evaluation result | Pencil hardness (8H) | 4 | 4 | 0 |
| | Pencil hardness (5H) | 5 | 5 | 0 |
| | Pencil hardness (4H) | 5 | 5 | 3 |
| | Pencil hardness (3H) | 5 | 5 | 5 |
| | Pencil hardness (2H) | 5 | 5 | 5 |
| | Pencil evaluation | A | A | A |
| | Curl [mm] | 2.0 mm | 2.0 mm | 1.0 mm |
| | Curl evaluation | A | A | A |
| | Change in film after 1000 hr at 60° C., 90% | A | A | A |
| | Film transmissivity (380 nm) | — | — | 19% |
| | Liquid crystal cell No. | — | — | C60 |
| | Light leakage evaluation | — | — | A |
| | Remarks | Example | Example | Example |

The evaluation results of the prepared hard coat film and the polarizing plate using the hard coat films, and the liquid crystal display are shown in the table below. The hard coat films in the examples are superior to those in comparative examples in terms of exhibiting a high pencil hardness, a low curl level, and a good moisture and heat resistance. In addition, S13 in which reactive silica particles were added exhibits higher hardness than S10 or S12. Also, S18-S25 in which a UV absorber was added are able to lower the transmissivity at a wavelength of 380 nm, so that S20 in which the thickness of the support was reduced to 20 µm is able to maintain a low transmissivity by controlling the content of the UV absorber added, thereby achieving low curling and high hardness.

Also, the liquid crystal display using the hard coat film of the present invention is superior in terms of display quality due to a small light leakage. Although the reason why has yet been clearly known, it is presumably because the containment of a compound having one alicyclic epoxy group and one ethylenically unsaturated double bond group in a molecule and having a molecular weight of 300 or less increases the hydrophobicity of the hard coat layer, which in turn prevents polarizers from absorbing moisture under the condition of high temperature and high humidity.

Also, on the hard coat film according to the present invention, i.e., S01-S25, S40-S43, S45-S47 and S60-S62, low refractive index layers were applied by coating according to the method described below. As a result, it was shown that ghost images were reduced while maintaining the sound curl degree and hardness to thereby achieve superior black tightness.

[Coating of Low Refractive Index Layer]

(Preparation of Inorganic Particle Dispersion Liquid (B-1))

By differentiating the conditions for preparation from Preparation Example 4 disclosed in Japanese Patent Application Laid-Open No. 2002-79616, silica fine particles having a cavity therein were prepared. These particles were solvent-substituted by methanol in a water dispersion liquid state. Finally, the particles were adjusted such that the solid content concentration reaches 20% by mass, to thereby obtain particles having an average particle size of 45 nm, a cell thickness of approximately 7 nm and a silica particle refractive index of 1.30. This will be referred to a dispersion liquid (B).

Relative to 500 parts by mass of the dispersion liquid (B), 15 parts by mass of acryloyloxypropyltrimethoxysilane and 1.5 parts by mass of diisopropoxyaluminumethylacetate were added and mixed and then 9 parts by mass of ionic exchange water was added. After reacting the dispersion at 60° C. for 8 hours and then cooling to room temperature, 1.8 parts by mass of acetyl acetone was added. Further, MEK was added to maintain the total amount of the dispersion constantly while performing solvent substitution through vacuum distillation and controlled such that the solid content concentration finally reached 20% by mass to thereby prepare a dispersion liquid (B-1).

(Preparation of Coating Liquid for Low Refractive Index Layer)

7.6 g of a fluorine-containing polymer (P-12: Fluorine-containing copolymer; an example compound in Japanese Patent Application Laid-Open No. 2007-293325), 1.4 g of DPHA, 2.4 g of the dispersion liquid (B-1), 0.46 g of a photo-polymerization initiator (IRGACURE 907), 190 g of methylethyl ketone, and 48 g of propyleneglycolmonomethyletheracetate were added and then agitated, and thereafter filtration was performed using a polypropylene-based filter having a hole diameter of 5 µm to thereby prepare a low refractive index layer.

(Coating of Low Refractive Index Layer)

The triacetyl cellulose film on which the above hard coat layer was applied by coating was unwound once again and a coating liquid for a low refractive index layer was applied thereto by a die coating method using the slot die at a conveying speed of 30 m/min and dried at 90° C. for 75 seconds. Then, at an oxygen concentration of approximately 0.01% to 0.1% under nitrogen purge, the film was formed to a thickness of 100 µm by irradiating with an ultraviolet ray thereon in an irradiation dose of 240 mJ/cm² at an illuminance of 400 mW/cm² by using a 240 W/cm air-cooled metal halide lamp (manufactured by Eye Graphics Co., Ltd.) and wound to thereby provide a hard coat film having a low refractive index layer. The refractive index of the low refractive index layer was 1.46.

What is claimed is:

1. A method of manufacturing a hard coat film having a hard coat layer on at least one side of a transparent support, the method comprising curing a hard coat layer forming composition containing (a) to (d) below to form the hard coat layer, wherein the hard coat layer forming composition contains 10% by mass to 40% by mass of (a); 40% by mass to 89.8% by mass (b); (c) 0.1% by mass to 10% by mass of (c); and 0.1% by mass to 10% by mass of (d) based on 100% by mass of the total solid content in the hard coat layer forming composition:

(a) a compound having one alicyclic epoxy group and one ethylenically unsaturated double bond group in a molecule and having a molecular weight of 300 or less;

(b) a compound having three or more ethylenically unsaturated double bond groups in a molecule;

(c) a radical polymerization initiator; and (d) a cationic polymerization initiator, and wherein the hard coat layer forming composition excludes an organic polymer formed from 5 to 30 weight percent of a radical polymerizable monomer having a perfluoroalkyl group, 0.01 to 5 weight percent of α,ω-dimercaptopolysiloxane, 5 to 40 weight percent of a radical polymerizable monomer having a cationic photo polymerizable epoxy group, and 25 to 75 weight percent of the other radical polymerizable monomer copolymerizable therewith.

2. The method of manufacturing a hard coat film as claimed in claim 1, wherein the hard coat layer forming composition further contains (e) an inorganic fine particle reactive with an epoxy group or an ethylenically unsaturated double bond group in an amount of 5% by mass to 40% by mass based on 100% by mass of the total solid content in the hard coat layer forming composition.

3. The method of manufacturing a hard coat film as claimed in claim 1, wherein the hard coat layer forming composition further contains (f) a UV absorber.

4. The method of manufacturing a hard coat film as claimed in claim 1, wherein a thickness ratio ($t_H/t_T$) of the transparent support thickness ($t_T$) to the hard coat layer thickness ($t_H$) is 0.2 to 0.7.

5. The method of manufacturing a hard coat film as claimed in claim 1, wherein the (a) is epoxycyclohexylmethyl (meth)acrylate.

6. The method of manufacturing a hard coat film as claimed in claim 1, wherein the transparent support is a cellulose acylate film and has a thickness of 25 µm or less.

7. The method of manufacturing a hard coat film as claimed in claim 1, wherein the transparent support is an acrylic resin film and has a thickness of 40 µm or less.

8. The method of manufacturing a hard coat film as claimed in claim 1, wherein the transparent support is a cellulose acylate film and comprises at least a compound represented by the following Formula I:

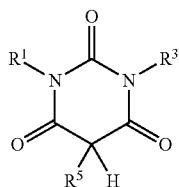

Formula I in Formula I, each of $R^1$, $R^3$ and $R^5$ independently represents a hydrogen atom, an alkyl group, a cycloalkyl group, an alkenyl group or an aromatic group, wherein the alkyl group, the cycloalkyl group, the alkenyl group and the aromatic group may have a substituent, provided that, any one of $R^1$, $R^3$ and $R^5$ is an alkyl group or a cycloalkyl group which is substituted with a group having a ring structure and the total number of the ring structures present in $R^1$, $R^3$ and $R^5$ is 3 or greater.

9. A hard coat film manufactured by the method of manufacturing a hard coat film according to claim 1.

10. A polarizing plate comprising:
a polarizer; and
at least one sheet of the hard coat film according to claim 9 as a protective film for the polarizer.

11. A liquid crystal display device comprising:
a liquid crystal cell;
the polarizing plate according to claim 10 disposed on at least one side of the liquid crystal cell; and
the hard coat film disposed on its outermost surface.

\* \* \* \* \*